US012705195B2

(12) United States Patent
Itani et al.

(10) Patent No.: US 12,705,195 B2
(45) Date of Patent: Aug. 11, 2026

(54) DIRECT MEMORY ACCESS DATA TRANSFERS

(71) Applicant: NVIDIA Corporation, Santa Clara, CA (US)

(72) Inventors: Ahmad Itani, San Jose, CA (US); Jagadeesh Sankaran, Dublin, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/789,998

(22) Filed: Jul. 31, 2024

(65) Prior Publication Data

US 2026/0037463 A1 Feb. 5, 2026

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
None
See application file for complete search history.

(56) References Cited

U.S. PATENT DOCUMENTS 5,678,062 A * 10/1997 Okada .................... G06F 13/28 710/1
6,754,735 B2 * 6/2004 Kale ...................... G06F 13/28 710/33
6,782,465 B1 * 8/2004 Schmidt .................. G06F 13/28 710/33
7,620,749 B2 * 11/2009 Biran ...................... G06F 13/28 710/22
7,924,296 B2 * 4/2011 Guha .................... G06T 15/503 345/532
8,205,019 B2 * 6/2012 Brink .................. G06F 11/1076 709/212
9,007,646 B2 * 4/2015 Kaikumaa ............. H04N 23/57 710/52
9,015,446 B2 4/2015 Cox et al.
9,123,128 B2 9/2015 Meixner
9,419,972 B2 * 8/2016 Kidron .................... G06F 21/85

(Continued)

FOREIGN PATENT DOCUMENTS

WO WO-2004086240 A1 * 10/2004 ............ G06F 13/28

OTHER PUBLICATIONS

'Command Linking' from Arm CoreLink DMA-350 Technical Reference Manual, Jan. 2023. (Year: 2023).*

(Continued)

*Primary Examiner* — Steven G Snyder
(74) *Attorney, Agent, or Firm* — Foley & Lardner LLP

(57) ABSTRACT

In various examples, systems and methods are disclosed that relate to linking and performing direct memory access (DMA) transfers. In one example, an accelerator can generate data associated with a descriptor that represents multiple DMA transfers associated with a plurality of DMA transfer types. The accelerator can provide the data associated with the descriptor to a device (or group of devices) involved in performing the DMA transfers as a set of linked DMA transfers. In response to receiving the data associated with the descriptor, the device(s) that receive the data associated with the descriptor can be configured to perform DMA transfers and allow for movement of the data specified by the descriptor to be moved from source memory to destination memory.

20 Claims, 33 Drawing Sheets

(56) References Cited

U.S. PATENT DOCUMENTS

| | | | | |
|---|---|---|---|---|
| 9,727,521 | B2 | 8/2017 | Ma et al. | |
| 10,013,373 | B1* | 7/2018 | Bruce | G06F 13/1673 |
| 10,241,946 | B2* | 3/2019 | Rochford | G06F 5/065 |
| 11,093,078 | B1* | 8/2021 | Bharathan | G06F 3/044 |
| 11,573,795 | B1* | 2/2023 | Itani | G06F 9/3001 |
| 11,630,800 | B2 | 4/2023 | Hung et al. | |
| 11,636,063 | B2 | 4/2023 | Hung et al. | |
| 11,644,834 | B2 | 5/2023 | Ditty et al. | |
| 12,423,254 | B2* | 9/2025 | Killeen | G06F 13/28 |
| 2003/0120835 | A1* | 6/2003 | Kale | G06F 13/28 710/22 |
| 2008/0198170 | A1* | 8/2008 | Guha | G09G 5/397 345/532 |
| 2014/0149743 | A1* | 5/2014 | Kidron | G06F 21/85 713/160 |
| 2015/0006765 | A1* | 1/2015 | Litch | G06F 13/28 710/22 |
| 2022/0269631 | A1* | 8/2022 | Newald | G06F 13/28 |
| 2023/0042226 | A1* | 2/2023 | Itani | G06F 13/28 |
| 2023/0045443 | A1* | 2/2023 | Hung | G06F 12/0862 |
| 2023/0046642 | A1* | 2/2023 | Hung | G06N 3/063 |
| 2023/0047233 | A1* | 2/2023 | Hung | G06F 12/0802 |
| 2023/0049442 | A1* | 2/2023 | Hung | G06F 9/30043 |
| 2023/0050062 | A1* | 2/2023 | Hung | G06F 9/30043 |
| 2023/0076599 | A1* | 3/2023 | Hung | G06F 9/30072 |
| 2023/0153266 | A1 | 5/2023 | Hung et al. | |
| 2024/0007420 | A1* | 1/2024 | Asai | G06F 13/38 |

OTHER PUBLICATIONS

Infineon Application Note "PSoC 6 MCU usage of Direct Memory Access (DMA)" copyright 2023. (Year: 2023).*

* cited by examiner

| FIELD DESCRIPTION | BYTE FIELD | | | |
|---|---|---|---|---|
| | BITS [31:24] | BITS [23:16] | BITS [15:8] | BITS [7:0] |
| FRAME HEADER 1 | NOCR: NUMBER OF DESCRIPTOR COLUMN/ROW (M) | FRAME REPETITION FACTOR | FID1: HWSEQ FRAME START ID1 (C0) | FID0: HWSEQ FRAME START ID0 (DE) |
| FRAME HEADER 2 | FO: FRAME OFFSET IN LP | | TO: TILE OFFSET IN LINE PITCH/ PIXEL | |
| FRAME HEADER 3 | PAD B | PAD L | PAD T | PAD R |
| COLUMN 1/ROW 1 HEADER | CRO: COLUMN/ROW OFFSET IN PIXEL/ LINE PITCH | | R: COLUMN 1/ROW REPETITION FACTOR | DESCRIPTOR ENTRY COUNT |
| DESCRIPTOR 1 AND DESCRIPTOR 2 HEADER | SECOND DESCRIPTOR REPETITION | SECOND DESCRIPTOR ID | FIRST DESCRIPTOR REPETITION | FIRST DESCRIPTOR ID |
| ⋮ | | | | |
| DESCRIPTOR N HEADER | ----- | ----- | NTH DESCRIPTOR REPETITION | NTH DESCRIPTOR ID |
| ⋮ | | | | |
| COLUMN M / ROW M HEADER | CRO: COLUMN/ROW OFFSET IN PIXEL/ LINE PITCH | | R: COLUMN M/ROW M REPETITION FACTOR | DESCRIPTOR ENTRY COUNT |
| DESCRIPTOR 1 AND DESCRIPTOR 2 HEADER | SECOND DESCRIPTOR REPETITION | SECOND DESCRIPTOR ID | FIRST DESCRIPTOR REPETITION | FIRST DESCRIPTOR ID |
| ⋮ | | | | |
| DESCRIPTOR N HEADER | ----- | ----- | NTH DESCRIPTOR REPETITION | NTH DESCRIPTOR ID |

FRAME HEADER PORITON 402

FIRST DESC. SET 404

NTH DESC. SET 406

| FIELD DESCRIPTION | BYTE FIELD | | | |
|---|---|---|---|---|
| | Bits [31:24] | Bits [23:16] | Bits [15:8] | Bits [7:0] |
| FRAME HEADER 1 | NOCR: Number of descriptor column/row (M) | Frame repetition factor | FID1: HWSEQ Frame start ID1 (DE) | FID0: HWSEQ Frame start ID0 (AD) |
| FRAME HEADER 2 | FO: Frame Offset in LP (RSVD) | | TO: Tile offset in line pitch/ pixel (RSVD) | |
| FRAME HEADER 3 | Pad B (RSVD) | Pad L (RSVD) | Pad T (RSVD) | Pad R (RSVD) |
| Column 1/Row 1 Header | CRO: Column/Row offset in pixel/ line pitch (RSVD) | | R: Column 1/Row repetition factor | Descriptor entry count |
| Descriptor 1 and Descriptor 2 Header | Second Descriptor Repetition | Second Descriptor ID | First Descriptor Repetition | First Descriptor ID |
| ⋮ | | | | |
| Descriptor N Header | - - - - - | - - - - - | Nth Descriptor Repetition | Nth Descriptor ID |
| ⋮ | | | | |
| Column M / Row M Header | CRO: Column/Row offset in pixel/ line pitch (RSVD) | | R: Column M/Row M repetition factor | Descriptor entry count |
| Descriptor 1 and Descriptor 2 Header | Second Descriptor Repetition | Second Descriptor ID | First Descriptor Repetition | First Descriptor ID |
| ⋮ | | | | |
| Descriptor N Header | - - - - - | - - - - - | Nth Descriptor Repetition | Nth Descriptor ID |

Frame Header Portion 402B

First Desc. Set 404B

Nth Desc. Set 406B

| FIELD DESCRIPTION | BYTE FIELD | | | |
|---|---|---|---|---|
| | BITS [31:24] | BITS [23:16] | BITS [15:8] | BITS [7:0] |
| FRAME HEADER 1 | NOCR: NUMBER OF DESCRIPTOR COLUMN/ROW (M) | FRAME REPETITION FACTOR | FID1: HWSEQ FRAME START ID1 (C0) | FID0: HWSEQ FRAME START ID0 (DA) |
| FRAME HEADER 2 | FO: FRAME OFFSET IN LP (RSVD) | | TO: TILE OFFSET IN LINE PITCH/ PIXEL (RSVD) | |
| FRAME HEADER 3 | PAD B (RSVD) | PAD L (RSVD) | PAD T (RSVD) | PAD R (RSVD) |
| COLUMN 1 HEADER | CRO: COLUMN/ROW OFFSET IN PIXEL/LINE PITCH | | | |
| DESCRIPTOR 1 HEADER | SECOND DESCRIPTOR REPETITION (RSVD) | SECOND DESCRIPTOR ID (RSVD) | FIRST DESCRIPTOR REPETITION (RSVD) | FIRST DESCRIPTOR ID |
| ⋮ | | | | |
| COLUMN M HEADER | CRO: COLUMN/ROW OFFSET IN PIXEL/LINE PITCH | | | |
| DESCRIPTOR N HEADER | SECOND DESCRIPTOR REPETITION (RSVD) | SECOND DESCRIPTOR ID (RSVD) | FIRST DESCRIPTOR REPETITION (RSVD) | FIRST DESCRIPTOR ID |

FRAME HEADER PORTION 402C (Frame Header 1–3)

FIRST DESC. SET 404C (Column 1 Header, Descriptor 1 Header)

NTH DESC. SET 406C (Column M Header, Descriptor N Header)

Figure 4D:
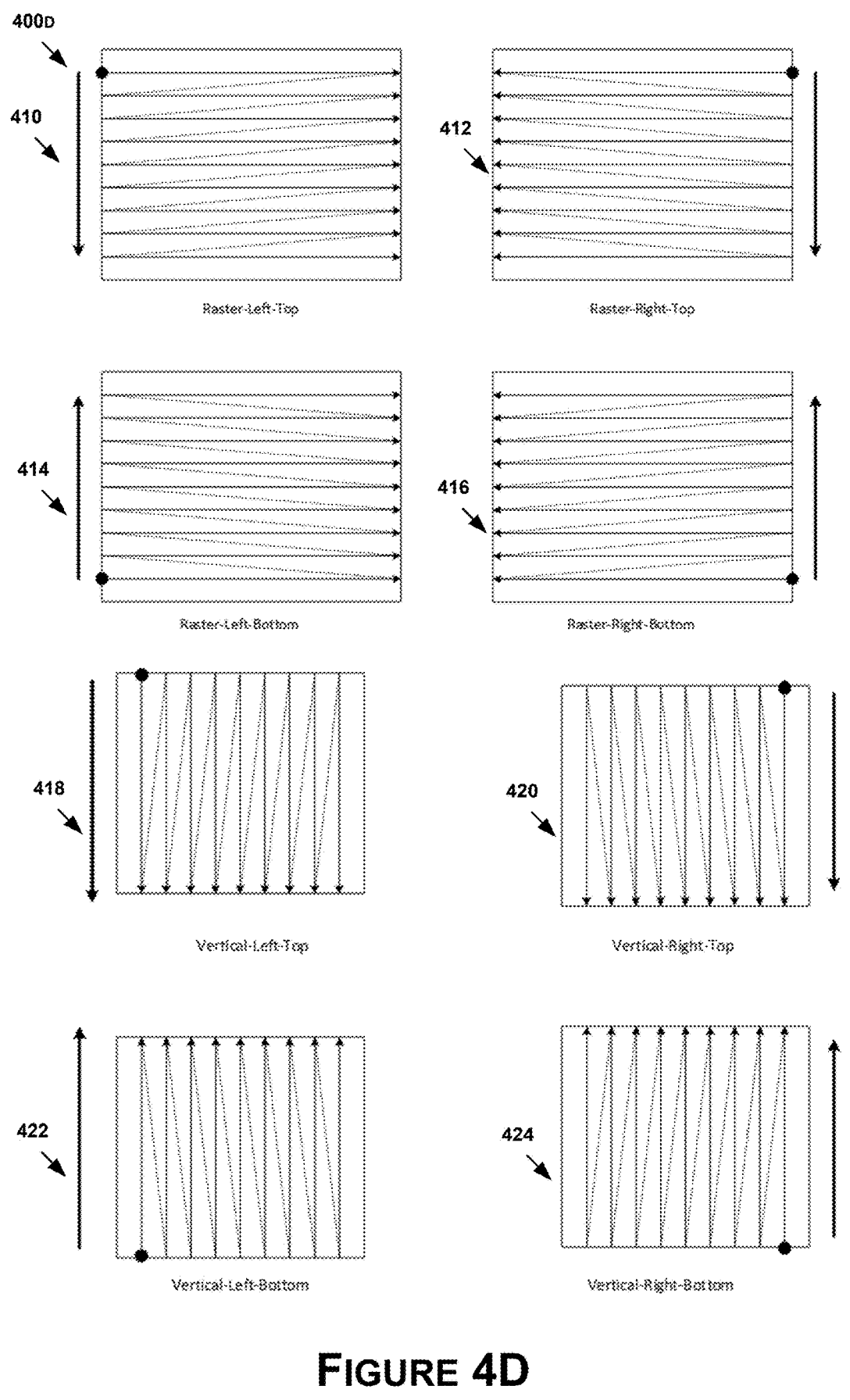

Raster-Left-Top

Raster-Right-Top

414

416

Raster-Left-Bottom

Raster-Right-Bottom

418

420

Vertical-Left-Top

Vertical-Right-Top

422

424

Vertical-Left-Bottom

Vertical-Right-Bottom

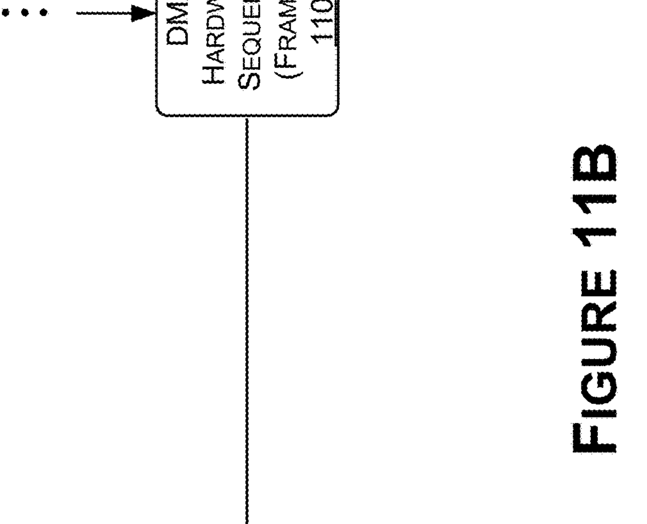
FIGURE 11B

FIGURE 15D
1576
SERVER(S) 1578
CPU 1580(A)
CPU 1580(B)
PCIE SWITCH 1582(A)
PCIE SWITCH 1582(B)
PCIE SWITCH 1582(C)
PCIE SWITCH 1582(D)
1586
GPU 1584(A)
GPU 1584(B)
GPU 1584(C)
GPU 1584(D)
GPU 1584(E)
GPU 1584(F)
GPU 1584(G)
GPU 1584(H)
1588
NETWORK(S) 1590
1592
1594
1500

DIRECT MEMORY ACCESS DATA TRANSFERS

BACKGROUND

Processing accelerators, including vector processing units (VPUs), can be used to perform single instruction, multiple data operations in parallel during operation of robotic systems such as, for example, automated operation of vehicles (e.g., semi-automated or fully-automated operation). These operations be implemented to allow computer vision-based applications such as image processing, signal processing, and/or the like. Conventional accelerators are constrained by system latencies such as those associated with reading and writing to memory in between and/or during performance of SIMD operations. In addition, conventional techniques for configuring operation of these accelerators, as well as devices supporting such accelerators such as those involved in performing direct memory access transfers) can be inefficient.

SUMMARY

Some embodiments of the present disclosure relate to systems and methods for processing data using accelerators in a system on a chip (SoC). In some examples, systems and methods are disclosed that involve implementing a pixel processing engine to process data using a two-dimensional (2D) array of processing engines. In contrast to conventional systems, such as those described above, the systems and methods described herein and the techniques implemented provide for the ability to process data independent of a common memory source and adjust the scale of the bit width that can be addressed in at least one dimension. This can reduce the effects of latencies associated with reading and writing to memory before, during, and after the data is processed. And math-to-memory ratios that would be limited by conventional systems can be mitigated (or even improved) as described herein.

Some embodiments of the present disclosure are related to implementation of DMA descriptors (also referred to as "descriptors") that are configured to link one or more different DMA transfers during execution for a given frame. For example, one type of descriptor can be configured to cause a VPU or pixel processing engine (PPE) to initiate DMA transfers that are performed continuously when streaming data (e.g., when coordinating DMA transfers involving frames corresponding to an image stream) by specifying an address where the VPU or PPE are to start streaming the data from in memory (e.g., VMEM or system memory), operations that the device(s) involved in the DMA transfers are to perform on the data (e.g., how to pad the frames), and/or the like. Another type of descriptor can be configured to cause the VPU or PPE to obtain data associated with a region of interest in one or more frames and can specify where in memory the VPU or PPE should read from to obtain one or more relevant tiles of the frame and the size of the tile(s) involved. And yet another type of descriptor can be configured to cause a DMA system to dynamically update how the data is read from memory, and how data is written back into memory. For example, in the case of object tracking, a region within a set of frames can change in response to movement of an object or agent represented in the frame, and the VPU or PPE can update (or cause the DMA system to update) descriptors to be used by the VPU, PPE or DMA system at successive time steps based on such movement (e.g., to maintain focus of the region on a given object or agent being tracked).

At least one aspect relates to one or more processors. The one or more processors can include one or more circuits to determine a first direct memory access (DMA) transfer associated with a first DMA transfer type based at least on generation of frame data associated with a frame obtained using at least one sensor. The frame data can be associated with a frame. The one or more circuits can be to determine at least one second DMA transfer associated with a second DMA transfer type based at least on the frame to be linked to the first DMA transfer. The one or more circuits can be to generate data associated with at least one descriptor based at least on linking the first DMA transfer and the at least one second DMA transfer. The one or more circuits can be to provide the data associated with the at least one descriptor to a DMA system. The data associated with the at least one descriptor can be configured to cause the DMA system to obtain the frame data associated with the frame from source memory in accordance with instructions represented by the at least one descriptor and store the frame data in destination memory.

In some implementations, the one or more circuits that determine the at least one second DMA transfer are to determine a sequence of DMA transfers to be performed using the DMA system based at least on the frame. The one or more circuits that generate the data associated with at least one descriptor can generate the data associated with the at least one descriptor to cause the DMA system to perform the DMA transfers based at least on an amount of DMA transfers represented by the sequence of DMA transfers.

In some implementations, the sequence of DMA transfers to be performed using the DMA system can be associated with at least one image processing operation. The one or more circuits that determine the at least one second DMA transfer can determine that a plurality of DMA transfers are to be performed based at least on the frame. In some implementations, the one or more circuits that provide the data associated with the at least one descriptor to the DMA system can provide an indication that the plurality of DMA transfers are not complete.

In some implementations, the plurality of DMA transfers can be associated with one or more of: a prediction operation, an object tracking operation, or a trajectory prediction operation. The one or more circuits can provide a second indication that a DMA transfer of the plurality of DMA transfers is a final DMA transfer to be performed for the descriptor. The descriptor can include a first descriptor and the one or more circuits can: determine a third DMA transfer based at least on generation of second frame data associated with a second frame obtained using the at least one sensor. In some implementations, the one or more circuits can determine at least one fourth DMA transfer based at least on the second frame. The one or more circuits can generate data associated with at least one second descriptor based at least on the third DMA transfer and the at least one fourth DMA transfer. In some implementations, the data associated with the at least one second descriptor can be configured to cause the DMA system to obtain the second frame data associated with the frame from source memory based at least on the at least one descriptor performing one or more operations in accordance with the descriptor.

In some implementations, the one or more circuits can provide the data associated with the at least one second descriptor to the DMA hardware sequencer. The data associated with the at least one second descriptor can configure the DMA system to perform the third DMA transfer and the at least one fourth DMA transfer as the first DMA transfer and the at least one second DMA transfer are performed by the DMA system.

In some implementations, the or more processors can be included in at least one of: a control system for an autonomous or semi-autonomous machine; a perception system for an autonomous or semi-autonomous machine; a system implemented using a robot; an aerial system; a medical system; a boating system; a smart area monitoring system; a system for performing deep learning operations; a system for performing simulation operations; a system for generating or presenting virtual reality (VR) content, augmented reality (AR) content, or mixed reality (MR) content; a system for performing digital twin operations; a system implemented using an edge device; a system incorporating one or more virtual machines (VMs); a system for generating synthetic data; a system implemented at least partially in a data center; a system for performing conversational artificial intelligence (AI) operations; a system for performing generative AI operations; a system implementing language models; a system for performing generative AI operations; a system for implementing vision language models (VLMs); a system implementing large language models (LLMs); a system for implementing multi-modal language models; a system for hosting one or more real-time streaming applications; a system for performing light transport simulation; a system for performing collaborative content creation for 3D assets; or a system implemented at least partially using cloud computing resources.

At least one aspect relates to a system. The system can include a direct memory access (DMA) system configured to perform one or more operations involved in one or more DMA transfers. In some implementations, the system can include at least one accelerator. The at least one accelerator can be configured to process data associated with one or more frames.

In some implementations, the at least one accelerator can include one or more circuits. The one or more circuits can determine a first DMA transfer associated with a first DMA transfer type based at least on generation of frame data associated with a frame as obtained using at least one sensor. The one or more circuits can determine at least one second DMA transfer associated with a second DMA transfer type based at least on the frame to be linked to the first DMA transfer. The one or more circuits can generate data associated with at least one descriptor based at least on the first DMA transfer and the at least one second DMA transfer. In some implementations, the one or more circuits can provide the data associated with the at least one descriptor to the DMA system, the data associated with the at least one descriptor configured to cause the DMA system to obtain the frame data associated with the frame from source memory based at least on the at least one descriptor and store the frame data in destination memory.

In some implementations, the one or more circuits of the accelerator that determine the at least one second DMA transfer can determine a sequence of DMA transfers to be performed by the DMA system based at least on the frame. The one or more circuits of the accelerator that generate the data associated with at least one descriptor can generate the data associated with the at least one descriptor to cause the DMA system to perform the DMA transfers based at least on an amount of DMA transfers represented by the sequence of DMA transfers. The sequence of DMA transfers to be performed by the DMA system cam be associated with at least one image processing operation.

In some implementations, the one or more circuits of the accelerator that determine the at least one second DMA transfer can determine that a plurality of DMA transfers are to be performed based at least on the frame. The one or more circuits of the accelerator that provide the data associated with the at least one descriptor to the DMA system can provide an indication that the plurality of DMA transfers are not complete. The plurality of DMA transfers can be associated with one or more of: a prediction operation, an object tracking operation, or a trajectory prediction operation.

In some implementations, the one or more circuits of the accelerator can provide a second indication that a DMA transfer of the plurality of DMA transfers is a final DMA transfer to be performed for the descriptor. In some implementations, the one or more circuits of the accelerator can determine a third direct memory access (DMA) transfer based at least on generation of second frame data generated by a sensor. The frame data can be associated with a second frame. The one or more circuits of the accelerator can determine at least one fourth DMA transfer based at least on the second frame; and generate data associated with at least one second descriptor based at least on the third DMA transfer and the at least one fourth DMA transfer. In some implementations, the data associated with the at least one second descriptor can be configured to cause the DMA system to obtain the second frame data associated with the frame from source memory based at least on the at least one descriptor performing one or more operations in accordance with the descriptor. In some implementations, the one or more circuits of the accelerator can provide the data associated with the at least one second descriptor to the DMA system to configure the DMA system to perform the third DMA transfer and the at least one fourth DMA transfer as the first DMA transfer and the at least one second DMA transfer are performed by the at least one device of the accelerator.

In some implementations, the at least one DMA system or the at least one accelerator are comprised in at least one of a control system for an autonomous or semi-autonomous machine; a perception system for an autonomous or semi-autonomous machine; a system implemented using a robot; an aerial system; a medical system; a boating system; a smart area monitoring system; a system for performing deep learning operations; a system for performing simulation operations; a system for generating or presenting virtual reality (VR) content, augmented reality (AR) content, or mixed reality (MR) content; a system for performing digital twin operations; a system implemented using an edge device; a system incorporating one or more virtual machines (VMs); a system for generating synthetic data; a system implemented at least partially in a data center; a system for performing conversational artificial intelligence (AI) operations; a system for performing generative AI operations; a system implementing language models; a system for performing generative AI operations; a system for implementing vision language models (VLMs); a system for implementing large language models (LLMs); a system for implementing multi-modal language models; a system for hosting one or more real-time streaming applications; a system for performing light transport simulation; a system for performing collaborative content creation for 3D assets; or a system implemented at least partially using cloud computing resources.

At least one aspect relates to a method. The method can include determining a first direct memory access (DMA) transfer associated with a first DMA transfer type based at least on generation of frame data generated by a sensor, the frame data associated with a frame. In some implementations, the method can include determining at least one second DMA transfer associated with a second DMA transfer type based at least on the frame to be linked to the first DMA transfer. The method can include generating data associated with at least one descriptor based at least on the first DMA transfer and the at least one second DMA transfer. In some implementations, the method can include providing the data associated with the at least one descriptor to device, the data associated with the at least one descriptor configured to cause the device to obtain the frame data associated with the frame from source memory based at least on the at least one descriptor and store the frame data in destination memory.

In some implementations, determining the at least one second DMA transfer includes determining a sequence of DMA transfers to be performed by the device based at least on the frame. Generating the data associated with at least one descriptor can include generating the data associated with the at least one descriptor to cause the device to perform the DMA transfers based at least on an amount of DMA transfers represented by the sequence of DMA transfers.

BRIEF DESCRIPTION OF THE DRAWINGS

The Present Systems and Methods for Processing Data Using One or More Systems-On-a-Chip (SoCs) and/or Other Processing Hardware are Described in Detail Below with Reference to the Attached Drawing Figures, Wherein:

FIGS. 4A-4C are example frame formats, in accordance with some embodiments of the present disclosure;

FIG. 4D is an example set of tile sequence orders, in accordance with some embodiments of the present disclosure;

FIGS. 11A-11C are example sequences of frame transfers using accelerators, in accordance with some embodiments of the present disclosure;

DETAILED DESCRIPTION

Figure 1A:
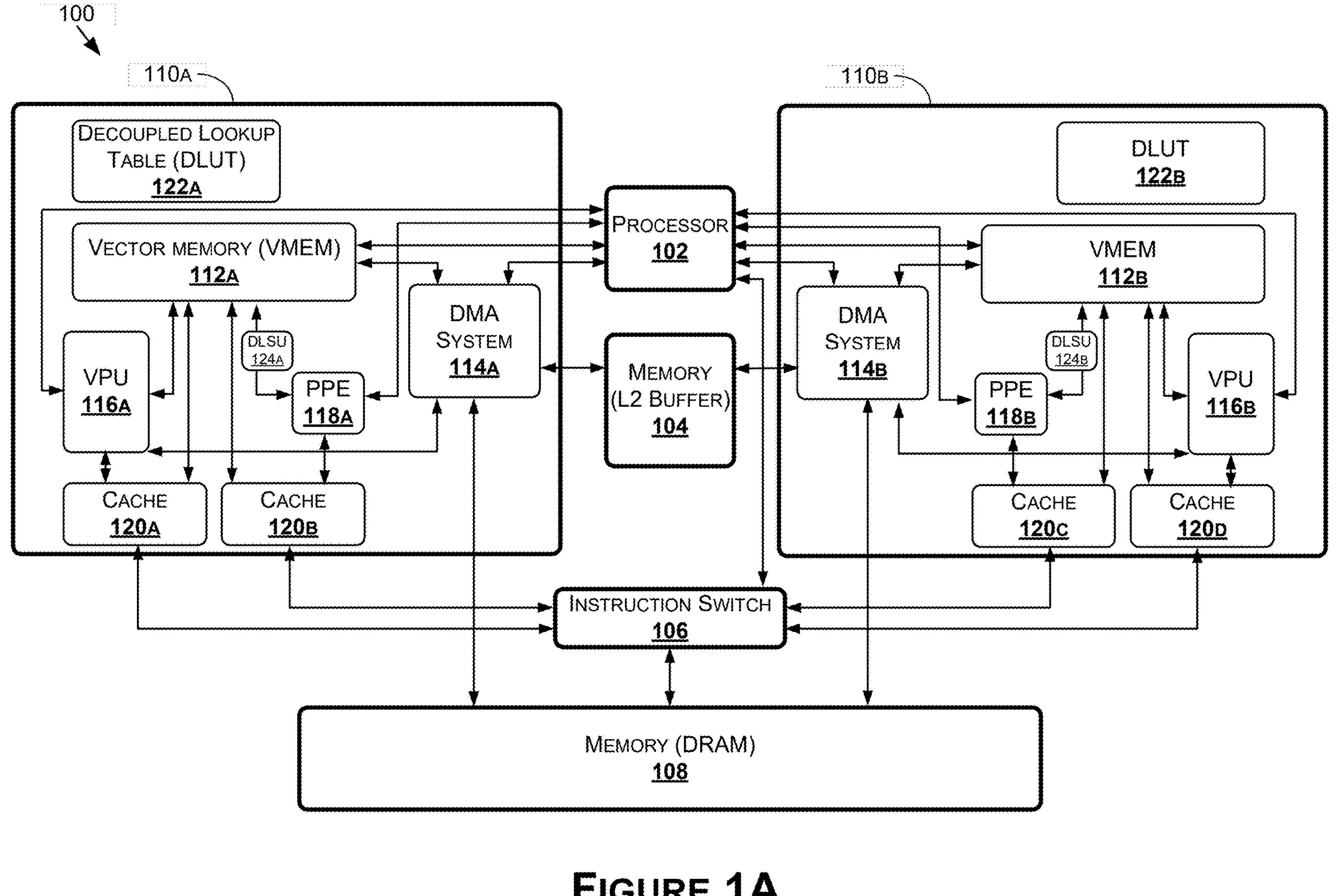
FIG. 1A is an example computing environment in which one or more devices operate to process data using a system-on-a-chip (SoC), in accordance with some embodiments of the present disclosure.

Systems and methods are disclosed related to various components of one or more SoCs and techniques using one or more components of the one or more SoCs. Some embodiments described herein involve a pixel processing engine (PPE) and/or a direct memory access (DMA) system (e.g., including a DMA hardware sequencer) and can be described with respect to an example autonomous or semi-autonomous vehicle or machine 1500 (alternatively referred to herein as "vehicle 1500," "ego-vehicle 1500," "machine 1500," or "ego-machine 1500," an example of which is described with respect to FIGS. 15A-15D), which is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to computer vision, machine learning, artificial intelligence, image processing, and/or the like, this is not intended to be limiting, and the systems and methods described herein may be used in augmented reality, virtual reality, mixed reality, robotics, security and surveillance, autonomous or semi-autonomous machine applications, and/or any other technology spaces where a vector processing unit (VPU), a DMA system (e.g., a DMA hardware sequencer), an instruction set architecture (ISA), a programmable vision accelerator (PVA), a decoupled accelerator, a decoupled lookup table (DLUT) accelerator, a hardware sequencer, a single input multiple data (SIMD) architecture, and/or a one or more other components of one or more SoCs may be used. Although the components and associated processes described herein may be described with respect one or more SoCs, this is not intended to be limiting, and these components may be implemented as standalone components, as discrete components of a system, and/or as integrated components of a device. In some embodiments, systems, components, features, functionality, and/or methods of the present disclosure may be integrated into example autonomous vehicle 1500 of FIGS. 15A-15D, example computing device 1600 of FIG. 16, and/or example data center 1700 of FIG. 17.

Hardware Accelerators Implemented by an SOC

Single instruction, multiple data (SIMD) processors can be included in hardware accelerators such as NVIDIA's Programmable Vision Accelerator (PVA) to enable image and video processing pipelines involved in real-time operation of robotic systems. Specifically, accelerators can implement computationally-intense portions of image and video processing pipelines and enable functions such as image filtering, feature extraction, object detection, image segmentation, and so on. This hardware architecture is able to meet the increasing demands for faster and more efficient hardware and provide complex processing pipelines developed for vision-based industries such as the automated vehicle and robotics industries.

As algorithms implemented by these video processing pipelines continue to increase in complexity, certain bottlenecks in conventional hardware implementations can begin to limit the efficiency of such processing pipelines. In one example, the bit width of an accelerator can be constrained by the bit width of a local data memory (e.g., a local memory of the SIMD). This constraint on memory throughput can result in limits to math-to-memory ratios associated with other systems within the accelerator. A math-to-memory ratio measures the relative bandwidth of a given system's arithmetic logic unit (ALU) as compared to the system's memory access bandwidth. As an example, an accelerator can have two vector units (each having a 384-bit or 784-bit processing bit width) and 3 memory units (each supporting 512 bits of read/write capabilities). The 1.5× math-to-memory ratio (784/512) can support dynamic range expansion in generating data associated with intermediate values, but the vector processing bit width cannot be increased without a corresponding increase in memory bit width of the memory units. Conventional approaches to addressing bandwidth bottlenecks generally involve redesigning the hardware architecture to have larger bit widths, often resulting in increased energy consumption which can be extremely burdensome for a variety of applications, such as vehicle automation capabilities (particularly when automating electric vehicles).

Systems and methods described herein relate to system architectures and control of architectures that enable the scaling of fixed arrays of processing elements (PEs) involved in processing images and video (e.g., in a pixel processing engine) and address inputs of varying size without scaling the bit width of the local data memory. More specifically, the present disclosure describes a system including a plurality of PEs in a PPE that are operatively coupled with one another. The system also includes a control system to determine a processing engine configuration representing connections between the plurality of Pes, determine a size of an input to the system, and divide the input into a plurality of sub-inputs to be processed by the array of PEs. The divided inputs can then be loaded into (e.g., across) the PEs to cause the PEs to perform operations involved in the above-noted processing pipelines.

When implemented, the disclosed system architecture and control techniques allow scaling of inputs to the architecture as needed to support increasingly demanding algorithms implemented by these image and video processing pipelines. More specifically, by subdividing data to be operated on across multiple PEs, the data can be read or written into the PEs based at least on the size of the input data (e.g., corresponding to the size of the input vector defined for a given algorithm) in accordance with the fixed bit width associated with each row of PEs, and portions of the input data can be processed simultaneously. This can relax the constraints to the PVA associated with the bit width of the PVA's local memory. The presently-disclosed PPE configuration and disclosed techniques also reduce or eliminate the need for intermediate reads and/or writes from memory outside of the accelerator, reducing or eliminating the effects of bottlenecks present when loading/storing data before, during, and after processing the data and the corresponding power consumption involved in managing and moving the data as conventionally needed.

FIG. 1A is an example computing environment (referred to as environment 100) in which one or more devices operate to process data using a SoC, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1500 of FIGS. 15A-15D, example computing device 1600 of FIG. 16, and/or example data center 1700 of FIG. 17.

The environment 100 can include processor 102, memory 104, instruction switch 106, memory 108 (sometimes referred to as dynamic random access memory (DRAM)), and functional blocks 110*a*, 110*b* (referred to individually as functional block 110 and collectively as functional blocks 110 unless otherwise specified). In some embodiments, the processor 102, memory 104, instruction switch 106, memory 108, and functional blocks 110 can interconnect (e.g., establish a connection to communicate and/or the like) via wired and/or wireless connections. In some embodiments, the components of the environment 100 can be included in a system on a chip (SoC). For example, the components of the environment 100 can be included in one or more SoCs that form integrated circuits by combining some or all of the component of the environment 100.

The processor 102 can include one or more processors such as one or more central processing units (CPUs), graphical processing units (GPUs), microprocessors, microcontrollers, and/or the like. In some embodiments, the processor 102 can include a controller (referred to as a PVA controller) where the environment 100 corresponds to the PVA. The processor 102 can interconnect with an instruction cache (not explicitly shown) that stores instructions for the processor 102 to execute. In some embodiments, the processor 102 can be configured to output data associated with configuration and/or control of one or more of the devices of FIG. 1A. For example, the processor 102 can be configured to output data associated with configuration of a DMA system 114*a* and/or DMA system 114*b* (sometimes referred to as DMA hardware sequencers) to control DMA transfers to and/or from vector memory (VMEM) 112*a* and/or VMEM 112*b* of functional block 110*a* and functional block 110*b*, respectively.

The memory 104 (sometimes referred to as an L2 buffer or L2 cache) can include a storage device that is interconnected with the DMA system 114*a* and/or the DMA system 114*b* of the functional blocks 110. In some embodiments, the memory 104 can be configured to receive and store data from the DMA system 114*a* and/or the DMA system 114*b* of the functional blocks 110 as described herein. In some embodiments, the memory 104 can have one or more (e.g., 2) banks that enable simultaneous read or write requests. For example, the memory 104 can have a first bank that is associated with the DMA system 114*a* and a second bank that is associated with the DMA system 114*b*. In some embodiments, the memory 104 can enable cross-communication between the DMA system 114*a* and the DMA system 114*b* by providing access each of the DMA systems with access to both banks.

The instruction switch 106 can include one or more processors that are configured to scan the memory 108, receive data from the memory 108, cause data stored in the memory 108 and/or in local memory to the instruction switch 106 to be loaded into the VMEM 112, and/or the like. For example, the instruction switch 106 can be coupled to the memory 108 and/or include internal memory that has stored thereon instructions involved in operating one or more of the devices of the corresponding functional blocks 110. In an example, the instruction switch 106 can be configured to obtain and provide data associated with instructions to perform one or more DMA transfers as described herein. In another example, the instruction switch 106 can be configured to obtain and provide data associated with instructions to perform one or more operations specific to one or more devices of the functional blocks 110. In an example, the instruction switch 106 can be configured to obtain and provide data associated with instructions to perform one or more filtering operations (e.g., finite impulse response (FIR) filtering, min/max filtering, 3×3 filtering, 5×5 filtering, 7×7 filtering, and/or the like) and the instruction switch 106 can transmit the data to caches 120 of corresponding functional blocks 110. In this example, the corresponding caches 120 can be configured to transmit (e.g., load) the data associated with the instructions into the VPU 116 or PPE 118 to cause (e.g., perform) the respective device to perform the one or more filtering operations. In some embodiments, the instruction switch 106 can be configured to obtain data from the memory 104 in addition to the memory 108 (e.g., system memory). By obtaining the data from the memory 104 and the memory 108, the instruction switch 106 can reduce an instruction cache miss penalty (e.g., bringing down the amount of time associated with a miss from 100 cycles to 10 cycles).

The memory 108 can include a storage device that is interconnected with the DMA system 114*a* and/or the DMA system 114*b* of the functional blocks 110. In some embodiments, the memory 108 can receive and store sensor data generated by one or more sensors of a robot such as, for example, the example autonomous vehicle 1500 of FIGS. 15A-15D. For example, during operation of the robot, the memory 108 can be configured to receive data based at least on a direct interconnection with the one or more sensors or an indirect interconnection with the one or more sensors (e.g., via communication through a CAN bus and/or the like). In these examples, the sensor data can include image data associated with one or more images generated or obtained using the one or more cameras, LiDAR data associated with one or more point clouds generated by one or more LiDAR sensors, radar data associated with one or more radar images generated by one or more radar sensors, and/or the like. In some embodiments, the memory 108 can be configured to provide (e.g., transmit) the sensor data stored therein to one or more components of the functional blocks 110. For example, during processing of the one or more image generated by the one or more cameras of the robot and/or other machine, the DMA system 114*a* and/or DMA system 114*b* can obtain the image data from the memory 108 and cause the image data to be stored in the VMEM 112*a* and/or VMEM 112*b*, respectively. In some embodiments, the memory 108 can receive and store data from the DMA system 114*a* and/or the DMA system 114*b* of the functional blocks 110. For example, the DMA system 114*a* and/or DMA system 114*b* can provide image data that was updated based at least on the processing of the image data to the memory 108 and the memory 108 can store the image data that was updated in the memory 108.

Functional blocks 110 can include VMEMs 112*a*, 112*b*; DMA systems 114*a*, 114*b*; vector processing units (VPUs) 116*a*, 116*b* (alternatively referred to as vision processing units); pixel processing engines (PPEs) 118*a*, 118*b*; caches 120*a*, 120*b*, 120*c*, 120*d*; and decoupled lookup tables (DLUTs) 122*a*, 122*b* (and/or other decoupled accelerators). For purposes of clarity, each will be referred to individually as VMEM 112, DMA system 114, VPU 116, PPE 118, cache 120, and DLUT 122, and collectively as VMEMs 112, DMA systems 114, VPUs 116, PPEs 118, caches 120, and DLUTs 122 unless otherwise specified. While certain interconnections are illustrated, it will be understood that the connections illustrated are for simplicity and that one or more of the devices of the functional blocks 110 can interconnect with one or more other devices of the functional blocks 110 unless expressly stated otherwise.

The VMEMs 112 can include a storage device that is interconnected with the processor 102 and the respective DMA systems 114, VPUs 116, PPEs 118, and caches 120 of the functional blocks 110. In some embodiments, the VMEMs 112 can receive and store the sensor data obtained from the memory 108. For example, the VMEMs 112 can receive and store the sensor data obtained from the memory 108 by the DMA systems 114. Additionally, or alternatively, VMEMs 112 can receive and store the sensor data obtained from the memory 108 based on instructions provided by the instruction switch 106. In some embodiments, the VMEMs 112 can interconnect with the PPEs 118 via decoupled load/store units (DLSUs) 124. As described herein, the DLSUs 124 can be configured to buffer data communicated between the VMEMs 112 and the PPEs 118 to manage latencies associated with communication between the VMEMs 112 and the PPEs 118 such that any latencies do not lead to a reduction in processing speed or stalling of the PPEs.

The DMA systems 114 can include one or more processors that control the execution of one or more instructions. For example, the DMA systems 114 can receive instructions from the processor 102, the respective VPUs 116 or PPEs 118, and/or a storage device (e.g., a device associated with the DMA systems 114 such as internal or external memory; not explicitly shown) and the DMA systems 114 can coordinate with the respective VPUs 116 and/or the PPEs 118 to perform one or more operations during execution of the instructions. In one example, the DMA systems 114 can receive instructions that cause the DMA systems 114 to obtain data (e.g., sensor data and/or the like) from the memory 108 and store the data in the respective VMEMs 112. In some embodiments, the DMA systems 114 can perform one or more operations based at least on the data obtained from the memory 108. For example, the DMA systems 114 can pad frames (e.g., image frames), manipulate addresses, manage overlapping data, manage different traversal orders, account for different frame sizes, and/or the like. In some embodiments, the DMA systems 114 can receive signals (e.g., from the VPUs 116 or PPEs 118) indicating that one or more operations were performed on the data stored in the VMEMs 112, update one or more descriptors based at least on the updates to the data, and again perform operations on the data.

The VPUs 116 can include one or more processors that execute one or more instructions. For example, the VPUs 116 can receive instructions from the processor 102 and the respective VPUs 116 can coordinate with the DMA systems 114 and/or PPEs 118 to perform the one or more operations during execution of the instructions. In one example, the VPUs 116 can receive instructions from the processor 102 that cause the VPUs 116 to trigger respective DMA systems 114 to obtain sensor data from the memory 108 and store the sensor data in the respective VMEMs 112. In examples, the VPUs 116 can process the data stored in the respective VMEMs 112 and write data back to the VMEMs 112. In these examples, the data written by the VPUs 116 into respective VMEMs 112 can include updated sensor data and/or data generated based at least on analysis performed by the VPUs 116 on the sensor data, including object or feature locations within a frame, a classification indicating a type of an object or agent, and/or the like. In some embodiments, the VPUs 116 can send a signal to the respective DMA systems 114 to cause the DMA systems 114 to update one or more descriptors (described herein). For example, the VPUs 116 can send a signal to the respective DMA systems 114 to cause the DMA systems 114 to update one or more descriptors based at least on the data written by the VPUs 116 to the respective VMEMs 112.

The PPEs 118 can include one or more processors that execute one or more instructions. For example, the PPEs 118 can receive instructions from the processor 102 and the respective PPEs 118 can coordinate with the DMA systems 114 and/or VPUs 116 to perform the one or more operations during execution of the instructions. In one example, the PPEs 118 can receive instructions from the processor 102 that cause the PPEs 118 to trigger respective DMA systems 114 to obtain sensor data from the memory 108 and store the sensor data in the respective VMEMs 112. In some examples, the PPEs 118 can process the data stored in the respective VMEMs 112 and write data back to the VMEMs 112. In these examples, the data written by the PPEs 118 into respective VMEMs 112 can include updated sensor data and/or data generated based at least on analysis performed by the PPEs 118 on the sensor data, including object or feature locations within a frame, a classification indicating a type of an object or agent, and/or the like. In some embodiments, the PPEs 118 can send a signal to the respective DMA systems 114 to cause the DMA systems 114 to update one or more descriptors (described herein). For example, the PPEs 118 can send a signal to the respective DMA systems 114 to cause the DMA systems 114 to update one or more descriptors based at least on the data written by the PPEs 118 to the respective VMEMs 112. In some embodiments, the PPEs 118 can be the same as, or similar to, the PPE 140 of FIG. 1B.

The caches 120 can include a storage device that is interconnected with the VMEMs 112 and/or the instruction switch 106. As noted above, the caches 120 can receive data associated with instructions from the instruction switch 106 and load the instructions into one or more devices of the functional blocks 110 to cause the one or more devices to operate in accordance with the instructions.

The DLUTs 122 can include a processor and/or memory configured to store one or more lookup tables. In some embodiments, the DLUTs 122 can be configured to enable communication between the processor 102 and one or more components of the functional blocks 110. For example, the DLUTs 122 can be configured to be in communication with the processor 102 and/or one or more memory devices of FIG. 1A (e.g., the memory 108 and/or the memory 104). The DLUT 122 can then manage the data storage and retrieval process between the processor 102 and the one or more memory devices of FIG. 1A. Additional details regarding a DLUT are included in U.S. patent application Ser. No. 17/391,491 filed on Apr. 2, 2021, the contents of which are hereby incorporated by reference in their entirety.

The DLSUs 124 can include a storage device that is interconnected with the VMEMs 112 and PPEs 118 of a given functional block 110. For example, the DLSUs 124 can receive and store the sensor data obtained by the VMEMs 112 from the memory 108. Additionally, or alternatively, the DLSUs 124 can receive and store the data provided as an output by the PPEs 118.

Figure 1B:
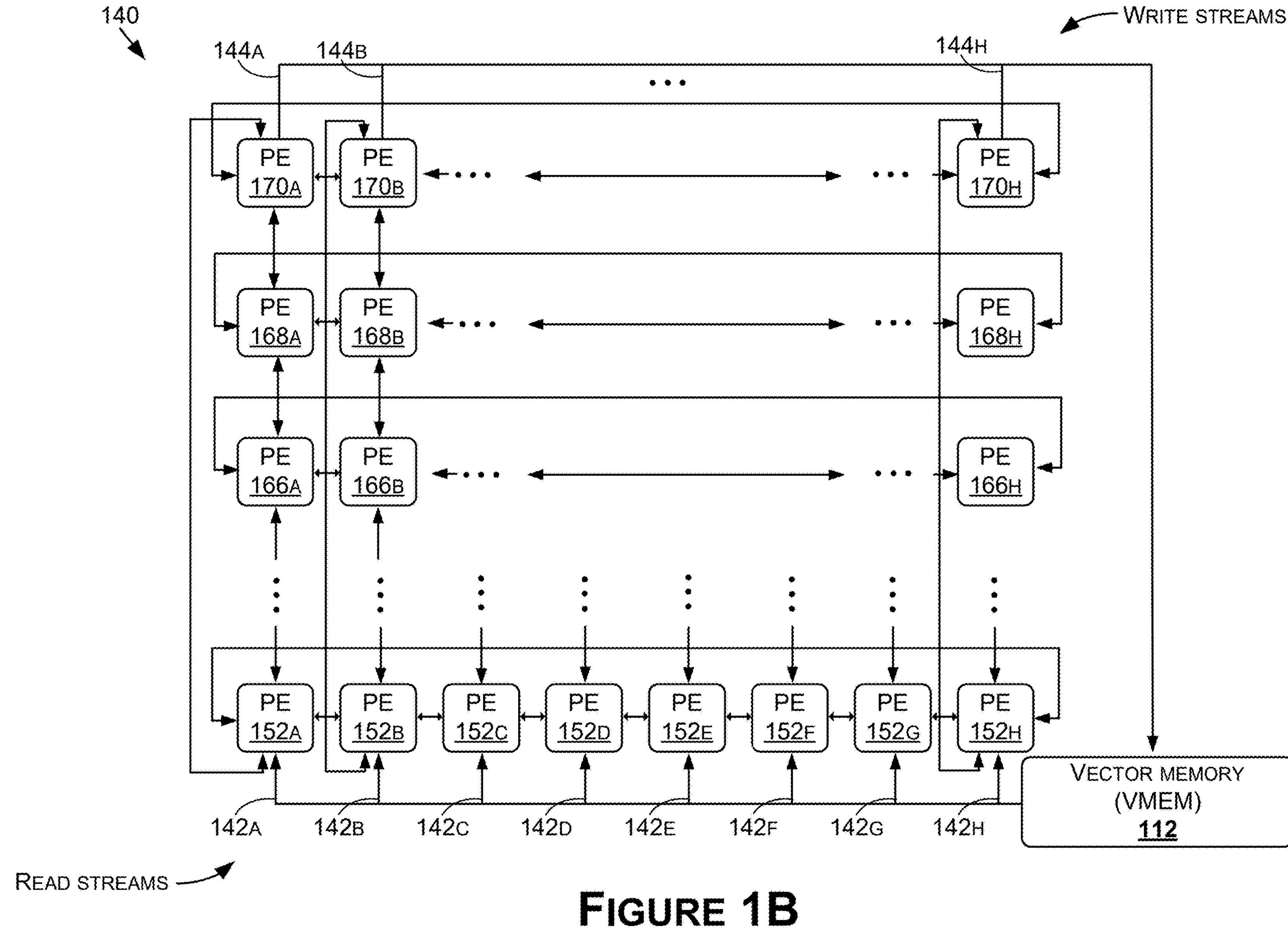
FIG. 1B is an example diagram of a pixel processing engine (PPE), in accordance with some embodiments of the present disclosure.

FIG. 1B is an example PPE 140, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1500 of FIGS. 15A-15D, example computing device 1600 of FIG. 16, and/or example data center 1700 of FIG. 17.

The PPE 140 can be the same as, or similar to, the PPEs 118 of FIG. 1A. In some embodiments, the PPE 140 can include an array of processing elements (PEs). For example, the PPE 140 can include PEs 152*a*-170*h*. As illustrated by FIG. 1B, the PPE 140 includes PEs 152*a*-170*h*, where each PE 152*a*-170*h* is associated with a given row and a given column. In some embodiments, each PE 152*a*-170*h* can be associated with one row and one column. For example, PE 152*a* can be associated with a first row and a first column, PE 152*b* can be associated with the first row and a second column, PE 152*c* can be associated with the first row and a third column, and so on. In some examples, PE 166*a* can be associated with an eighth row and the first column, PE 168*a* can be associated with a ninth row and the first column, and PE 170*a* can be associated with a tenth row and the first column. In this way, the PEs 152*a*-170*h* can be arranged in an 8×10 array. It will be understood that the array of PEs 152*a*-170*h* formed by the PPE 140 of FIG. 1B is a non-limiting example, and that various arrays can be formed through various arrangements of PEs 152*a*-170*h* in a PPE 140. For example, the PPE 140 can be updated to include a different number of PEs in each column and/or each row.

In some embodiments, each PE 152*a*-170*h* can include one or more devices that enable each PE 152*a*-170*h* to perform one or more operations. For example, each PE 152*a*-170*h* can include one or more arithmetic logic units (ALUs), special function units (SFUs), load/store units (LSUs), registers, control units, and/or the like. In some embodiments, the PEs 152*a*-170*h* can be the same as, or similar to, the PE 170 of FIG. 1C.

In some embodiments, the PEs in the first row of PEs (PEs 152*a*-152*h*) can interconnect with a VMEM 112. For example, each PE of the first row of PEs 152*a*-152*h* can interconnect via corresponding connections 142*a*-142*h* with the VMEM 112. In an example, each PE of the first row of PEs 152*a*-152*h* can interconnect via the corresponding connections 142*a*-142*h* to enable each PE of the first row of PEs 152*a*-152*h* to establish read streams with the VMEM 112. The read streams can be associated with the transfer of data from the VMEM 112 to the corresponding PEs of the first row of PEs 152*a*-152*h*.

In some embodiments, the PEs in the first column of PEs (PEs 152*a*-170*a*) can interconnect with a VMEM 112 (such interconnection not explicitly shown). For example, each PE of the first column of PEs 152*a*-170*a* can interconnect via corresponding connections with the VMEM 112. In an example, each PE of the first column of PEs 152*a*-170*a* can interconnect via the corresponding connections to enable each PE of the first column of PEs 152*a*-170*a* to establish communication connections with the VMEM 112. In some embodiments, similar to the first column of PEs 152*a*-170*a*, the PEs in the last column of PEs (PEs 152*h*-170*h*) can interconnect with the VMEM 112 (such interconnection not explicitly shown). For example, each PE of the last column of PEs 152*h*-170*h* can interconnect via corresponding connections with the VMEM 112. In an example, each PE of the last column of PEs 152*h*-170*h* can interconnect via the corresponding connections to enable each PE of the last column of PEs 152*h*-170*h* to establish communication connections with the VMEM 112. In these examples where the first column of PEs 152*h*-170*h* and last column of PEs 152*h*-170*h* interconnect with the VMEM 112 to establish communication connections, such communication connections can be used by the respective PEs to enable the PEs to request and receive data. As described herein, in an example where each PE corresponds to one or more pixels of an image, the PEs of the first column of PEs can communicate with the VMEM 112 to obtain data associated with adjacent pixels (not initially loaded into the PPE 140) to perform one or more operations (e.g., filtering and/or the like) based at least on the data associated with the adjacent pixels.

In some embodiments, the first row of PEs 152*a*-152*h* can interconnect with one or more other PEs 152*a*-170*h* in the PPE 140. For example, each PE of the PEs 152*a*-170*h* can interconnect with one or more other PEs 152*a*-170*h* in accordance with predefined connection sets. Each connection set can predefine the relative position of the one or more other PEs 152*a*-170*h* with which a given PE of the PEs 152*a*-170*h* interconnects when transferring or receiving data to or from, respectively. In one example, the PE 152*a* can interconnect with PE 154*a* (not explicitly illustrated), PE 152*b*, PE 170*a*, and PE 152*h*. In this example, the PE 152*a* connects with four separate PEs 162*a* (located above, or "north", relative to PE 152*a*), PE 152*b* (located to the right, or "east", relative to PE 152*a*), PE 170*a* (located downward, or "south", relative to PE 152*a*), and PE 152*h* (located left, or "west", relative to PE 152*a*) to establish communication connections with the PEs. In this particular example, the PEs located south and west of the PE 152*a* are associated with connections that wrap around the PPE 140.

In some embodiments, the PEs in the last (as illustrated, tenth) row of PEs (PEs 170*a*-170*h*) in the PPE 140 can interconnect with the VMEM 112. For example, each PE of the last row of PEs 152*a*-152*h* can interconnect via corresponding connections 144*a*-144*h* with the VMEM 112. In an example, each PE of the last row of PEs 170*a*-170*h* can interconnect via the corresponding connections 144*a*-144*h* to enable each PE of the last row of PEs 170*a*-170*h* to establish write streams with the VMEM 112. The write streams can be associated with the transfer of data from the corresponding PEs 170*a*-170*h* to the VMEM 112.

In some embodiments, one or more PEs can interconnect via one or more wrap-around connections with one or more other PEs of the PEs 152*a*-170*h* For example, each PE in the first column of PEs (e.g., PEs 152*a*, 154*a*, 156*a*, 158*a*, 160*a*, 162*a*, 164*a*, 166*a*, 168*a*, 170*a*, referred to collectively as PEs 152*a*-170*a*) can interconnect with corresponding PEs in the last column of PEs (e.g., PEs 152*h*, 154*h*, 156*h*, 158*h*, 160*h*, 162*h*, 164*h*, 166*h*, 168*h*, 170*h*, referred to collectively as PEs 152*h*-170*h*). In another example, each PE in the first row of PEs (e.g., PEs 152*a*, 152*b*, 152*c*, 152*d*, 152*e*, 152*f*, 152*g*, 152*h*, referred to collectively as PEs 152*a*-152*h*), can interconnect via a wrap-around connection with corresponding PEs in the last row of PEs (e.g., PEs 170*a*, 170*b*, 170*c*, 170*d*, 170*e*, 170*f*, 170*g*, 170*h*, referred to collectively as PEs 170*a*-170*h*).

In some embodiments, one or more of the PEs 152*a*-170*h* can interconnect with a PE controller (not explicitly illustrated). For example, one or more of the PEs can interconnect with a PE controller to enable communication of instructions between the PEs 152*a*-170*h*. In some embodiments, the one or more PEs 152*a*-170*h* can interconnected directly via dedicated connections between the PE controller and the one or more PEs 152*a*-170*h*. As an example, when the PE controller is connected to each PE of the one or more PEs 152*a*-170*h*, the PE controller can establish a one-to-all connection set with the PEs 152*a*-170*h*. In this example, the PE controller can transmit instructions associated with loading the PPE 140 as described herein to cause each PE 152*a*-170*h* to read in the data initially from the read streams 142*a*-142*h* and through the PPE 140. In some embodiments, once data from the read streams is loaded into respective PEs of the plurality of PEs 152*a*-170*h*, the PE controller can transmit instructions to each PE of the plurality of PEs 152*a*-170*h* to perform one or more inter-PE data transfers. In an example, the PE controller can send a "Shift North" instruction that causes each PE of the one or more PEs 152*a*-170*h* to shift data stored in at least one register of each PE to a PE that is located north of (e.g., above) that PE. As an example, the "Shift North" instruction can cause PE 152*a* to shift data in a first register of PE 152 north to PE 154*a*.

The PEs 152*a*-170*h* can include rows of PEs that each have a predetermined bit width. In one example, each PE can have a 48-bit width and can support lane, two lanes (each at 24 bits), and so on. The bit width of each PE of the PEs 152*a*-170*h* can be scaled consistently across the PEs 152*a*-170*h* as is appropriate for a given implementation. In some embodiments, the PEs 152*a*-170*h* can also include one or more vector instruction slots to enable execution of multiple vector math instructions in a given set of time steps. In the example illustrated in FIG. 1B, the PEs 152*a*-170*h* form a PPE 140 that is 8 PEs wide and 10 PEs tall, where the rows correspond to the width of the PPE 140 and the columns correspond to the height of the PPE 140. In this example, each of the PEs 152*a*-170*h* can have a 48 bit processing width, and an overall width dimension of 384 bits, which is comparable with 512 bits of data memory bit width. By virtue of the two-dimensional structure of the PPE 140, the bit width is then multiplied by the height (in this example, 10 PEs) providing a total of 3840 bits of processing width.

Figure 1C:
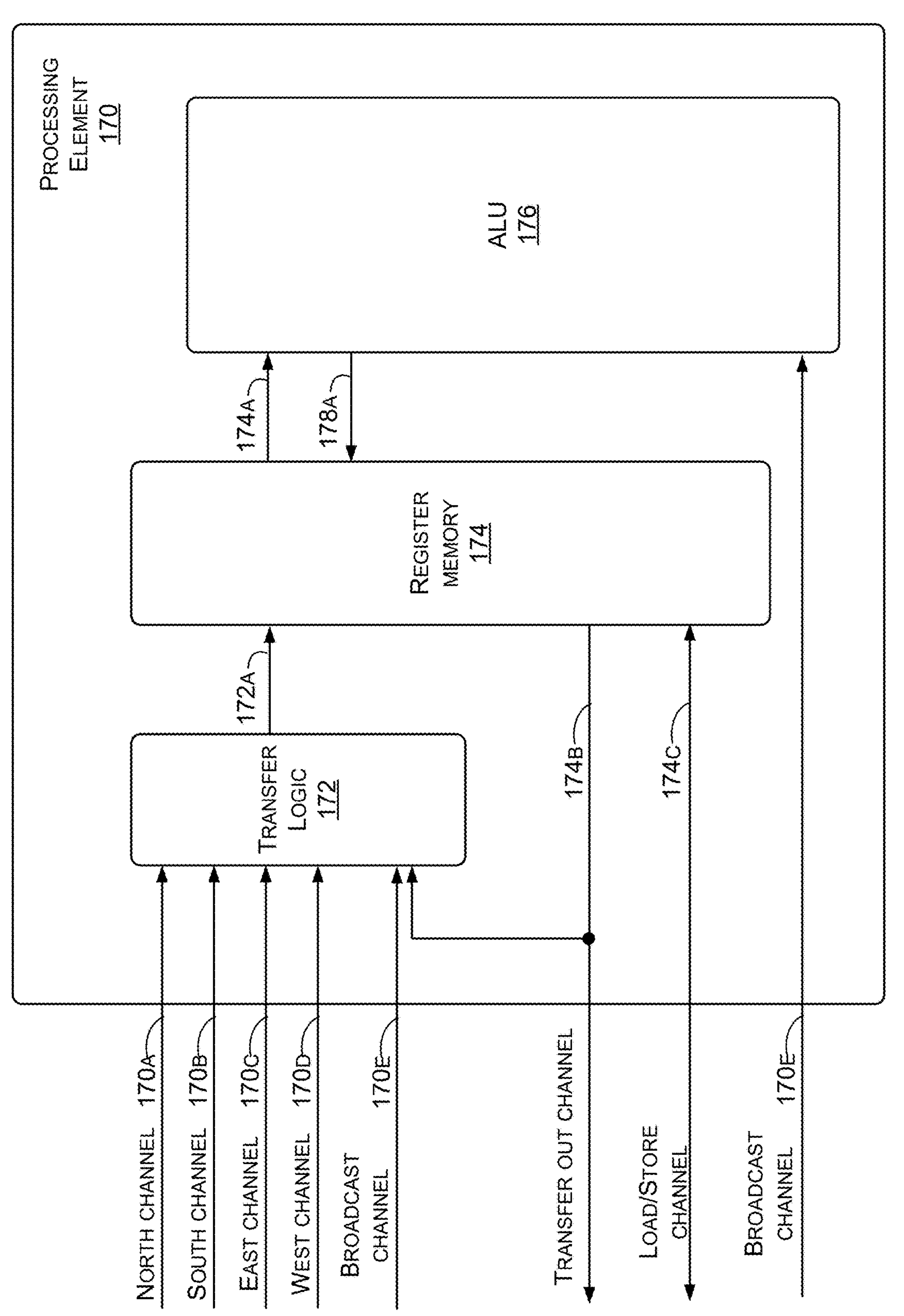
FIG. 1C is an example diagram of a processing element (PE) of a PPE, in accordance with some embodiments of the present disclosure.

FIG. 1C is an example processing element (PE) 170, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1500 of FIGS. 15A-15D, example computing device 1600 of FIG. 16, and/or example data center 1700 of FIG. 17.

The PE 170 can be the same as, or similar to, the PEs 152*a*-170*h* of FIG. 1B. As illustrated, the PE 170 includes transfer logic 172, register memory 174 (sometimes referred to as vector register files), and arithmetic logic unit (ALU) 176. In some embodiments, the PE 170 can interconnect with one or more other PEs. For example, the PE 170 can interconnect with one or more other PEs that are located north, south, east, and west of the PE 170 as part of a PPE (e.g., a PPE that is the same as, or similar to, the PPE 140 of FIG. 1B).

The transfer logic 172 can include one or more circuits that receive and/or transmit data as described herein. For example, the transfer logic 172 can include one or more circuits that are configured to receive data from one or more neighboring PEs via channels 170*a*-170*d*. In some embodiments, a north channel 170*a* can be configured to communicate data transmitted by a PE that is positioned north within a PPE relative to the PE 170; a south channel 170*b* can be configured to communicate data transmitted by a PE that is positioned south within a PPE relative to the PE 170; an east channel 170*c* can be configured to communicate data transmitted by a PE that is positioned north within a PPE relative to the PE 170; and a west channel 170*d* can be configured to communicate data transmitted by a PE that is positioned west within a PPE relative to the PE 170. In some embodiments, the one or more circuits of the transfer logic 172 can determine that data is received via respective channels 170*a*-170*d* and cause the data received to be stored in corresponding registers within register memory 174.

The register memory 174 can include one or more register files. In some embodiments, the register memory 174 can be configured to interconnect with the transfer logic 172 to receive data via an input channel 172*a*. In some embodiments, the register memory 174 can be configured to interconnect with one or more other PEs and/or the transfer logic 172 to transmit data via an output channel 174*b*. In embodiments, the register memory 174 can be configured to interconnect with a DLSU (e.g., a DLSU that is the same as, or similar to, the DLSUs 124 of FIG. 1A) to receive and/or transmit data to and/or from the DLSU. For example, where the PE 170 is configured to receive data via a read stream (e.g., a read stream that is the same as, or similar to, the read streams 142*a*-142*h* of FIG. 1B) or transmit data via a write stream (e.g., a write stream that is the same as, or similar to, the write streams 144*a*-144*h* of FIG. 1B), the PE 170 can receive or transmit the data via a load/store channel 174*c* from and/or to the DLSU. In some embodiments, the register memory 174 can transmit and receive data to and from the ALU 176 via an output channel 174*a* and an input channel 178*a*. For example, the ALU 176 can receive an instruction to perform one or more operations based at least on the data stored in one or more registers of the register memory 174 and the ALU 176 can obtain (e.g., read) the data stored in the one or more registers via the output channel 174*a*. In some examples, the ALU 176 can provide (e.g., write) data (e.g., after performing one or more operations) to one or more registers of the register memory 174 via the input channel 178*a*.

In some embodiments, the ALU 176 can include one or more circuits that obtain, process, and/or provide data as described herein. For example, the ALU 176 can interconnect with a PE controller via a broadcast channel 170*e*. In this example, the PE controller can transmit instructions to the ALU 176. The instructions can be configured to cause the ALU 176 to perform one or more operations. For example, the instructions can be configured to cause the ALU 176 to perform one or more operations based at least on data stored in one or more registers of the register memory 174. In one example, the ALU 176 can receive an instruction from the PE controller via the broadcast channel 170*e* to perform one or more filtering operations. In this example, the ALU 176 can obtain data from the register memory 174 via the output channel 174*a* corresponding to one or more registers of the register memory 174 and the ALU 176 can determine a pixel value based at least on the instructions and the data stored in the one or more registers of the register memory 174. The ALU 176 can then provide the pixel value to a register of the register memory 174 via the input channel 178*a*.

Figure 2:
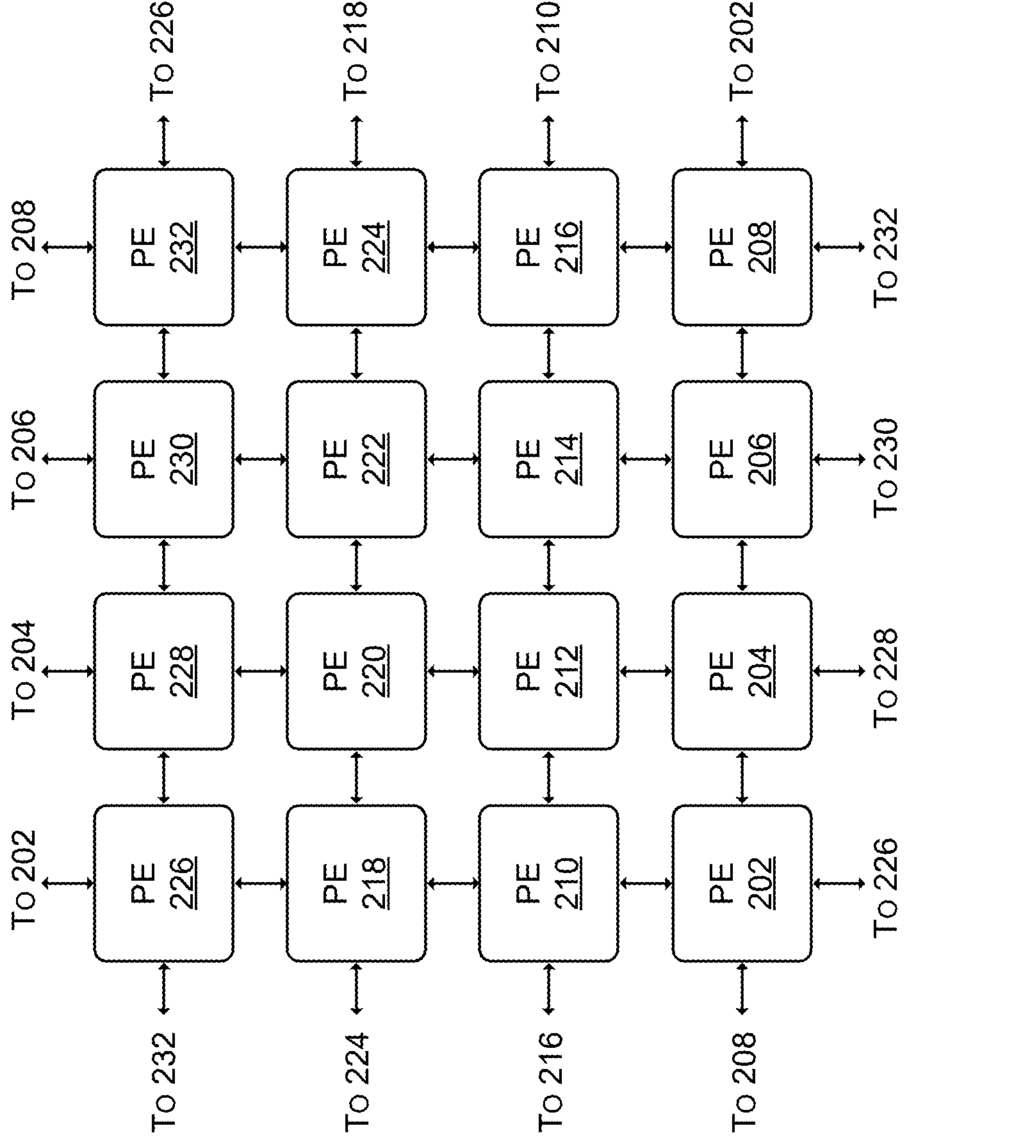
FIG. 2 is an example PPE configuration, in accordance with some embodiments of the present disclosure.

FIG. 2 is an example PPE configuration 200, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1500 of FIGS. 15A-15D, example computing device 1600 of FIG. 16, and/or example data center 1700 of FIG. 17.

The PPE configuration 200 includes a two-dimensional array of PEs 202-232. In some embodiments, each PE of the first PPE configuration 200*a* can include a PE that is the same as, or similar to, PE 170 of FIG. 1C. In some embodiments, each PE of the PEs 202-232 can be operatively coupled with one or more different PEs of the PEs 202-232. As illustrated, the PPE configuration 200 includes four horizontal arrays (or rows) of PEs (row 1: PEs 202-208; row 2: PEs 210-216; row 3: PEs 218-224; row 4: PEs 226-232) and four vertical arrays (or columns) of PEs (column 1: PEs 202, 210, 218, 226; column 2: PEs 204, 212, 220, 228; column 3: 206, 214, 222, 230; column 4:208, 216, 224, 232). In these examples, each PE of the PEs 202-232 can be associated with a given row or a given column. It will be understood that the dimensions of the PPE configuration 200 is merely an example, and that other configurations may include other dimensions.

In some embodiments, the PPE configuration 200 can include PEs 202-232 that are connected according to one or more connection sets. As used herein, the term "connection set" refers to connections between a given PE and other PEs of the PPE configuration 200. In some embodiments, a connection set can represent connections between the PEs 202-232 that are based at least on the relative position of each PE to the other PEs 202-232 and/or one or more portions of memory (e.g., registers internal to each PE). In one example, a connection set can be based on the a position of one or more PEs 202-232 relative to a given PE, where the connected PEs 202-232 are positioned north (e.g., above), south (e.g., below), east (e.g., to the right) and/or west (e.g., to the left) (sometimes referred to as a 4-neighborhood connection set). As an example, with respect to PE 212, a connection set based on the position of one or more PEs 202-232 that are north/south/east/west of the PE 212 can include connections (e.g., wires, printed traces disposed on a printed circuit board (PCB), and/or the like) to PE 220 (north), PE 204 (south), PE 214 (east), and PE 210 (west). In another example, a connection set can be based on connections connected PEs 202-232 are positioned north, south, east, and/or west (e.g., to the left) (as discussed above) as well as above (in a register that is associated with an upper portion of a frame and/or tile) and below (in a register that is associated with a lower frame and/or tile). As an example, again with respect to PE 212, the PE 212 can include north/south/east/west connections to respective PEs 220, 204, 214, and 210, as well as connections between an upper register of the PE 212 and a lower register of the PE 212 (also referred to as a torus topology). In each of these examples, each PE and/or corresponding registers of each PE 202-232 can connect so as to enable communication (e.g., transfers) of data therebetween.

In some embodiments, the PEs 202-232 can obtain data to be processed. For example, a first row of PEs (e.g., PEs 202, 204, 206, 208) can interconnect with an input interface to receive data to be processed. In an example, the input interface can establish an interconnection between the first row of PEs and a VMEM (e.g., a VMEM that is the same as, or similar to, the VMEM 112 of FIGS. 1A and 1B). In another example, the input interface can establish an interconnection between the first row of PEs and a DLSU (e.g., a DLSU that is the same as, or similar to, the DLSU 124 of FIG. 1). In these examples, the VMEM and/or the DLSU can store data to be input to the PEs 202-232 via the first row of PEs.

In some embodiments, the interconnection between the first row of PEs and the DLSU can be associated with one or more read streams. For example, the DLSU can include data that is generated by one or more sensors (e.g., cameras, LiDAR sensors, RADAR sensors, and/or the like). The data can then provided to the PEs 202-232 to be processed. In this example, the data can be subdivided into a plurality of inputs based on the size of the data and/or based on what portions of the data represent. In an example, when processing an image, the image can be subdivided into a plurality of sub-inputs (e.g., values associated with corresponding pixels) based on the size of the image. More specifically, the image can be subdivided such that each sub-input corresponds to a PE of the PEs 202-232. In some embodiments, the PEs 202-232 can be configured to obtain and transfer each of the sub-inputs. For example, the data can be loaded into the PEs 202-232 based on (e.g., after) the data is subdivided. In this example, the data can be loaded into the PEs 202-232 sequentially and transferred between the PEs 202-232 until the sub-inputs are loaded into registers of the corresponding PEs. In the above example, where the sub-inputs represent data associated with at least a portion of an image, the sub-inputs associated with the top row of pixels of the image can be loaded into the first row of PEs at a first time step. At a second time step, the sub-inputs associated with the top row of pixels can be transferred from the PEs of the first row of PEs to the PEs of a second row of PEs (PEs 210, 212, 214, 216), and data associated with a second row of pixels can be loaded into the first row of PEs. This process can be repeated iteratively until the sub-inputs associated with the top row of pixels are transferred sequentially to a fourth (or top) row of PEs (PEs 226, 228, 230, 232).

As data (e.g., sub-inputs) is transferred to one or more of the PEs 202-232, the data can be stored in register memory (e.g., a register memory that is the same as, or similar to, the register memory 174 of FIG. 1C) associated with the respective PE. For example, in response to a sub-input is obtained by PE 202 via a read stream from the VMEM or DLSU, the sub-input can be stored in a register associated with the register memory. In response to transferring the sub-inputs between the PEs 202-232 in accordance with the connection sets of each PE, multiple sub-inputs can be stored in corresponding registers of the register memory. In another example, in response to a second sub-input is obtained by the PE 202 at a second time step, the PE 202 can store the second sub-input in a different register of the register memory of the PE 202. In this way, each PE of the PEs 202-232 can store multiple sub-inputs transferred into the PE.

The PEs 202-232 can each interconnect (either directly or indirectly) with a control system (not explicitly illustrated). In some embodiments, the control system (referred to herein as a "PE controller") can be configured to transmit instructions to each of the PEs 202-232. For example, the PE controller can determine a configuration for the PPE configuration based at least the plurality of PEs 202-232. In some examples, the PE controller can determine the configuration based at least on the connections between the PEs 202-232. In some embodiments, once data is loaded into the PEs 202-232, the PE controller can determine one or more instructions to send to each of the PEs. For example, the PE controller can determine one or more instructions that implement single instruction, multiple data (SIMD) parallel processing to cause the one or more instructions to be executed simultaneously by each PE of the PEs 202-232. The PE controller can then determine that data corresponding to the instruction is loaded into the array of PEs and provide (e.g., transmit) the instruction to cause the PEs 202-232 to perform the SIMD parallel processing.

In some embodiments, the PEs 202-232 can perform one or more operations based at least on data (e.g., sub-inputs) stored in the registers of the PEs 202-232. For example, the PEs 202-232 can receive one or more sub-inputs that are loaded into the PEs 202-232 via a read stream. In some embodiments, the PEs 202-232 can receive the one or more instructions from the PE controller. In one example, the PE controller can generate an instruction associated with an addition operation and the PE controller can provide the instruction to each of the PEs 202-232. In some embodiments, the PEs 202-232 can each update a value (e.g., a first value) associated with a sub-input stored in a register of the PE based on the one or more instructions from the PE controller and store an updated sub-input (e.g., associated with a second value) in that register or a different register of the PE. In this example, the PEs 202-232 can perform additional operations based on the updated sub-input, or transfer the sub-input to be provided by the PEs 202-232 via a write stream to the VMEM or DLSU.

In some embodiments, the PEs 202-232 can transfer one or more sub-inputs based at least on performing the one or more operations. For example, each of the PEs 202-232 can receive a sub-input (e.g., via a write stream and/or via one or more other PEs 202-232) and each of the PEs 202-232 can perform one or more operations based at least on the sub-inputs. In this example, each of the PEs 202-232 can then transfer the received sub-input and/or the updated sub-input (updated based at least on the operation performed by the PE) to one or more other PEs 202-232. The one or more other PEs 202-232 can then perform one or more operations based at least on the transferred sub-input. This process can be repeated by each of the PEs 202-232 in accordance with the instruction provided until the operations associated with the instruction are completed. In some embodiments, once the operations are completed, the PEs 202-232 can transfer one or more of the sub-inputs to be provided by the PEs 202-232 via the write stream to the VMEM or DLSU.

In some embodiments, the transfers of sub-inputs from a read stream, to one or more PEs 202-232, and to a write stream can be referred to as a datapath. For example, the PEs 202-232 can receive sub-inputs via a write stream as well as an instruction from the PE controller to perform a set of operations. In an example, the set of operations can be associated with a filtering instruction, whereby multiple sub-inputs are obtained by a first PE through a predetermined set of transfers (sometimes referred to as inter-PE transfers) from a plurality of PEs that are involved in the filtering instruction. The plurality of PEs involved can include any number of PEs storing sub-inputs representing pixels involved in the filtering instruction. As an example, in response to operating in accordance with a 3×3 filtering instruction, the PE 212 can obtain sub-inputs from PEs 202-206, 210, 214, and 218-220 through a series of inter-PE transfers. In one example, the sub-input associated with PE 218 can be transferred to either PE 220 or PE 210, and transferred again to PE 212. In some embodiments, these inter-PE transfers can be performed based at least on the connection sets corresponding to each of the PEs 202-232. Once the sub-inputs are obtained through inter-PE transfers in accordance with the datapath, the PE 212 can perform one or more operations to determine an updated value for the pixel that was originally associated with the PE 212. Each of the PEs 202-232 can perform similar transfers and operations, and determine corresponding updated values for the pixels that were originally associated with the PEs 202-232. The PEs 202-232 can then transfer the sub-inputs such that the sub-inputs are provided by the PEs 202-232 via the write stream to the VMEM or DLSU.

Figure 3:
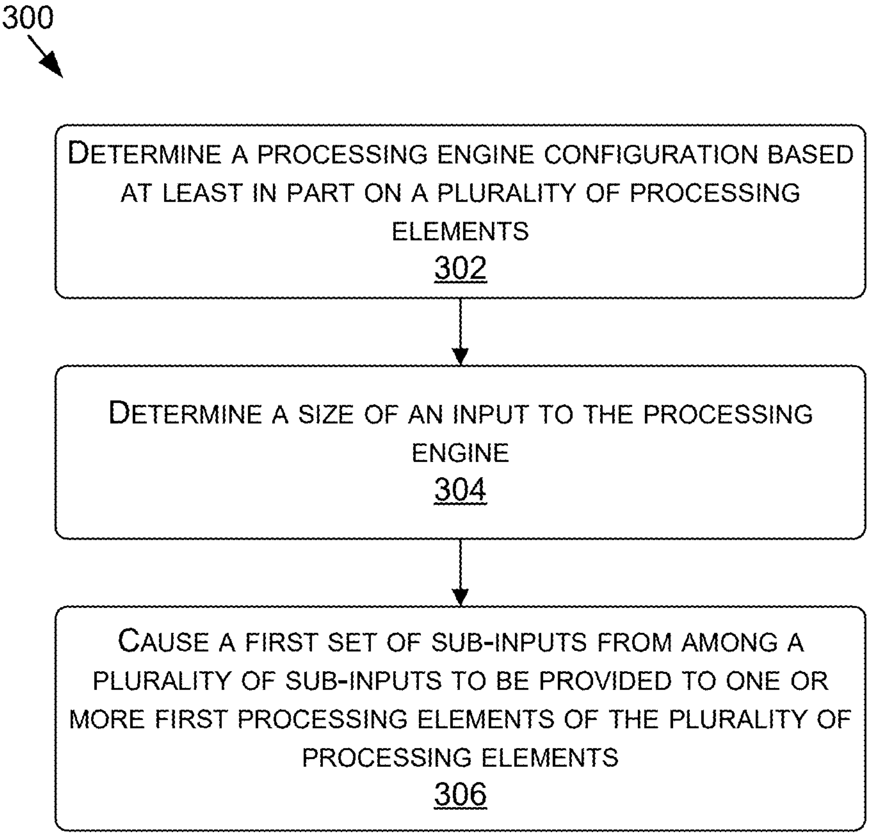
FIG. 3 is a flow diagram of an example method for processing data using accelerators in a system on a chip, in accordance with some embodiments of the present disclosure.

As shown in FIG. 3, each block of method 300, described herein, includes a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 300 is described, by way of example, with respect to the devices of the example computing environment of FIG. 1A, PPE 140 of FIG. 1B, and/or the PE 170 of FIG. 1C. However, these methods may additionally or alternatively be executed by any one system, or any combination of systems, including, but not limited to, those described herein.

FIG. 3 is a flow diagram showing a method 300 for processing data using accelerators in a system on a chip, in accordance with some embodiments of the present disclosure. The method 300, at block 302, includes determining a processing engine configuration based at least on a plurality of PEs. For example, a PE controller (e.g., a PE controller that is the same as, or similar to, the PE controller described with respect to FIG. 2) can determine a processing engine configuration based at least on a plurality of PEs. In some of the examples described herein, the PEs can be the same as, or similar to, the PEs of the PPE 140 of FIG. 1B and/or the PE 170 of FIG. 1C, and the processing engine described herein can be the same as, or similar to, the PPEs 118 of FIG. 1A, the PPE 140 of FIG. 1B, and/or the PEs of the PPE configuration 200 of FIG. 2. In some embodiments, the processing engine configuration can represent one or more array sizes that can be processed the by thee PEs of the PPE. For example, where the PEs of the PPE 140 form a processing engine configuration having a dimension of 8 wide and 10 tall, the PE controller can determine that the processing engine configuration can process 8×10 INT32 integers (e.g., 4 byte integers), 16×10 INT16 integers (e.g., 2 byte integers), 16×10 INT32 integers (e.g., in a double vector), or 32×10 INT16 integers (e.g., in a double vector).

In some embodiments, the PE controller can determine the processing engine configuration, where the processing engine configuration includes a set of vertical arrays (columns) and a set of horizontal arrays (rows). For example, the PE controller can determine the processing engine configuration based at least on the interconnections between each of the PEs of the of plurality of PEs. In some embodiments, the processing engine configuration can indicate a relative position of one or more PEs in relation to one or more other PEs.

For example, the processing engine configuration can indicate the relative position of one or more PEs in relation to one or more other PEs in a processing engine, where the relative position is based at least on connections between the PEs. In another example, the processing engine configuration can indicate connections between the PEs that enable a dataflow (e.g., series of transfers of data) between PEs. In some embodiments, the processing engine configuration can indicate which row and column correspond to each PE of the plurality of PEs. Additionally, or alternatively, the processing engine configuration can indicate which PEs are interconnected with a given PE based at least on the connection set associated with the PEs of the PE configuration. As an example, where the processing engine configuration represents the PPE configuration 200, the processing engine configuration can at least indicate that the PE 202 is interconnected with a PE to the north (PE 210), a PE to the east (PE 204) a PE to the south (PE 226, based on a wrap-around connection) and a PE to the west (PE 208, based on a wrap-around connection).

In some embodiments, the PE controller can determine the processing engine configuration, where each PE of the processing engine configuration is configured to receive at least one sub-input. For example, and again with respect to the PPE configuration 200, an image of 4×4 pixels can be obtained and stored in memory (e.g., a VMEM that is the same as, or similar to, VMEM 112, and/or a DLSU that is the same as, or similar to, the DLSU 124 of FIG. 1A). The image can then be divided into a plurality of sub-inputs (described below) and the sub-inputs provided to (e.g., transferred to) the PEs 202-232.

In the method 300, at block 304, the PE controller can determine a size of an input to the processing engine. For example, the PE controller can determine a size of an input to the processing engine, where the input represents at least a portion of an image. In one example, the image can include a 4×4 set of pixels and the PE controller can determine the size of the input to the processing engine. In this example, the input can include four sets of sub-inputs, with each set of sub-inputs including four sub-inputs corresponding to the pixels of a given row of the image. In another example, the image can include a 4×8 set of pixels, and the PE controller can determine the size of the input to the processing engine. In this example, the input can include eight sets of sub-inputs that are to be provided to the processing engine, with each PE receiving two sub-inputs to be stored in an upper register and a lower register of the given PE.

In the method 300, at block 306, the PE controller can cause a first set of sub-inputs from among a plurality of sub-inputs to be provided to one or more first PEs of the plurality of PEs. For example, the PE controller can cause the first set of sub-inputs from among the plurality of sub-inputs to be provided to the one or more first PEs of the plurality of PEs based at least on the processing engine configuration and the size of the input. In an example, where the image includes a 4×4 set of pixels that are divided into four sets of sub-inputs, each set of sub-inputs can be simultaneously provided to corresponding PEs of a first row of PEs. As an example, with respect to the PPE configuration 200 of FIG. 2, a first set of four sub-inputs can be provided to PEs 202-208, respectively, at a first time step. After the first time step, the first set of sub-inputs can be transferred from the PEs 202-208 to PEs 210-216, respectively, and a second set of four sub-inputs can be provided to the PEs 202-208. This process can be iteratively performed in accordance with a sequence (also referred to as a datapath) until the first set of four sub-inputs are transferred to PEs 226-232, the second set of four sub-inputs are transferred to PEs 218-224, a third set of four sub-inputs are transferred to PEs 210-216, and a fourth set of sub-inputs are provided to the first row of PEs 202-208.

In some embodiments, the PE controller can cause the one or more PEs to perform one or more operations. For example, the PE controller can provide data associated with an instruction to each of the PEs to cause each of the PEs to perform one or more operations in accordance with the instruction. For example, the PE controller can provide data associated with the instruction to each of the PEs (also referred to as a SIMD instruction) to cause each of the PEs to perform one or more operations in accordance with the instruction. In this example, the PEs can be caused to perform the one or more operations in parallel and/or in coordination with the one or more other PEs of the processing engine. In some embodiments, the PEs can perform the one or more operations based at least on a value associated with a sub-input corresponding to the PEs. In some examples where the instruction involves one or more transfers of sub-inputs between PEs (e.g., in accordance with a filter instruction and/or the like) the one or more PEs can transfer the sub-inputs to corresponding PEs involved in performing the filtering instruction. In this example, each PE can then perform the one or more operations based on the values representing the sub-inputs.

Techniques for Programming DMA Systems

DMA transfers involve devices reading and writing to memory without coordination by the main processors of a system (e.g., central processing units (CPUs) and/or the like). The use of DMA transfers can free up powerful system resources dedicated to performing complex operations and can be particularly useful in a system involved in real-time applications such as automated operation of a robot such as an automated vehicle (e.g., a car, truck, boat, shuttle, warehouse vehicle, and/or the like), simulated operation of a robot, and/or the like. DMA transfers can be implemented by configuring a DMA system to receive one or more descriptors (e.g., from memory associated with the DMA system storing the descriptors, sometimes referred to as descriptor RAM). Each descriptor can include headers having one or more fields. Each field can include information that is used to configure one or more operations to be performed to cause a frame or tile of a frame to be loaded into a VPU or PPE. In some examples, the fields can identify an address in memory to start at to read in frames or tiles from memory (sometimes referred to as vector memory or VMEM), define a number of pixels to be added to pad a frame or tile, define a number of frames or tiles to iterate across, and so on.

Conventional descriptors are configured on a per-descriptor basis to enable different DMA transfer types. While the use of conventional descriptors can improve the functioning of a system involved in performing DMA transfers, these conventional descriptors are generally configured in groups to enable different types of DMA transfers such as transfers involving streaming frames generated by a sensor, such as that of a vehicle (e.g., a camera, a LiDAR sensors, a RADAR sensor, an ultrasonic sensor, and/or the like). For example, one or more descriptors can be configured to cause data to be transferred during streaming of tiles of frames. Given that these conventional descriptors are configured in groups, and are independent of one another, the conventional descriptors are queued (e.g., linked) and processed in sequence. This sequential processing of different descriptors leads to inefficiencies at scale. More specifically, the sequential processing include separate configurations to enable independent reads/writes. In some cases, this results in an increased number of transfer gaps between descriptors, which in turn can create idle "bubbles" (e.g., time periods) between the frames or tiles that are transferred. As a result, increased amounts of power can be drawn and memory consumed.

This disclosure relates to linking frame types as opposed to linking descriptors. In some implementations, schedulers involved in data transfers such as a DMA systems are configured to receive frame formats of varying frame types so that the DMA system can be configured to initiate DMA transfers faster. This can result in reductions in the time and resources that would otherwise be used to configure each DMA transfer individually, thus conserving power and memory consumption. Further, the systems and methods described herein can simplify the processing element control code involved in configuring and operating such processing elements, similarly conserving processing resources expended when performing DMA transfers. The presently-disclosed techniques also maximizes bandwidth utilization by enabling descriptors to be processed faster in a single channel rather than having to be processed in parallel across multiple channels to achieve the same processing speed. And, by virtue of implementing the presently-disclosed techniques, kernel code can be reduced in complexity.

FIGS. 4A-4C are example frame formats 400*a*, 400*b*, 400*c* in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system may be included in, and/or may include similar components, features, and/or functionality to that of example autonomous vehicle 1500 of FIGS. 15A-15D, example computing device 1600 of FIG. 16, and/or example data center 1700 of FIG. 17.

In some embodiments, the frame formats 400*a*, 400*b*, 400*c* can represent frame formats obtained and/or stored by a DMA system (e.g., a DMA system that is the same as, or similar to, the DMA systems 114 of FIG. 1A), a VMEM (e.g., a VMEM that is the same as, or similar to, the VMEMs 112 of FIG. 1A), a memory of a cache (e.g., a cache that is the same as, or similar to, caches 120 of FIG. 1A), and/or system memory (e.g., memory that is the same as, or similar to, memory 104 and/or memory 108 of FIG. 1A). As will be described herein, each frame format 400*a*, 400*b*, 400*c* can be associated with one or more frame types involved in one or more different DMA transfers. For example, the frame format 400*a* can be associated with a frame addressing frame type for performing DMA transfers for an entire frame in accordance with a sequence (e.g., the streaming of sequential tiles of a frame with or without padding as described herein), the frame format 400*b* can be associated with a descriptor addressing frame type for configuring the DMA system by an accelerator to perform one or more subsequent DMA transfers, and the frame format 400*c* can be associated with a random region addressing frame type for performing one or more DMA transfers in accordance with instructions associated with applications executed by an accelerator, as described herein.

In embodiments, the data associated with the one or more frame formats can be involved in (e.g., can cause operations involved in) one or more DMA transfers. For example, the data associated with the one or more frame formats can cause one or more DMA transfers between a source memory (e.g., memory 108 of FIG. 1A) to a destination memory (e.g., VMEMs 112 and/or DLSUs 124 of FIG. 1A). In some embodiments, the data associated with the one or more frame formats can be provided to a DMA system to cause the DMA system to obtain data (e.g., frame data associated with at least a portion of a frame) from the source memory for one or more operations to be performed by an accelerator (e.g., an accelerator that is the same as, or similar to, the VPUs 116 and/or PPEs 118 of FIG. 1A). For example, the DMA system can receive the data associated with the one or more frame formats, obtain data (e.g., frame data) specified by the one or more frame formats from the source memory, and provide (e.g., transfer) the frame data specified by the one or more frame formats from the source memory to a destination memory such as the VMEM and/or DLSU. In this way, the DMA system can preload data into the destination memory involved in one or more operations performed by one or more accelerators, reducing the number of operations that would otherwise be performed by the accelerator to obtain the frame data from the source memory.

Referring now to FIG. 4A, the example frame format 400*a* illustrates a frame format associated with a frame addressing frame type. In some embodiments, the frame format 400*a* can include one or more byte fields corresponding to descriptors involved in transferring tiles of a frame (e.g., portions of a frame) from a source memory to a destination memory when streaming the tiles as part of a DMA transfer as described herein. As described herein, the byte fields of the frame addressing frame type can be included in one or more different frame formats such as a descriptor addressing frame type (illustrated by the frame type 400*b*) and/or a random region addressing frame type (illustrated by the frame type 400*c*). In examples, the descriptors can be associated with transfers in a raster scan sequence (e.g., transferring tiles of a frame in accordance with a traversal order). For example, the descriptors of a frame format having a frame addressing frame type can be associated with transfers in a raster scan sequence where data associated with tiles of a frame are sequentially transferred from source memory to destination memory, from top to bottom, and from left to right, relative to the frame. In another example, the descriptors can be associated with transfers in a raster scan sequence where data associated with tiles of a frame are sequentially transferred into destination memory from left to right, and from top to bottom.

In some embodiments, as shown in FIG. 4D, frame formats can be associated with a tile sequence order. For example, the frame format 400*a* illustrated by FIG. 4A can implement a tile sequence order from among a set of tile sequence orders 400*d* (sometimes referred to as a traversal orders) illustrated in FIG. 4D. As illustrated in FIG. 4D, the set of tile sequence orders 400*d* can include a raster-left-top sequence 410, a raster-right-top sequence 412, a raster-left-bottom sequence 414, a raster-right-bottom 416, a vertical-left-top sequence 418, a vertical-right-top sequence 420, a vertical-left-bottom sequence 422, and a vertical-right-bottom sequence 424. As illustrated, each of the tile sequence orders 400*d* can involve a different traversal order when processing a given frame. As illustrated, the raster-left-top sequence 410, the raster-left-bottom sequence 414, the vertical-left-top sequence 418, the vertical-left-bottom sequence 422 sequences can include a positive tile offset (e.g., where tiles are shifted downward or to the right within a frame), and the raster-right-top sequence 412, the raster-right-bottom 416, the a vertical-right-top sequence 420, the vertical-right-bottom sequence 424 can include a negative tile offset (e.g., where tiles are shifted upward or to the left within a frame). In some embodiments, the a raster-left-top sequence 410, a raster-right-top sequence 412, a vertical-left-top sequence 418, a vertical-right-top sequence 420 sequences can include a positive row offset, and the raster-left-bottom sequence 414, a raster-right-bottom sequence 416, vertical-left-bottom sequence 422, and a vertical-right-bottom sequence 424.

By virtue of the aggregation of multiple sequential descriptors in a single frame format, a DMA system can be configured to stream batches of tiles associated with a given frame or set of frames, thus optimizing the bandwidth and access of the memory involved in the transfer (e.g., the source memory, the DMA system memory, and the destination memory) by allocating one or more DMA buffers to a single channel and pipelining the transfers in association with that channel. This can reduce latencies (referred to as bubbles) that are present where configuration of the DMA system involves loading multiple frame types corresponding to multiple descriptors.

In some embodiments, the frame format 400*a* includes a frame header portion 402, a first descriptor set 404 and an Nth descriptor set 406. It will be understood that the number of descriptor sets can be any number of descriptor sets, and that the present disclosure is not limited to frame formats 400*a* that have a specific number of descriptor sets. As will be described herein, each row in the frame format 400*a* includes a field description and one or more byte fields.

In some embodiments, the example frame format 400*a* includes a frame header portion 402. The frame header portion 402 can include a field description portion identifying first frame header ("Frame Header 1"), a second frame header ("Frame Header 2"), and a third frame header ("Frame Header 3"). For example, the example frame format 400*a* can include a first frame header that corresponds to a set of four byte fields (each byte field including a length of eight bits). In an example, the first frame header can include a first byte field specifying a number of descriptor sets represented by the frame format 400*a*, a second byte field specifying a frame repetition factor, a third byte field specifying a second frame identifier ("FID1") identifying a second frame, and a first frame identifier ("FID0") identifying a first frame. In some embodiments, the first frame identifier and the second frame identifier can indicate the frame type of the frame format (e.g., that the frame type is associated with a frame addressing frame type). In this example, the second frame header can correspond to a first byte field representing a frame offset and a second byte field representing a tile offset (each byte field including a length of sixteen bits). The third frame header can correspond to a first byte field ("Pad B") specifying a padding value (e.g., corresponding to a number of pixels) including a number of pixels to pad a frame along a bottom portion of the frame; a second byte field ("Pad L") specifying a padding value including a number of pixels to pad the frame along a right portion of the frame; a third byte field ("Pad T") specifying a padding value including a number of pixels to pad the frame along a top portion of the frame; and a fourth byte field ("Pad R") specifying a padding value including a number of pixels to pad the frame along a right portion of the frame (each byte field including a length of eight bits).

In some embodiments, the example frame format 400*a* includes a first descriptor set 404. The first descriptor set 404 can include to a first column and row header ("Column 1/Row 1 Header"), and one or more descriptor headers ("Descriptor 1 and Descriptor 2," through "Descriptor N"). In some embodiments, the first column and row header can correspond to a first byte field ("Column 1/Row 1 Header") that indicates a column and row offset and a pixel line and pitch (specifying an initial point of a frame or at least a portion of a frame (also referred to as a tile or patch) and a distance between pixels), the first byte field including a length of sixteen bits. The first column and row header can correspond to a second byte field ("Column 1/Row 1 Repetition Factor") specifying a number of times data associated with the frame should be transferred from source memory to destination memory during a DMA transfer, the second byte field including a length of eight bits. In some embodiments, the first column and row header can correspond to a third byte field ("Descriptor entry count") that indicates a number of descriptors included in the first descriptor set 404, the third byte field including a length of eight bits.

In some embodiments, the one or more descriptor headers of the first descriptor set 404 can correspond to a plurality of descriptor identifiers and respective repetition factors. For example, a first descriptor header ("Descriptor 1 and Descriptor 2") can correspond to four byte fields that further correspond to two descriptors identifiers, each byte field including a length of eight bits. In examples, a descriptor header (e.g., "Descriptor N") can correspond to one descriptor identifier ("Nth Descriptor ID").

In some embodiments, the descriptor identifiers can include values that correspond to descriptors that are stored in the memory of the DMA system. For example, the descriptor identifiers can correspond to predetermined descriptors that are stored in the memory of the DMA system that the DMA system can access in response to receiving data associated with a frame format (e.g., from a processor, VPU, PPE, and/or the like). In examples, the descriptor identifiers can correspond to descriptors that are updated and stored in memory (e.g., of the DMA system, the VMEM, the DLSU, the caches, and/or the like). For example, during object tracking a VPU can determine one or more updated positions (e.g., with respect to a subsequent frame) corresponding to positions of a tile for a frame (e.g., a current frame). In this example, the VPU can update the descriptor involved in the DMA transfer stored in the destination memory (the VMEM), and the DMA system can obtain the updated descriptor. The DMA system can then cause one or more additional DMA transfers to occur based on the updated descriptor.

Referring now to FIG. 4B, the frame format 400*b* illustrates a frame format associated with a descriptor addressing frame type. In some embodiments, the frame format 400*b* can be similar to the frame format 400*a* of FIG. 4A. However, certain portions of the frame format 400*b* can be different from portions of the frame format 400*a*. For example, the first frame header portion 402*b* can include a first frame header corresponding to bit fields indicating second frame identifier ("FID1") identifying a second frame, and a first frame identifier ("FID0") identifying a first frame. In this embodiment, the first frame identifier and the second frame identifier can indicate the frame type of the frame format (e.g., that the frame type is associated with a descriptor addressing frame type). In some embodiments, one or more byte fields of the frame format 400*b* can be reserved (e.g., not used, referenced in the figures as "RSVD") in comparison to the frame format 400*a*. For example, the byte fields of the first frame header and the byte fields of the second frame header can be reserved. In examples, the first byte field of each of the descriptor sets (e.g., the first descriptor set 404*b*, one or more other descriptor sets (not explicitly illustrated), and the Nth descriptor set 406*b*) can be reserved. By reserving one or more byte fields instead of restructuring portions of the frame format 400*b*, the frame format 400*b* can be provided to a DMA system capable of handling various frame format types without separately configuring the DMA system to handle various frame types. This can reduce the overall complexity to configure the DMA system and improve compatibility between applications configuring DMA transfers using the same DMA system architecture.

In some embodiments, the frame format 400*b* can include one or more byte fields corresponding to descriptor identifiers involved in one or more DMA transfers. The descriptor identifiers can be associated with descriptors stored in memory of the DMA system that include byte fields corresponding to one or more of the reserved byte fields of the frame format 400*b*. For example, the descriptor identifiers of the frame format 400*b* can specify a descriptor including similar byte fields configured to store data associated with a frame offset and line pitch, a tile offset and line pitch, one or more padding values (e.g., padding values corresponding to padding of the bottom, left, top, and/or right of a frame and/or tile specified by the descriptor) and/or a column/row offset and line pitch. By virtue of reserving these fields of the frame format 400*b* and including one or more fields in the descriptor, a single frame format 400*b* can be used to batch multiple descriptors corresponding to multiple DMA transfers. As a result, multiple DMA transfers can be batched based at least on a common frame, thus reducing the number of configurations that need to be performed (e.g., by configuring a DMA system involved in the DMA transfers). In examples, where an accelerator (e.g., the VPU) is updating one or more frame formats (e.g., by updating one or more descriptors of the frame format) to configure subsequent (e.g., future) DMA transfers to be performed by the DMA system, the accelerator can generate a single frame format with multiple descriptors, likewise reducing the number of configurations that are involved in configuring the DMA system. These descriptors can be updated dynamically based on one or more operations executed by the VPU in association with one or more applications. As an example, where operations are executed by the VPU that are involved in tracking an object is moving in position relative to a sensor (e.g., camera, RADAR sensor, LiDAR sensor, and/or the like) from frame to frame, the VPU can update one or more descriptors of tiles corresponding to the object as the object moves within a field of view of the camera, thus causing DMA transfers to be performed by the DMA system that involve tiles of the subsequent frames corresponding to the position of the object over time.

Referring now to FIG. 4C, the frame format 400*c* illustrates a frame format associated with a random region addressing frame type. In some embodiments, the frame format 400*c* can be similar to the frame format 400*a* of FIG. 4A. However, certain portions of the frame format 400*c* can be different from portions of the frame format 400*a*. For example, the first frame header portion 402*c* can include a first frame header corresponding to bit fields indicating second frame identifier ("FID1") identifying a second frame, and a first frame identifier ("FID0") identifying a first frame. In this embodiment, the first frame identifier and the second frame identifier can indicate the frame type of the frame format is associated with a random region addressing frame type. In some embodiments, one or more byte fields of the frame format 400*c* can be reserved in comparison to the frame format 400*a* and/or the frame format 400*b*. For example, the byte fields of the second frame header and the byte fields of the third frame header can be reserved. In examples, the first three byte fields of each of the descriptor set (e.g., the first descriptor set 404*c*, one or more other descriptor sets (not explicitly illustrated), and the Nth descriptor set 406") can be reserved.

In some embodiments, the frame format 400*c* can include descriptor sets 404*c*, 406*c* that each include a column header. For example, the frame format 400*c* can include a descriptor set 404*c* including a first column header ("Column 1 Header"), the first column header corresponding to a column/row offset byte field. In this example, the data stored in the column/row offset byte field can include 32 bits. In some embodiments, data stored in the column/row offset byte field can specify a point along a frame or tile that is offset relative to the frame or tile (identified by the frame header portion 402*c*). In one example, where a frame or tile is referenced in X, Y coordinates, the bottom left point of the frame or tile can represent the origin (0,0). The column/row offset can represent a number of pixels offset along the X-axis, and Y-axis relative to the origin.

In some embodiments, the frame format 400*c* can include a first descriptor set 404*c* which includes four descriptor fields, similar to the first frame format 400*a* and the second frame format 400*b*. In this example, the first three byte fields of the first descriptor set 404*c* can be reserved, and the fourth byte field can correspond to a descriptor identifiers involved in a DMA transfer. In some embodiments, the descriptor identifier can be associated with descriptors stored in memory of the DMA system that include byte fields corresponding to one or more of the reserved byte fields of the frame format 400*c*. For example, the descriptor identifiers of the frame format 400*c* can specify a descriptor identifying a frame offset and line pitch, a tile offset and line pitch, one or more padding values (e.g., padding values corresponding to padding of the bottom, left, top, and/or right of a frame and/or tile specified by the descriptor) and/or a column/row offset and line pitch. In some embodiments, a DMA system that is configured to cause one or more DMA transfers to occur based at least on the frame format 400*c* can cause the frame(s) or tile(s) specified by the data included in the frame header portion 400*c* and the respective descriptor sets 404*c*, 406*c* to be transferred in accordance with one or more of the parameters of the specified descriptor.

In some embodiments, to perform processing of frame(s) and/or tile(s), the DMA system can receive data associated with a frame format (e.g., from a processor, the VMEM, and/or the VPU). For example, initially, the DMA system can receive the data associated with the frame format from the processor. In this example, the DMA system can obtain one or more descriptors specified by the frame format and initiate one or more corresponding DMA transfers based at least on the one or more descriptors. In some embodiments, as data associated with frames and/or tiles specified by the descriptor(s) of the frame format is identified (e.g., in source memory), the DMA system can obtain the data from the source memory and provide the data associated with the frames to the destination memory (e.g., the VMEM and/or the DLSU). In some embodiments, the DMA system can provide a notification to one or more accelerators (e.g., the VPU and/or the PPE) that the data associated with the frames is stored in the destination memory. Once the one or more accelerators complete one or more operations based at least on the data associated with the frames stored in the destination memory, the one or more accelerators can generate and provide data associated with a different (e.g., updated) frame format to the destination memory and/or directly to the DMA system. In these embodiments, the DMA system can cause one or more different DMA transfers to be performed based at least on the different frame format.

Figure 5:
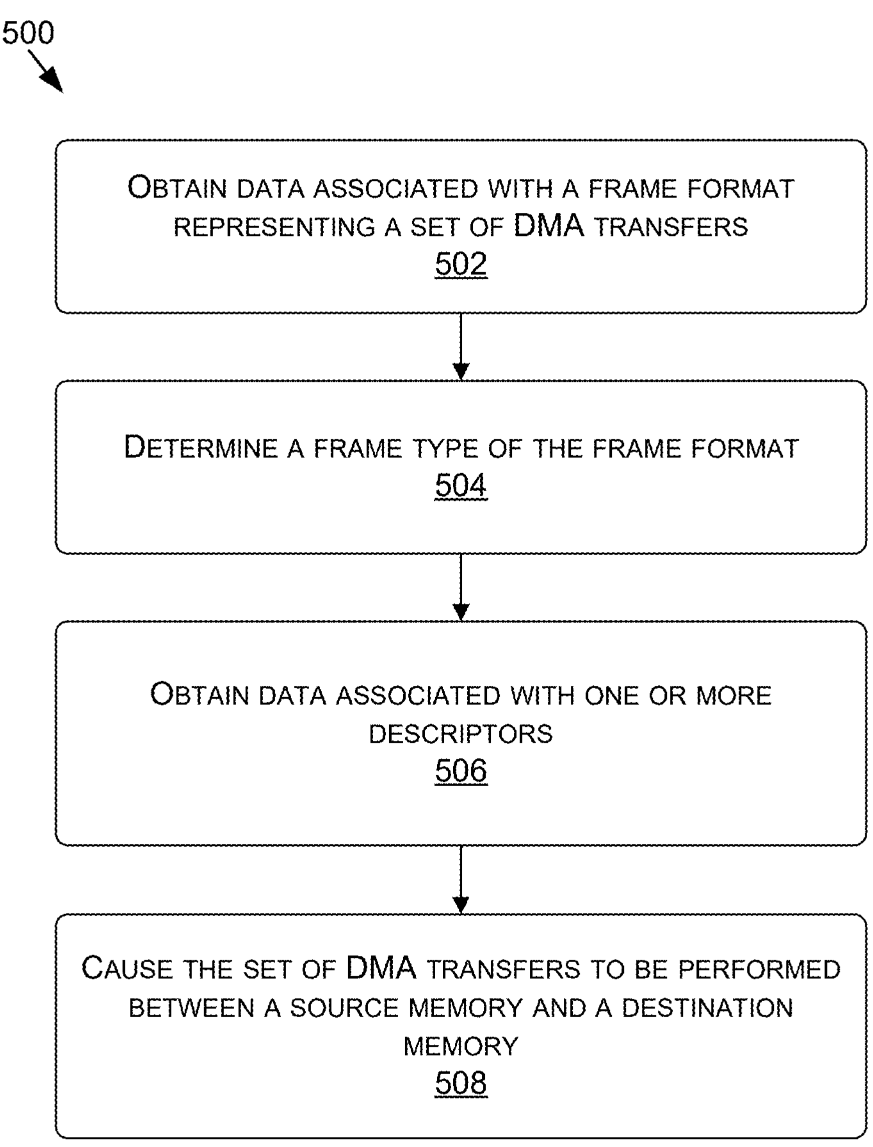
FIG. 5 is a flow diagram of an example method for processing data based at least on linking frame types, in accordance with some embodiments of the present disclosure.

FIG. 5 is a flow diagram of an example method 500 for processing data based at least on linking frame types, in accordance with some embodiments of the present disclosure. In some embodiments, aspects of the method 500 can be performed by one or more devices that are the same as, or similar to, one or more of the devices of FIGS. 1A-1C such as, for example, the DMA systems 114, the VPUs 116, the PPEs 118, and/or the processor 102. In embodiments, one or more other devices of FIG. 1A can perform one or more aspects of the method 500. In some embodiments, one or more of the frame formats described herein can be the same as, or similar to, the one or more frame formats of FIGS. 4A-4C.

The method 500, at block 502, includes obtaining data associated with a frame format representing a set of DMA transfers. For example, a DMA system can obtain the data associated with the frame format representing the set of DMA transfers. In some examples, the DMA system can obtain the data associated with the frame format from a processor. Additionally, or alternatively, the DMA system can obtain the data associated with the frame format from an accelerator of a functional block of a SoC (e.g., a functional block that is the same as, or similar to, the functional blocks 110 of FIG. 1A). For example, the DMA system can obtain the data associated with the frame format from VMEM (e.g., VMEM that is the same as, or similar to, the VMEMs 112 of FIG. 1A) based at least on an accelerator (e.g., the VPU and/or the PPE) writing the data associated with the frame format to the VMEM. In one example, the VPU and/or the PPE can execute one or more operations based at least on one or more completed DMA transfers and the VPU and/or PPE can determine one or more regions of interest. In this example, the VPU and/or PPE can generate a frame format associated with a descriptor addressing frame type, where one or more of the descriptors specified by the frame format correspond to one or more regions of interest, where the regions of interest correspond to features (e.g., objects, agents such as vehicles and/or pedestrians, and/or the like) moving relative to a field of view of a sensor involved in generating the frames.

In some embodiments, the frame format can include a set of descriptor identifiers. For example, the frame format can include one or more descriptor identifiers forming a set of descriptor identifiers. In some embodiments, the one or more descriptor identifiers can be associated with (e.g., correspond to) one or more descriptors stored in memory. For example, the one or more descriptor identifiers can be associated with one or more descriptors stored in a memory of the DMA system. In some examples, the one or more descriptors identifiers can be associated with one or more descriptors stored in VMEM.

In some embodiments, the descriptors can be associated with one or more aspects related to one or more DMA transfers. For example, descriptors can specify one or more aspects related to moving a frame (or tile of a frame) from a source memory (e.g., a memory such as memory 108 of FIG. 1A) to a destination memory (e.g., a VMEM such as VMEM 112 of FIG. 1A). In examples, descriptors can specify one or more of a frame offset (e.g., relative to a set of frames), a tile offset (e.g., a column and row offset relative to a point such as an origin of a frame), one or more padding values (e.g., to pad a frame or tile along a bottom portion, left portion, top portion, and/or right portion), and/or the like.

In some embodiments, the DMA system can be configured to process frame formats associated with one or more different frame types. For example, a DMA system can be configured to process frame formats associated with a frame addressing frame type, a descriptor addressing frame type, and/or a random region addressing frame type, as described herein. In this way, the DMA system can be configured to perform DMA transfers in accordance with various predetermined frame types, thus reducing the complexity involved in configuring DMA transfers. In some embodiments, the DMA system can process frame formats in accordance with frame types based at least on a set of channels where each frame format corresponds to a single channel as described herein. In this way, the DMA system can be configured to batch and process similar DMA transfers without dividing performance of the DMA transfers across multiple channels, thus consolidating resources and complexity involved in configuring the DMA system between DMA transfers.

The method 500, at block 504, includes determining a frame type of the frame format. For example, the DMA system can determine the frame type of the frame format based at least on one or more byte fields of the frame format. In one example (as illustrated in FIGS. 4A-4C) frame formats can include two byte fields in a first frame header. In this example, the two byte fields can include values that in combination correspond to the frame type. In some embodiments, the DMA system can obtain the values of the byte fields corresponding to the frame type and determine the frame type of a given frame format based at least on the values stored in the byte fields.

In some embodiments, the DMA system can determine that one or more byte fields of the frame format are reserved byte fields. For example (as illustrated in FIGS. 4B and 4C) the DMA system can determine that one or more byte fields associated with a frame offset, a tile offset, padding values for a frame, column and row offsets, and/or one or more descriptors are reserved. These byte fields can be reserved based at least on the frame type being associated with descriptors having byte fields corresponding to at least some of the reserved byte fields. Additionally, or alternatively, these byte fields can be reserved because they are not used by the DMA system to configure one or more DMA transfers associated with the frame type.

In some embodiments, the DMA system can determine that the frame type of the frame format is a frame addressing frame type, a descriptor addressing frame type, or a random region addressing frame type. For example, the DMA system can determine that the frame type is a frame addressing frame type that directs the DMA system to perform DMA transfers by sequentially traversing a frame and transferring each tile of the frame from source memory to destination memory. In this example, the frame format can be configured using multiple descriptors that are grouped in batches such that the DMA system is configured once and the tiles of the frame corresponding to the multiple descriptors can be transferred sequentially from source memory to destination memory in a single channel. This can maximize the bandwidth of the source memory and/or destination memory and reduce latencies in reconfiguring the DMA system between DMA transfers of tiles (such latencies sometimes referred to as “bubbles”).

In an example, the DMA system can determine that the frame type includes a descriptor addressing frame type that involves configuration by an accelerator (e.g., the VPU or PPE) of the DMA system for subsequent DMA transfers. In this example, the accelerator can configure the frame format dynamically based at least on one or operations performed by the accelerator (e.g., to track features represented in one or more frames). In some embodiments, frame formats associated with the descriptor addressing frame type can be used to transfer configuration data of a frame format for a given descriptor stored in memory of the DMA system and/or configuration data of vector processing instructions stored in instruction cache (e.g., caches that are the same as, or similar to, caches 120 of FIG. 1A). The DMA system can then obtain the data of the frame format and cause the one or more DMA transfers to be performed based at least on the descriptors included in the frame format.

In yet another example, the DMA system can determine that the frame type includes a random region addressing frame type that involves moving tiles corresponding to regions of interest within a frame from source memory to destination memory. In some embodiments, frame formats associated with a random region addressing frame type can include descriptors that correspond to one or more 2D and/or 3D regions of interest. The 2D and/or 3D regions of interest can correspond to tiles in a frame bounding the region of interest in the frame that are to be transferred from source memory to VMEM in advance of one or more instructions being executed using an accelerator. The DMA system can determine the offset of each region of interest that needs to be transferred relative to frame (e.g., relative to an address indicating a point at which a frame starts in the source memory). In some embodiments, the accelerator (e.g., the VPU) can update the memory of the DMA system with a batch of regions of interest to be transferred (for example, up to 32 regions of interest per batch) and trigger the corresponding DMA transfers to be performed. The random region addressing frame type can cause the DMA system to retrieve a pipelined batch of tiles corresponding to regions of interest in a frame, thus maximizing the bandwidth from source memory and destination memory with a reduced latency by allocating all buffers to a single channel and pipelining the DMA transfers to reduce the latency (e.g., bubbles) between 2D and/or 3D patches.

The method 500, at block 506, includes obtaining data associated with one or more descriptors. For example, the DMA system can obtain the data associated with the one or more descriptors from a memory of the DMA system. In some embodiments, the DMA system can obtain the data associated with the one or more descriptors based at least on one or more descriptor identifiers of a frame format corresponding to the descriptors stored in the memory of the DMA system. Additionally, or alternatively, the DMA system can obtain the data associated with the one or more descriptors from the memory of the DMA system based at least on the frame type of the frame format. In some embodiments, where the frame format includes one or more reserved byte fields, the one or more descriptors retrieved by the DMA system can obtain descriptors including byte fields that represent the data corresponding to the one or more byte fields.

In some embodiments, the DMA system can determine a sequence of DMA transfers. For example, the DMA system can determine a sequencer of DMA transfers for a set of DMA transfers. In examples, the set of DMA transfers can be represented by a single frame format received by the DMA system. In an example, where the DMA system receives a frame format associated with a frame addressing frame type, the DMA system can determine a sequence of DMA transfers that orders the tiles of an entire frame (or portions thereof) identified by the frame format to be transferred from source memory to destination memory. In an example, where the DMA system receives a frame format associated with a descriptor addressing frame type, the DMA system can determine a sequence of DMA transfers that orders the tiles of frame identified by the frame format to be transferred from source memory to destination memory subsequent to a previously-performed or queued sequence of DMA transfers. In yet another example, where the DMA system receives a frame format associated with a random region addressing frame type, the DMA system can determine a sequence of DMA transfers that orders the tiles of the regions of interest to be transferred from source memory to destination memory.

The method, at block 508, includes causing the set of DMA transfers to be performed between a source memory and a destination memory. For example, the DMA system can cause the set of DMA transfers to be performed between the source memory and the destination memory. In an example, where the DMA system receives a single frame format corresponding to one or more DMA transfers that form the set of DMA transfers, the DMA system can cause the one or more DMA transfers to be performed based at least on the frame format and the descriptors. In some embodiments, the DMA system can cause one or more of the DMA transfers specified by a frame format to be performed based at least on a single channel associated with the frame format and/or the frame type (e.g., one or more aspects specified by the frame type). Additionally, or alternatively, the DMA system can cause one or more of the DMA transfers to be performed in accordance with a sequence determined by the DMA system.

FIG. 1B is an example PPE 140, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1500 of FIGS. 15A-15D, example computing device 1600 of FIG. 16, and/or example data center 1700 of FIG. 17.

DMA Transfers Involving Random Regions Corresponding to Regions of Interest

Figure 6:
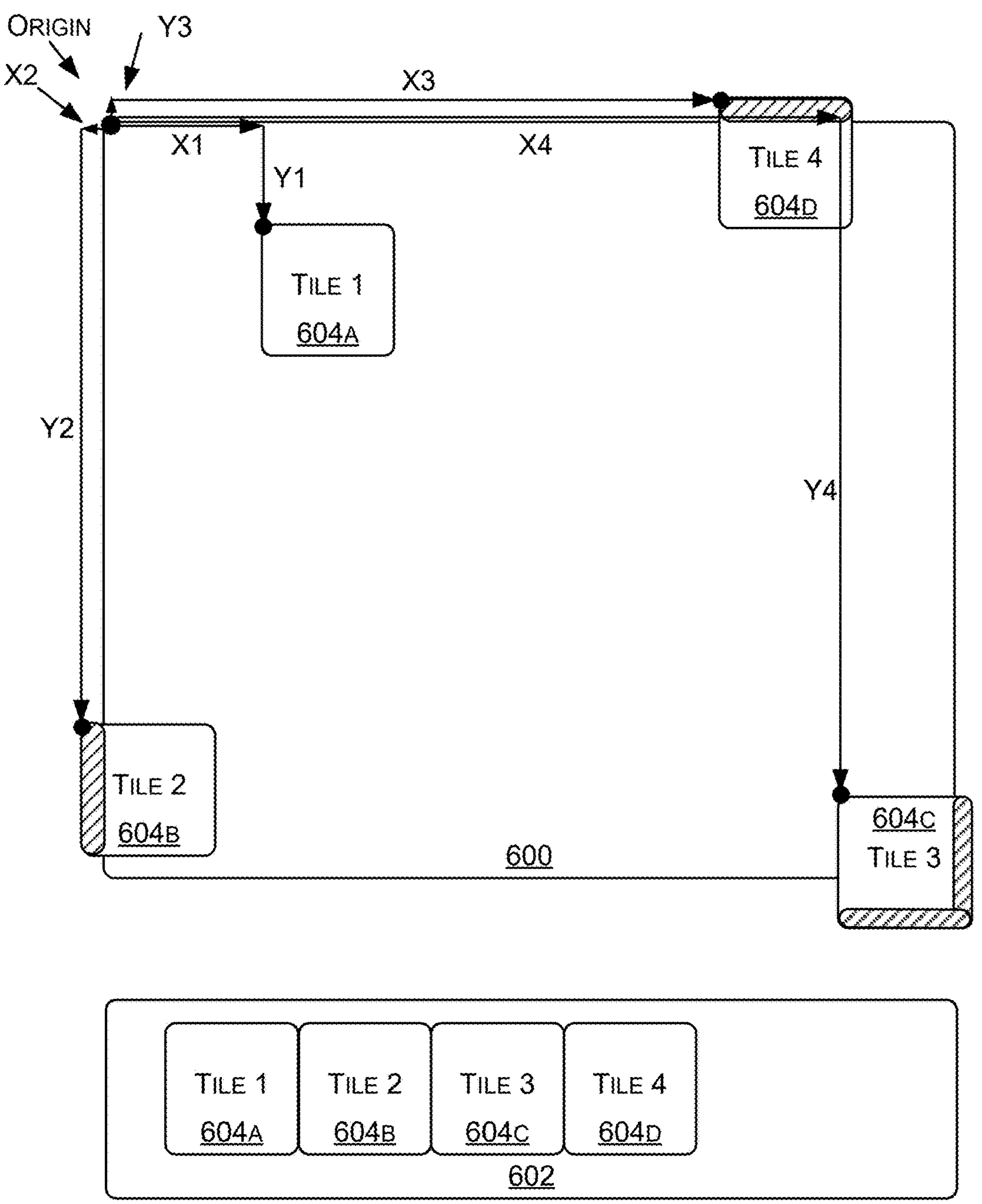
FIG. 6 is an example representation of a frame, in accordance with some embodiments of the present disclosure.

FIG. 6 includes an example representation of a frame 600, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the frame 600 may be included in, and/or may include similar components, features, and/or functionality to that of example autonomous vehicle 1500 of FIGS. 15A-15D, example computing device 1600 of FIG. 16, and/or example data center 1700 of FIG. 17.

In some embodiments, the frame 600 can represent an image (e.g., a camera image and/or the like). For example, a camera can generate data associated with an image, the image representing an environment that the camera is operated in within the field of view of the camera. The data associated with the image can include one or more values that represent a color and/or intensity at one or more pixels of the image. In some embodiments, the values corresponding to the pixels of the image can be stored in memory (e.g., system memory that is the same as, or similar to, the memory 108 of FIG. 1A). In embodiments, the values corresponding to the pixels of the image can be stored in, or transferred to, one or more other memory devices such as a VMEM (e.g., a VMEM that is the same as, or similar to, the VMEM 112 of FIG. 1A), the DLSU (e.g., a DLSU that is the same as, or similar to, the DLSUs 124), and/or a buffer (e.g., a buffer that is the same as, or similar to, the memory 104 of FIG. 1A).

As described herein, a DMA system (e.g., a DMA system that is the same as, or similar to, the DMA systems 114 of FIG. 1A) can cause one or more DMA transfers of data between source memory and destination memory to be performed. For example, the DMA systems can receive instructions from an accelerator (e.g., an accelerator that is the same as, or similar to, the VPUs 116 and/or PPEs 118 of FIG. 1A) and/or from a processor (e.g., a processor that is the same as, or similar to, the processor 102 of FIG. 1A) that cause the DMA system to cause the one or more DMA transfers to be performed. In some embodiments, in response to the instructions from the accelerator or the processor to cause the one or more DMA transfers to be performed, the DMA system can identify data corresponding to a frame that is stored in the source memory and cause a DMA transfer to be performed to move the data to the destination memory specified by the DMA transfer.

The frame 600 can include an origin that is located at a fixed point relative to the frame 600. In some embodiments, the origin of the frame 600 can be located at the upper left corner of the frame. It will be understood that any other point can be associated with the origin such as, for example, the bottom left corner of the frame 600, a point along any of the sides of the frame 600, a point outside of the frame 600, a point inside of the frame 600, and/or the like. As described herein, by fixing an origin to a given point for one or more frames, the origin can be used to identify the location of point(s) along one or more regions (also referred to as random regions) of the frame 600.

In some embodiments, one or more regions of the frame can be involved in the execution of one or more applications. For example, one or more regions of the frame can be involved in execution of applications by an accelerator such as a VPU and/or PPE. In this example, the applications may perform operations during execution of the application, where the result of the operations are based at least on the values of the pixels in the one or more regions of the frame. In these examples, the accelerator can generate data that causes the DMA system to initiate one or more DMA transfers to cause data associated with the one or more regions to be transferred from the source memory to the destination memory. For purposes of clarity, the description of the movement of data associated with the one or more regions is described with respect to tiles 604*a*-604*d*. While the regions described herein are 2D, the present disclosure is not limited to only 2D regions, and one of ordinary skill will understand that the techniques described herein can be applied to regions that are one-dimensional (1D) and three-dimensional (3D).

In some embodiments, the tiles 604*a*-604*d* can be associated with portions of the frame 600. For example, a tile 604*a* can be associated with (e.g., correspond to) a discrete portion of the frame 600. In examples, tiles 604*b*-604*d* can be associated with portions of the frame 600 and portions that are outside of the frame 600. For example, tile 2 604*b* can be associated along a left portion (also referred to as a west portion) with a subset of pixels along a left portion of the frame 600. Tile 2 604*b* can also be associated with a portion that is outside of the frame 600 (e.g., beyond the frame 600). Similarly, tile 3 604*c* can be associated with a right portion and a downward portion (also referred to as a south-east portion) of the frame 600 and a portion that is outside of the south-east portion of the frame 600. Tile 4 604*d* can also be associated with a top portion (also referred to as a north portion) of the frame 600 and a portion that is outside of the north portion of the frame 600.

In some embodiments, the location of the tiles 604*a*-604*d* can be described as an offset (e.g., represented as a value indicating a positive offset or a negative offset) from the origin of the frame 600 relative to a point (e.g., a top-left-most point along each of the frames 604*a*-604*d*. For example, the location of the tiles 604*a*-604*d* can be described as an offset from the origin of the frame 600 along an X-axis (which extends from left to right) and from the origin of the frame 600 along a Y-axis (which extends from top to bottom). As illustrated in FIG. 6, the tile 604*a* can be described as located at a point that is offset by a distance X1, Y1, where X1 and Y1 correspond to a distance measured in pixels. Similarly, the tile 604*b* can be described as offset by X2, Y2; the tile 604*c* can be described as offset by X3, Y3; and the tile 604*d* can be described as offset by X4, Y4. In this particular example, the offset of tile 1 604*a* and tile 3 604*c* can correspond to points that are within the frame 600, and the offset of tile 2 604*b* and tile 4 604*d* can correspond to points that are not within the frame 600.

In some embodiments, data associated with the tiles 604*a*-604*d* can be transferred from a source memory (not explicitly illustrated) and a destination memory such as a VMEM 602. For example, an application executed by an accelerator can generate data configured to cause the DMA system to cause one or more DMA transfers such that the data associated with the tiles 604*a*-604*d* in the source memory is transferred to the destination memory (the data referred to also as descriptor addressing data that can involve to a descriptor addressing frame type). In this example, the accelerator can generate the data where the data includes multiple descriptors that correspond to the frame 600 and/or the tiles 604*a*-604*d*. While aspects of data transferred based on the frame 600 are described with respect to the VMEM 602, it will be understood that the aspects can be applied to transfers between system memory and VMEM when the applications described herein are executed by the VPU. However, it will be understood that the VMEM can be the source memory and the transfers described herein can involve transfers from the VMEM to another memory such as the DLSU.

Figure 7:
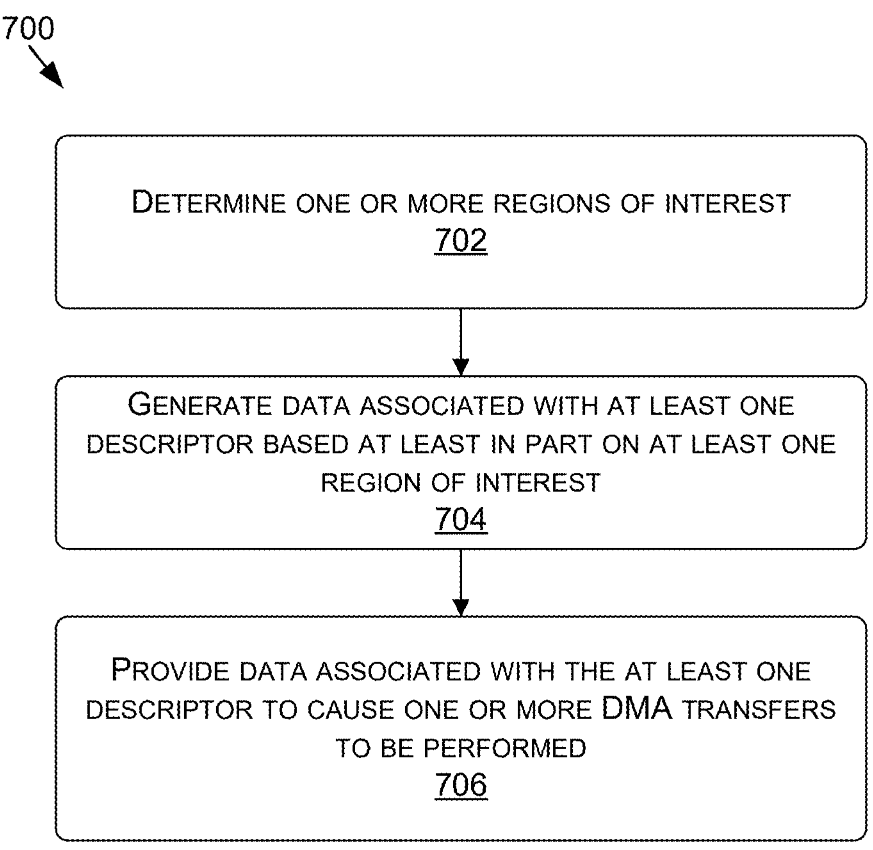
FIG. 7 is a flow diagram of an example method 700 for processing data based at least on random regions in a frame, in accordance with some embodiments of the present disclosure.

FIG. 7 is a flow diagram of an example method 700 for processing data based at least on random regions in a frame, in accordance with some embodiments of the present disclosure. In some embodiments, aspects of the method 700 can be performed by one or more devices that are the same as, or similar to, one or more of the devices of FIGS. 1A-1C such as, for example, the DMA systems 114, the VPUs 116, the PPEs 118, and/or the processor 102. In embodiments, one or more other devices of FIG. 1A can perform one or more aspects of the method 700. In some embodiments, one or more of the frame formats described herein can be the same as, or similar to, the one or more frame formats of FIGS. 4A-4C. In some embodiments, one or more of the frames and/or tiles of the frames can be the same as, or similar to, the frame 600 and/or the tiles 604*a*-604*d*.

The method 700, at block 702, includes determining one or more regions of interest. For example, a VPU can determine one or more regions of interest within a frame. The regions of interest can include portions of the frame that correspond to objects (which can include physical objects such as traffic cones, traffic lights, and agents that can move within the environment such as pedestrians, vehicles, and/or the like) in an image generated by a sensor. The sensor can include a camera installed on a robotic system such as an automated vehicle, a warehouse vehicle, and/or the like while that generates sensor data while operating in an environment, the sensor data including data associated with the frame.

In some embodiments, the VPU can determine the one or more regions of interest within a frame based at least on one or more operations performed by an application executed by the VPU. For example, the VPU can execute an application such as an object tracking application that involves tracking the relative movement of the objects across frames in time. During execution of the object tracking application, the VPU can perform one or more operations that result in determinations about the positions of objects, movement of object (for example from times t=−1 to a time t=0), and/or predicted positions of objects (e.g., for example at time t=1). Examples of operations involved in object tracking can include object detection to determine one or more objects present in one or more frames, identification (ID) assignment to correlate the location of an object across one or more frames in time, tracking the motion of the object in the frames and/or the environment based at least on the correlated locations of the object across the one or more frames, and prediction of possible and/or likely future positions of the object within future frames and/or the environment.

In some embodiments, as the one or more operations are performed, the operations can include results that correspond to requests for data associated with tiles of future frames, the tiles corresponding to a region of interest. For example, in the context of object tracking, an object may be determined to be at a location (e.g., within a region) of a given frame (e.g., at a current frame, at time t=0). In this example, the one or more operations can involve determining a future region of interest such as an expected region where the object is or may be located and generating a request for data associated with one or more tiles that are associated with the future region of interest. The determination of the future region of interest can be based at least on movement of the object relative to the robotic system, movement of the object relative to the environment in which the robotic system is operating, a size (e.g., length and width represented in either a derived length and width of the object or pixels bounding the object in the frame) bounding the region of interest containing the object at a current point in time and/or as expected at a future point in time, a change in the size bounding the region of interest over time (e.g., at points in time leading up to, and/or including a current point in time), a change in the size bounding the region of interest that is expected at points in time in the future, and/or the like. While the tiles represented by the frame 600 of FIG. 6 are uniform in size, it will be understood that the operations can indicate changes in size of one or more of the tiles such that the region of interest can be adjusted dynamically to match the representation of the object in the frame(s).

The method 700, at block 704, includes generating data associated with at least one descriptor based at least on at least one region of interest. For example, the VPU can generate data associated with the at least one descriptor based at least on the at least one region of interest. In some embodiments, the at least one descriptor can correspond to data that is stored in the source memory of an existing frame or a future frame. For example, the VPU can generate the at least one descriptor to include an offset (e.g., along an X-axis and Y-axis) relative to an origin common to the frames and a size (e.g., from the offset along the X-axis and Y-axis) of the region of interest bounding the object within the region of interest.

In some embodiments, the VPU can generate data associated with a first descriptor and one or more second descriptors. For example, the VPU can generate the data associated with the first descriptor such that the first descriptor corresponds to the entire frame or a region of the frame encompassing the region of interest within the frame. In this example, the first descriptor can include one or more second descriptors. The one or more second descriptors can correspond to each region of interest that bounds each object within the frame that is involved in the one or more operations performed by the VPU. In this way, the VPU can be configured to batch descriptors corresponding to multiple tiles associated with regions of interest so that the corresponding DMA transfers are performed sequentially without the need to reconfigure the DMA system to perform respective DMA transfers for each tile. In some embodiments, each of the one or more second descriptors can likewise be associated with an offset and/or size that indicate a position of a point along the tile relative to a point along (or in proximity to) the frame.

In some embodiments, the VPU can determine one or more updates to be performed to the data associated with the one or more tiles. For example, the VPU can determine one or more updates to be performed based at least on the position of the tiles relative to the frame. In some examples, the one or more updates can be associated with an overlap between the tiles and the frame. In these examples, the overlap can include an overlap of a tile with an edge of the frame, such that a portion of the tile is encompassed by the frame and a portion of the tile is not encompassed by the frame. As shown in FIG. 6, examples of overlaps are illustrated by tile 2 604*b*, tile 3 604*c*, and tile 4 604*d*. In some embodiments, the VPU can determine the one or more updates to be performed, where the one or more updates include updates to values involved in an overlap between a tile and a frame where the values are associated with pixels that extend beyond (e.g., are not encompassed by) the frame. For example, the VPU can determine one or more padding values corresponding to pixels of a tile that extend beyond a frame. The values can include a default value (e.g., a predetermined intensity and/or color value), a value corresponding to one or more pixels of the tile that are adjacent to the pixels not encompassed by the frame, and/or the like. In some embodiments, the VPU can generate the data associated with the one or more second descriptors that involve an overlap between a tile and a frame, such that during the DMA transfer the DMA system updates the values as described herein.

The method 700, at block 706, includes providing data associated with the at least one descriptor to cause one or more DMA transfers to be performed. For example, the VPU can provide the data associated with the at least one descriptor to a DMA system by transferring the data to VMEM and sending a signal to the DMA system to indicate the data associated with the at least one descriptor is transferred into the VMEM. In this example, the data associated with the at least one descriptor can configure and cause the DMA system to cause the one or more corresponding DMA transfers to be performed. In this way, the VPU can cause the DMA system to manage DMA transfers involved in operations being performed, or to be performed, by the VPU so as to reserve processing and memory resources for the operations being performed by the VPU.

Inter-Accelerator Data Transfers

A PPE including a two-dimensional (2D) array of interconnected PEs (e.g., in a torus topology) can address inefficiencies associated with implementing spatially-dependent algorithms using accelerators such as a VPU. In some embodiments, the PPE can read data associated with an image into the PPE, and each PE can communicate with other local PEs to perform certain operations (e.g., filtering and/or the like) in coordination with one another and with greater efficiently than the VPU or similar accelerators. Because each PE can communicate with local PEs, the need to request additional information from memory is reduced. However, the width of a given PE array can affect the overall efficiency of the PPE. For example, when applying a 3×3 pixel filter on a 32-bit image loaded into a PPE of size 8×10 pixels, the output of the PPE will be 6×8 pixels-resulting in an efficiency of 60%. This is calculated by multiplying the length and width of the usable output of the PPE (e.g., 6×8) and dividing that output by the overall size of the PPE array (e.g., (8×10)). This efficiency can be determined based at least on the outside rows and columns of PEs not being accessible to the values of the adjacent pixels and, as such, the 3×3 filter cannot be applied to pixels in these rows and columns.

Efficiency can be gained by enabling inter-accelerator communication and, in some implementations, by operating on lower-bit images. For example, the efficiency of a PPE of size 8×10 can be calculated as (14×8)/(16×10)=70%, where the size of the PPE is now 16×10 as two 16-bit pixels can be stored per PE in place of a single 32-bit pixel. In this specific example, the efficiency of the PPE can continues to degrade as the PPE implements filters of increasing size (e.g., 5×5, 7×7, etc.), resulting in more unusable columns. By allowing for the transferring and storing of data within registers of the PEs of a PPE, calls to memory can be minimized when processing the pixels in the PPE. For example, with continued reference to the 3×3 filter as applied to an 8×10 sample of an image loaded into a PPE, a series of shifts of data involving that PE and sets of other directly or indirectly interconnected PEs to obtain and store the necessary pixel values to apply the 3×3 filter in that PE. This includes pixels above and to the left that would otherwise be inaccessible. And in another example, in the case where two adjacent tiles of an image (referred to as blocks) are loaded into the PPE, the bottom row of PEs that have access to a bottom row of pixels in a first block can communicate with the top row of PEs that have access to a top row of the next consecutive block. The same can be done as more blocks are loaded into the PEs in each direction (north, south, east, and west), enabling the PEs to store and access data that would otherwise require reads and/or writes to memory.

When implemented, the systems and methods described herein allow for the use of PEs in a PPE that can execute spatially dependent algorithms on a pixel-by-pixel basis in parallel. By enabling the PEs to access data within the PPE or in memory at greater distances, and by loading in multiple blocks at once, the efficiency of a given spatial algorithm can be improved as more rows and/or columns of data are accessible than would otherwise be the case if PEs could only receive data at the individual PEs, reducing the calls to memory that would otherwise be needed. For example, when multiple blocks corresponding to contiguous portions of an image are loaded into the PEs, the PEs can reduce the number of overall calls that would otherwise be needed to memory. This, in turn, enables the PPE to perform operations in fewer cycles and eliminate (or at least minimize) the number of unusable pixels that are output post-operation.

FIGS. 8A-8F are example representation of inter-accelerator data transfers, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the example inter-accelerator data transfers may be included in, and/or may include similar components, features, and/or functionality to that of example autonomous vehicle 1500 of FIGS. 15A-15D, example computing device 1600 of FIG. 16, and/or example data center 1700 of FIG. 17.

Figure 8A:
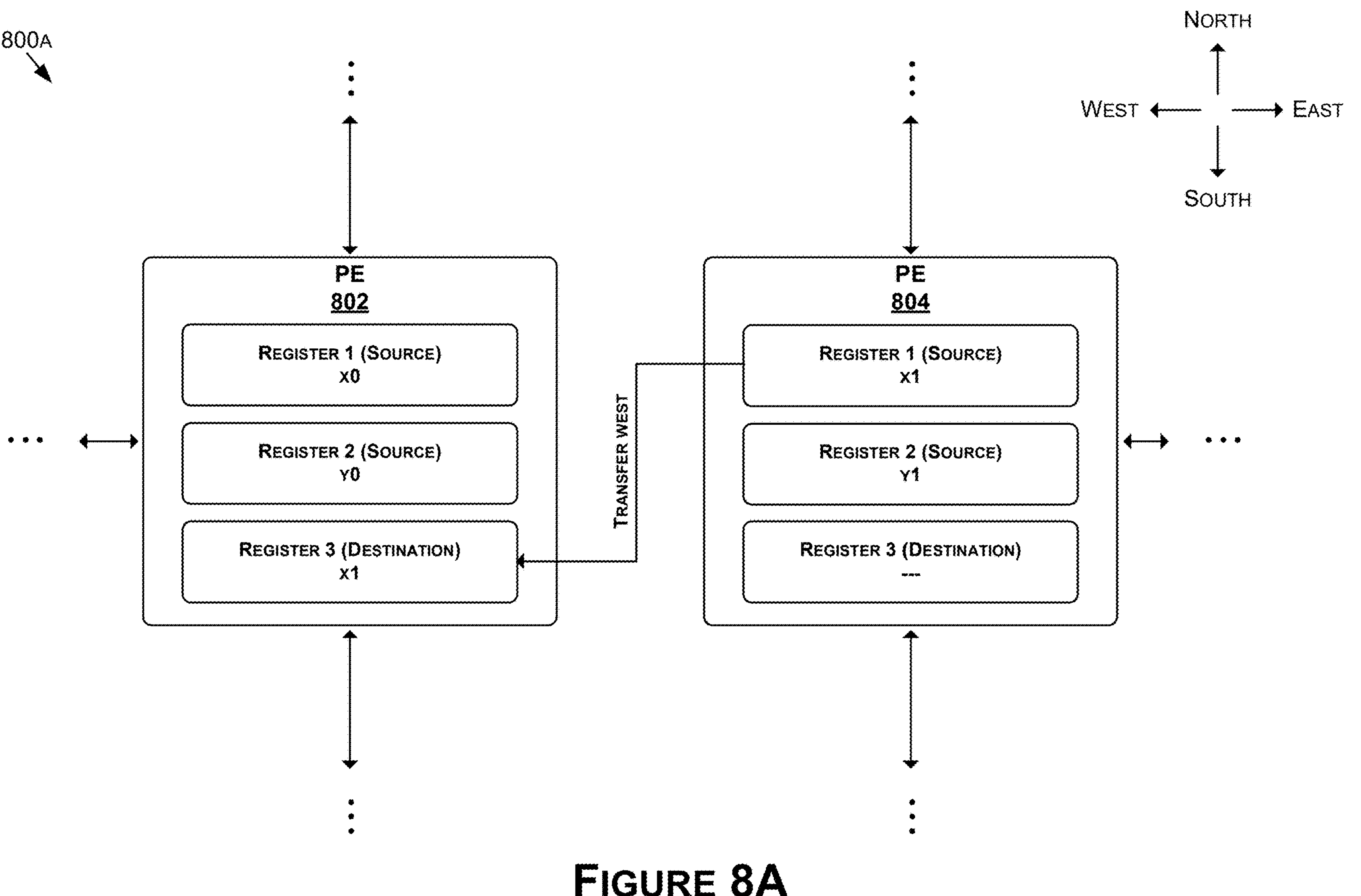
FIGS. 8A-8F are example representation of inter-accelerator data transfers, in accordance with some embodiments of the present disclosure.
Figure 8B:
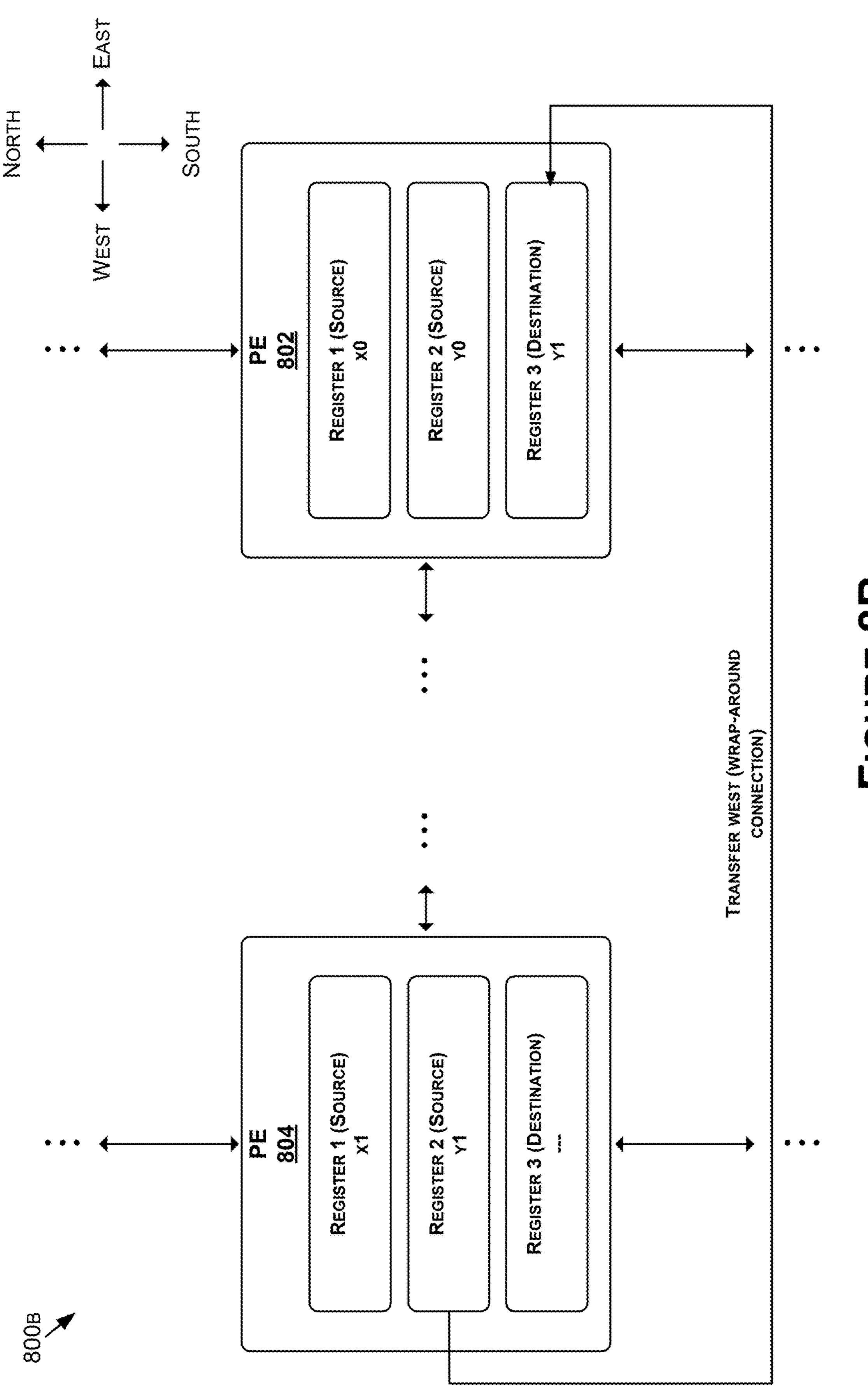

In some embodiments, inter-accelerator data transfers can include (e.g., be implemented by) components of one or more accelerators (e.g., one or more accelerators such as the PPEs 118 of FIG. 1A). For example, inter-accelerator data transfers can be implemented by a PE 802 and a PE 804. In these examples, the PE 802 and the PE 804 can be included in a PPE that is the same as, or similar to, the PPEs 118 of FIG. 1, and the PE 802 and the PE 804 can be the same as, or similar to, the PE 170 of FIG. 1C. In some embodiments, the PE 802 and the PE 804 can be adjacent to one another in the PPE. For example, the PE 802 can be physically positioned west of the PE 804 as illustrated in FIG. 8A. In another example, the PE 802 can be physically positioned east of the PE 804 as illustrated in FIG. 8B. In this example, the PE 802 and the PE 804 can interconnect such that the PE 802 is configured to receive data via a wrap around connection from the PE 804. For purposes of clarity, the examples described herein, the inter-accelerator data transfers will be discussed with respect to transfers to the west (e.g., from a first PE that is transferring data to a second PE that is positioned either physically west relative to the first PE or logically west via a wrap around connection relative to the first PE). It will be understood that other transfers and sequences of transfers are contemplated. For example, a PE can transfer data to another PE via a transfer to the north (e.g., from a first PE that is transferring data to a second PE that is positioned either physically north relative to the first PE or logically north via a wrap around connection relative to the first PE), a transfer to the south (e.g., from a first PE that is transferring data to a second PE that is positioned either physically south relative to the first PE or logically south via a wrap around connection relative to the first PE), or a transfer to the east (e.g., from a first PE that is transferring data to a second PE that is positioned either physically east relative to the first PE or logically east via a wrap around connection relative to the first PE).

Referring now to FIG. 8A, the example inter-accelerator data transfer 800*a* illustrates a transfer west between the PE 802 and the PE 804 where the PE 802 and the PE 804 are both located adjacent to one another in an array of a PPE configuration (e.g., a PPE configuration that is the same as, or similar to, the PPE configuration 200 of FIG. 2). In some embodiments, the PEs 802 and 804 can each include three registers (e.g., registers that are the same as, or similar to, registers of the register memory 174 of PE 170). For example, the PEs 802 and 804 can include a first register "Register 1", a second register "Register 2" and a third register "Register 3". In this example, the first register and the second register can include source registers (e.g., registers that store data that is transferred to a different register of the same PE or a different PE, as described herein). The third register can include a destination register (e.g., a register that is configured to receive and store data that is transferred from a source register). While the PEs 802 and 804 of FIGS. 8A and 8B are described with respect to three registers, it will be understood that contemplated embodiments can include different numbers of source and destination registers.

In some embodiments, the source and destination registers of the PEs 802 and 804 can be configured to store data associated with a pixel. For example, the source and destination registers of the PEs 802 and 804 can be configured to store data represented using 32 bits (referred to as a "word" data type). In examples, the source and destination registers of the PEs 802 and 804 can be configured to store data represented using 48 bits (referred to as an "extended-precision" word data type). In the examples described herein, the word data type and half-word data type (described with respect to FIGS. 8C-8F) can represent portions of an image (e.g., pixels of an image). While reference will be made throughout the description of at least FIGS. 8A-8F to pixels of images, it will be understood that the data the source and destination registers the PEs 802 and 804 are configured to store can represent any suitable form of data including LiDAR data associated with a point cloud, RADAR data associated with a RADAR image, and/or the like.

In some embodiments, the PEs 802 and 804 can receive data associated a first block (also referred to as a tile) and/or a second block. For example, the PEs 802 and 804 can receive the data associated with the first block and/or the second block, where each block represents a portion of an image. In one example, an image can be subdivided into multiple blocks by a processor (not explicitly illustrated) and stored in system memory. In this example, the data associated with one or more of the blocks of the image can be transferred via at least one DMA transfer to a VMEM and, subsequently, to a DLSU before being transferred into the PPE. It will be understood that the system memory, DMA system, VMEM, and DLSU can be the same as, or similar to, the memory 108, DMA systems 114, VMEMs 112, and DLSUs 124 of FIG. 1A). The data associated with the first block and/or the second block can be transferred and stored by first register and the second register of the PEs 802 and 804. In this way, the PEs 802 and 804 can store data associated with the first block in respective first registers and the data associated with the second block in respective second registers. By storing (e.g., stacking) data associated with multiple blocks in corresponding registers of the PEs 802 and 804 as described, the inter-accelerator data transfers (also referred to as shifts or inter-accelerator shifts) described herein can allow for operations to be performed on images that are wider and/or taller than the PE configuration would otherwise be capable of supporting.

In some embodiments, the PEs 802 and 804 can each receive an instruction (e.g., a SIMD instruction) from a PE controller interconnected with the PEs 802 and 804 (not explicitly illustrated) to perform a transfer west operation (also referred to as a transfer west). For example, the PEs 802 and 804 can receive an instruction to perform a transfer west operation based at least on the data associated with a first block (illustrated as variables "x1" and "x0" which can correspond to values representing the corresponding pixels) that is stored in the first register of the PEs 802 and 804. In this example where the instruction causes the PEs 802 and 804 to perform a transfer west operation based at least on the data associated with the first block, the PE 804 can transfer the data associated with the first block ("x1") stored in the first register of the PE 804 to the PE 802, and the PE 802 can store that data in the third register of the PE 802. In some embodiments, the instruction can cause the PE 802 to perform one or more additional operations. For example, the instruction can cause the PE 802 to perform one or more arithmetic operations that can involve adding, subtracting, multiplying or dividing the value stored in the third register ("x1") of the PE 802 to the value stored in the first register ("x0") of the PE 802. In examples, the instruction can cause the PE 802 to perform one or more additional transfers. For example, the instruction can cause the PE 802 to transfer the value stored in the third register ("x1") to one or more other PEs of the PPE configuration. It will be understood that, in some embodiments, the instructions can include sequences of shifts and arithmetic operations to be performed such that one or more functions are performed by the PEs of the PE configuration. These functions can be associated with, for example, filtering functions (e.g., implementation of 3×3 filters, 5×5 filters, 7×7 filters, and/or the like), bandpass filtering functions, matrix multiplication functions, image processing functions (e.g., implementation of color or intensity adjustments) and/or the like. In some embodiments, the PEs can then transfer the data out (via one or more write streams) back into the DLSU.

Referring now to FIG. 8B, the example inter-accelerator data transfer 800*b* illustrates a transfer west between the PE 802 and the PE 804 where the PE 802 and the PE 804 are not located adjacent to one another in an array of the PPE configuration. As described above with respect to FIG. 8A, the PEs 802 and 804 can receive data associated a first block and/or a second block. In some embodiments, the PEs 802 and 804 can each receive an instruction from the PE controller interconnected with the PEs 802 and 804 to perform a transfer west operation. For example, the PEs 802 and 804 can receive an instruction to perform a transfer west operation based at least on the data associated with a first block (illustrated as variables "x1" and "x0") and the data associated with the second block (illustrated as variables "y1" and "y0"). In this example where the instruction causes the PEs 802 and 804 to perform a transfer west operation based at least on the data associated with the first block and the second block, the PE 804 can transfer the data associated with the second block ("y1") stored in the second register of the PE 804 to the PE 802, and the PE 802 can store that data in the third register of the PE 802. Similar to as described above, the instruction can cause the PE 802 to perform one or more additional operations such as subsequent shifts and/or arithmetic operations. In this way, the PEs 802 and 804 can transfer data therebetween to perform operations on adjacent, contiguous blocks of an image without additional reads or writes into or out of the PEs of the PE configuration. In some embodiments, the PEs can then transfer the data out (via one or more write streams) back into the DLSU.

Figure 8C:
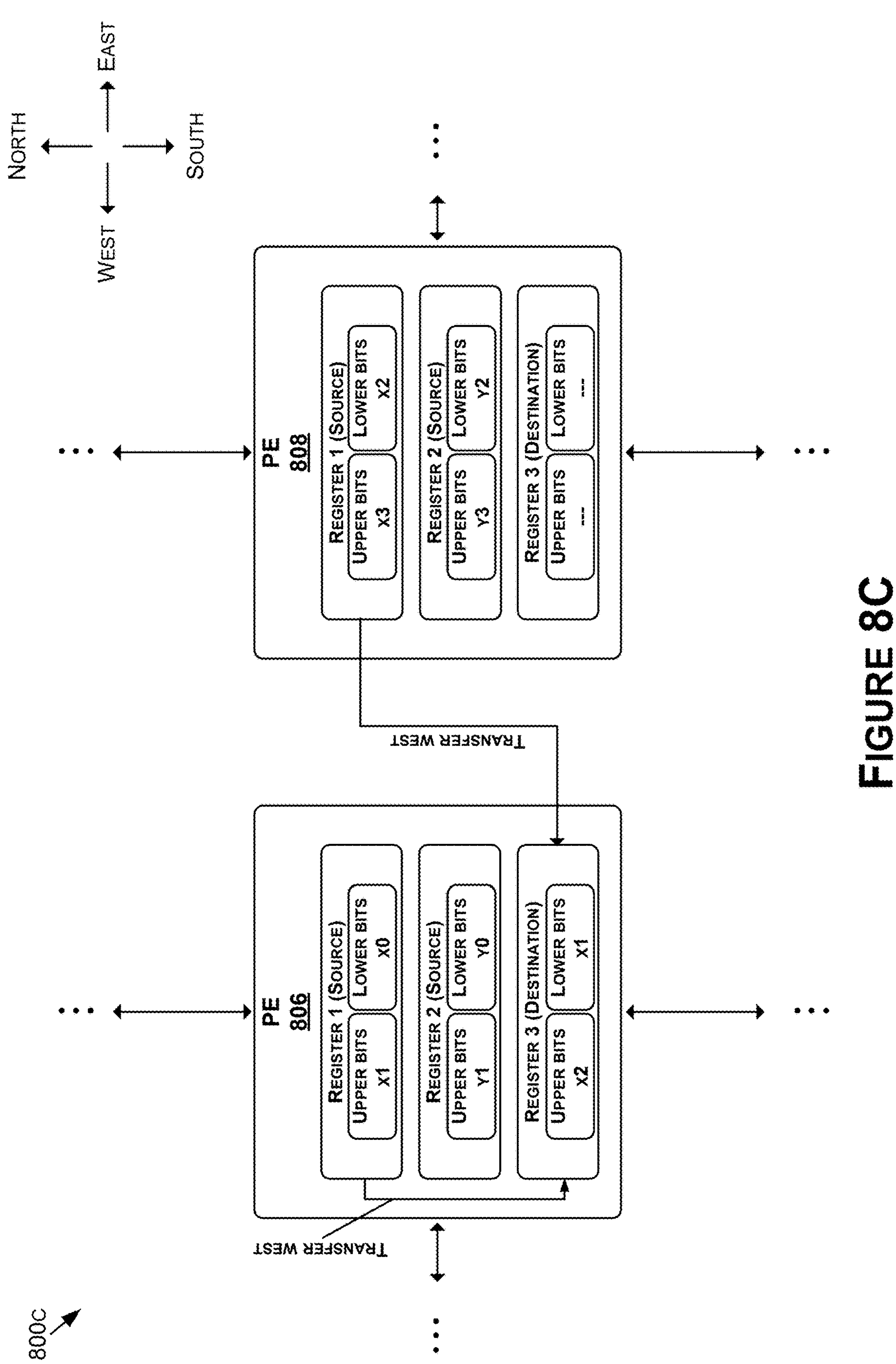
Figure 8D:
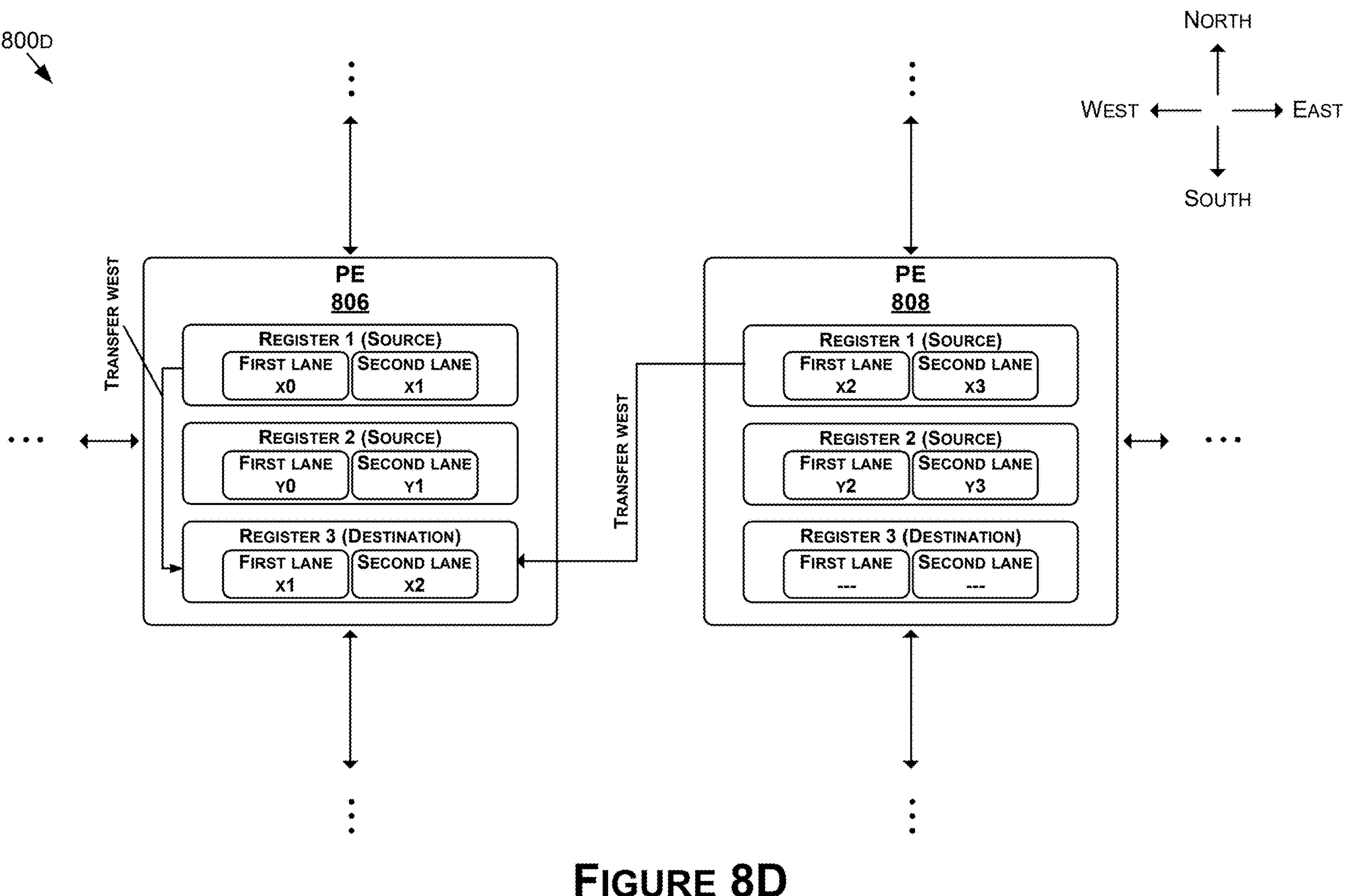

Referring now to FIGS. 8C and 8D, the example inter-accelerator data transfer 800*c* illustrates a transfer west between the PE 806 and the PE 808 where the PE 802 and the PE 804 are both located adjacent to one another in an array of a PPE configuration (e.g., a PPE configuration that is the same as, or similar to, the PPE configuration 200 of FIG. 2). In some embodiments, the PEs 806 and 808 can each include three registers (e.g., registers that are the same as, or similar to, registers of the register memory 174 of PE 170). For example, the PEs 806 and 808 can include a first register "Register 1", a second register "Register 2" and a third register "Register 3". In this example, the first register and the second register can include source registers (e.g., registers that store data that is transferred to a different register of the same PE or a different PE, as described herein). The third register can include a destination register (e.g., a register that is configured to receive and store data that is transferred from a source register). While the PEs 806 and 808 of FIGS. 8C-8F are described with respect to three registers, it will be understood that contemplated embodiments can include different numbers of source and destination registers.

In some embodiments, the source and destination registers of the PEs 806 and 808 can be configured to store data associated with one or more pixels. For example, the source and destination registers of the PEs 806 and 808 can be configured to store data represented using 16 bits (referred to as a "half word" data type). In examples, the source and destination registers of the PEs 806 and 808 can be configured to store data represented using 24 bits (referred to as an "extended-precision" half word data type). In some embodiments, the registers can be configured to store data associated with multiple pixels. For example, where the register size of the PEs 806 and 808 is 32 bits, each register can be configured to store data associated with a first pixel and/or a second pixel, where each pixel is represented using 16 bits. In examples, where the register size of the PEs 806 and 808 is 48 bits (extended-precision), each register can be configured to store data associated with a first pixel and/or a second pixel, where each pixel is represented using 24 bits. As will be described herein, where the data associated with two pixels are stored in a register of the PEs 806 and 808 the bits corresponding to each pixel can be referred to as being "upper bits" or "lower bits," or as being transferred in accordance with a "first lane" (corresponding to the lower bits) and a "second lane" (corresponding to the upper bits). As will be appreciated, the data associated with the first pixel and the second pixel in a given register or across multiple registers can be stored in accordance with a Little Endian convention, such that the bits are ordered with the least significant bit (LSB) being stored in the lowest memory address, and the most significant bit (MSB) being stored in the highest memory address of a given register or set of registers.

Referring now to FIG. 8C the PEs 806 and 808 can receive data associated a first block and/or a second block as described herein. For example, the PEs 806 and 808 can receive the data associated with the first block and/or the second block, where each block represents portions of an image. In this example, the portions associated with the first block and/or the second block received by the PEs 806 and 808 can each represent multiple, adjacent portions (e.g., adjacent pixels) of the image. As illustrated, the data associated with the first block that is received by the PE 806 can include a set of lower bits corresponding to a value ("x0") representing a first pixel of the first block and a set of upper bits corresponding to a value ("x1") representing a second pixel of the first block that is adjacent to the first pixel of the first block. Similarly, the data associated with the second block that is received by the PE 806 can include a set of lower bits corresponding to a value ("y0") representing a first pixel of the second block and a set of upper bits corresponding to a value ("y1") representing a second pixel of the second block that is adjacent to the first pixel of the second block. PE 808 is illustrated as similarly receiving data associated with the first block and second block, where the data associated the first block (upper bits: "x3"; lower bits: "x2") and second block (upper bits: "y3"; lower bits "y2") is stored in the first register and the second register of the PE 808, respectively.

In some embodiments, the PEs 806 and 808 can each receive an instruction (e.g., a SIMD instruction) from a PE controller interconnected with the PEs 806 and 808 to perform a transfer west operation. For example, the PEs 806 and 808 can receive an instruction to perform a transfer west operation based at least on the data associated with a first block that is stored in the first register of the PEs 806 and 808. In some embodiments, the instruction causes the PEs 806 and 808 to perform a transfer west operation associated with the first block, during which the PE 808 can transfer at least a portion of the data associated with the first block ("x2") stored in the first register of the PE 808 to the PE 806, and the PE 806 can store that data in the third register (e.g., in the portion corresponding to the upper bits of the third register) of the PE 806. The PE 806 can also transfer at least a portion of the data associated with the first block ("x1") in the first register of the PE 806 to the third register (e.g., in the portion corresponding to the lower bits of the third register) of the PE 806. In this way, the PEs 806 and 808 can shift portions of data stored in each of the registers involved in a transfer operation between registers of each PE and within registers of each individual PE to cause a transfer west operation to be performed.

In some embodiments, the instruction can cause the PE 806 to perform one or more additional operations. For example, the instruction can cause the PE 806 to perform one or more arithmetic operations that can involve adding, subtracting, multiplying or dividing the value stored in at least a portion of the third register of the PE 806 with one or more of the values stored in at least a portion of the first register of the PE 806. In examples, the instruction can cause the PE 802 to perform one or more additional transfers. It will be understood that, in some embodiments, the instructions can include sequences of shifts and arithmetic operations to be performed such that one or more functions are performed by the PEs of the PE configuration, as described above. In some embodiments, the PEs can then transfer the data out (via one or more write streams) back into the DLSU.

Referring now to FIG. 8D, the transfer operations involving PEs 806 and 808 are illustrated with respect to transfers along lanes. In some embodiments, the PEs 806 and 808 can receive data associated a first block and/or a second block and store the data in the registers of each PE 806 and 808, similar to as described with respect to FIG. 8C. As illustrated, the data associated with the first block that is received by the PE 806 can be stored in association with a first lane (e.g., at least a portion of a register associated with a path involving one or more shifts within or between PEs 806 and 808) corresponding to a value ("x0") representing a first pixel of the first block and a second lane corresponding to a value ("x1") representing a second pixel of the first block that is adjacent to the first pixel of the first block. Similarly, the data associated with the second block that is received by the PE 806 can be stored in association with a first lane corresponding to a value ("y0") representing a first pixel of the second block and a second lane corresponding to a value ("y1") representing a second pixel of the second block that is adjacent to the first pixel of the second block. PE 808 is illustrated as similarly receiving data associated with the first block and second block, where the data associated the first block (first lane: "x2"; second lane: "x3") and second block (first lane: "y2"; second lane "y3") is stored in the first register and the second register of the PE 808, respectively.

In some embodiments, the PEs 806 and 808 can each receive an instruction from the PE controller interconnected with the PEs 806 and 808 to perform a transfer west operation based at least on the data associated with a first block that is stored in the first register of the PEs 806 and 808. In some embodiments, the instruction causes the PEs 806 and 808 to perform a transfer west operation associated with the first block, during which the PE 808 can transfer at least a portion of the data associated with the first block ("x2") stored in the first lane of the PE 808 to the PE 806, and the PE 806 can store that data in the third register (e.g., in the portion corresponding to the third lane of the third register) of the PE 806. The PE 806 can also transfer at least a portion of the data associated with the first block ("x1") in the second lane of the PE 806 to the third register (e.g., in the portion corresponding to the first lane of the third register) of the PE 806. In this way, the PEs 806 and 808 can shift portions of data stored in each of the registers across lanes involved in a transfer operation between registers of each PE and within registers of each individual PE to cause a transfer west operation to be performed.

Figure 8E:
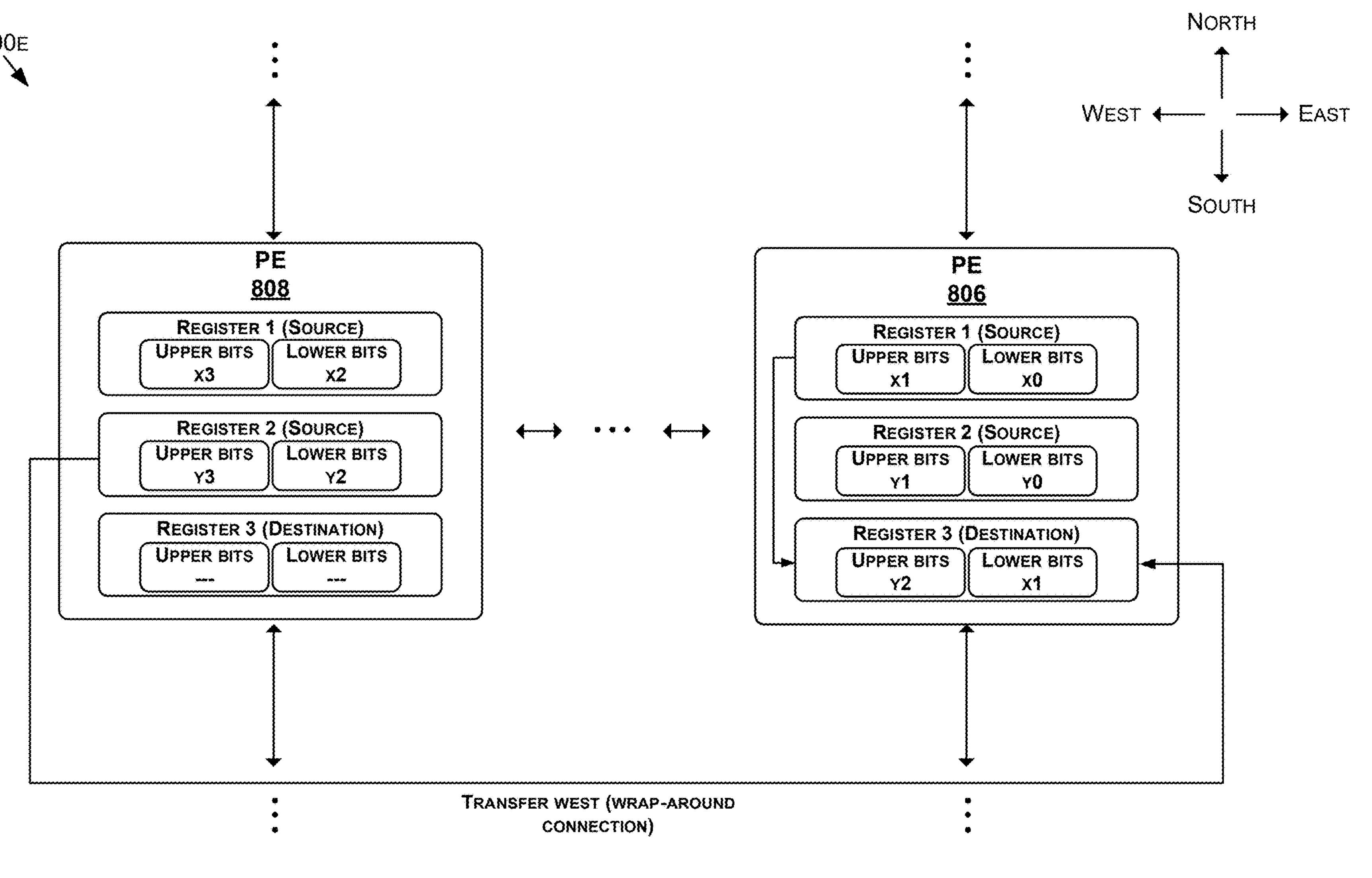

Referring now to FIG. 8E the PEs 806 and 808 can receive data associated a first block and/or a second block and store the data in the registers of the PEs 806 and 808. As illustrated, the data associated with the first block that is received and stored by the PE 806 can include a set of lower bits corresponding to a value ("x0") representing a first pixel of the first block and a set of upper bits corresponding to a value ("x1") representing a second pixel of the first block that is adjacent to the first pixel of the first block. Similarly, the data associated with the second block that is received by the PE 806 can include a set of lower bits corresponding to a value ("y0") representing a first pixel of the second block and a set of upper bits corresponding to a value ("y1") representing a second pixel of the second block that is adjacent to the first pixel of the second block. PE 808 is illustrated as similarly receiving data associated with the first block and second block, where the data associated the first block (upper bits: "x3"; lower bits: "x2") and second block (upper bits: "y3"; lower bits "y2") is stored in the first register and the second register of the PE 808, respectively. As illustrate, by FIG. 8E, the PEs 806 and 808 are logically adjacent to one another in the PPE configuration.

In some embodiments, the PEs 806 and 808 can each receive an instruction from a PE controller interconnected with the PEs 806 and 808 to perform a transfer west operation based at least on the data associated with a first block and the second block that is stored in the first register and the second register of the PEs 806 and 808, respectively. In some embodiments, the instruction causes the PEs 806 and 808 to perform a transfer west operation associated with the first block, during which the PE 808 can transfer at least a portion of the data associated with the second block (lower bits: "y2") stored in the second register of the PE 808 to the PE 806, and the PE 806 can store that data in the third register (e.g., in the portion corresponding to the upper bits of the third register) of the PE 806. The PE 806 can also transfer at least a portion of the data associated with the first block (upper bits: "x1") in the first register of the PE 806 to the third register (e.g., in the portion corresponding to the lower bits of the third register) of the PE 806. In this way, the PEs 806 and 808 can shift portions of data stored in each of the registers involved in a transfer operation between registers of each PE (involving a wrap-around connection) and within registers of each individual PE to cause a transfer west operation to be performed.

Figure 8F:
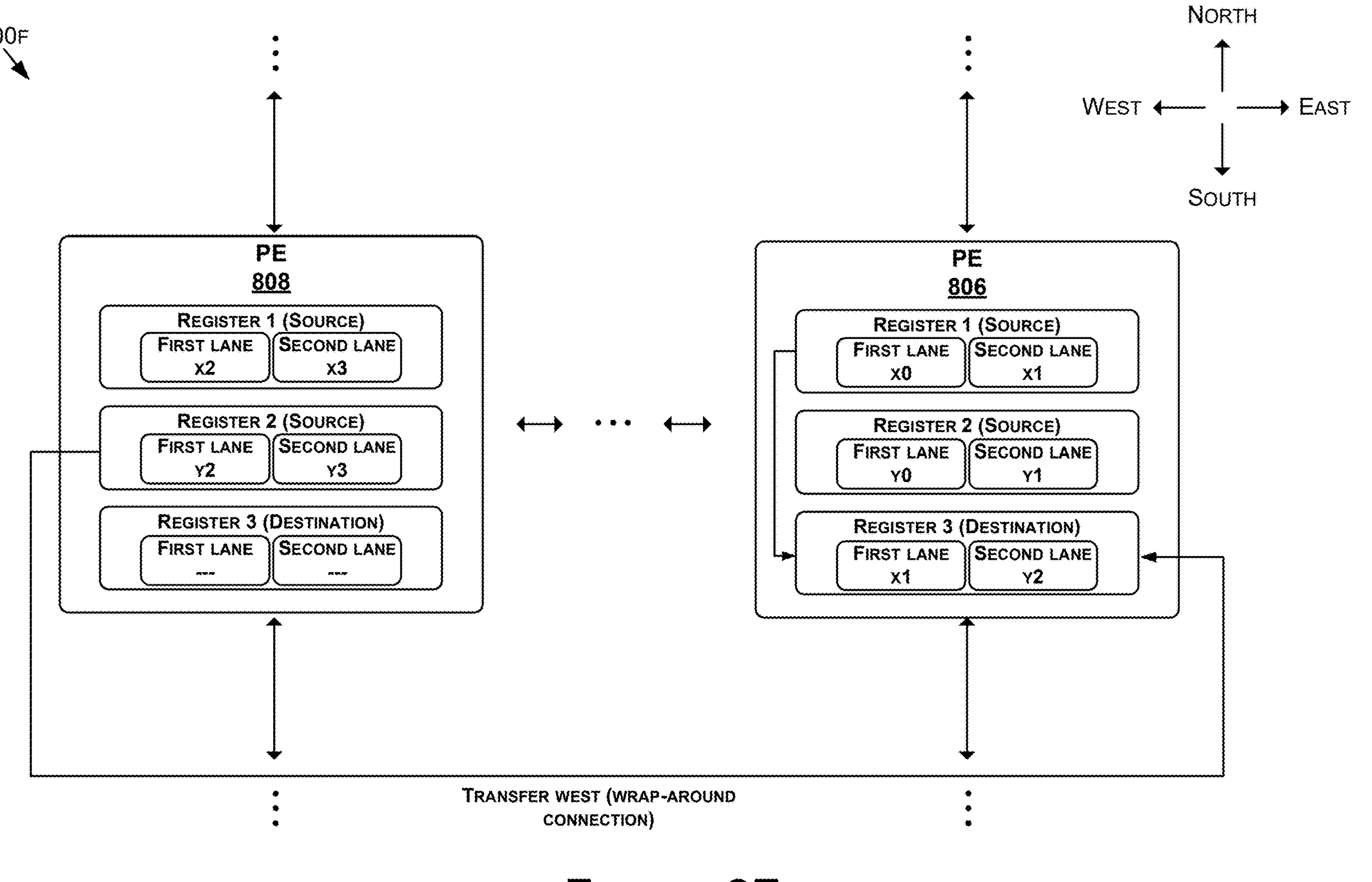

Referring now to FIG. 8F, the transfer operations involving PEs 806 and 808 are illustrated with respect to transfers along lanes. In some embodiments, the PEs 806 and 808 can receive data associated a first block and/or a second block as described herein, and store the data in the registers of each PE 806 and 808, similar to as described with respect to FIG. 8E. As illustrated, the data associated with the first block that is received by the PE 806 can be stored in association with a first lane (e.g., at least a portion of a register associated with a path involving one or more shifts within or between PEs 806 and 808) corresponding to a value ("x0") representing a first pixel of the first block and a second lane corresponding to a value ("x1") representing a second pixel of the first block that is adjacent to the first pixel of the first block. Similarly, the data associated with the second block that is received by the PE 806 can be stored in association with a first lane corresponding to a value ("y0") representing a first pixel of the second block and a second lane corresponding to a value ("y1") representing a second pixel of the second block that is adjacent to the first pixel of the second block. PE 808 is illustrated as similarly receiving data associated with the first block and second block, where the data associated with the first block (first lane: "x2"; second lane: "x3") and second block (first lane: "y2"; second lane "y3") is stored in the first register and the second register of the PE 808, respectively. As illustrate, by FIG. 8F, the PEs 806 and 808 are logically adjacent to one another in the PPE configuration.

In some embodiments, the PEs 806 and 808 can each receive an instruction from the PE controller interconnected with the PEs 806 and 808 to perform a transfer west operation based at least on the data associated with a first block that is stored in the first register of the PEs 806 and 808. In some embodiments, the instruction causes the PEs 806 and 808 to perform a transfer west operation associated with the first block, during which the PE 808 can transfer at least a portion of the data associated with the first block ("x2") stored in the first lane of the PE 808 to the PE 806, and the PE 806 can store that data in the third register (e.g., in the portion corresponding to the third lane of the third register) of the PE 806. The PE 806 can also transfer at least a portion of the data associated with the first block ("x1") in the second lane of the PE 806 to the third register (e.g., in the portion corresponding to the first lane of the third register) of the PE 806. In this way, the PEs 806 and 808 can shift portions of data stored in each of the registers across lanes involved in a transfer operation between registers of each PE and within registers of each individual PE to cause a transfer west operation to be performed.

Figure 9:
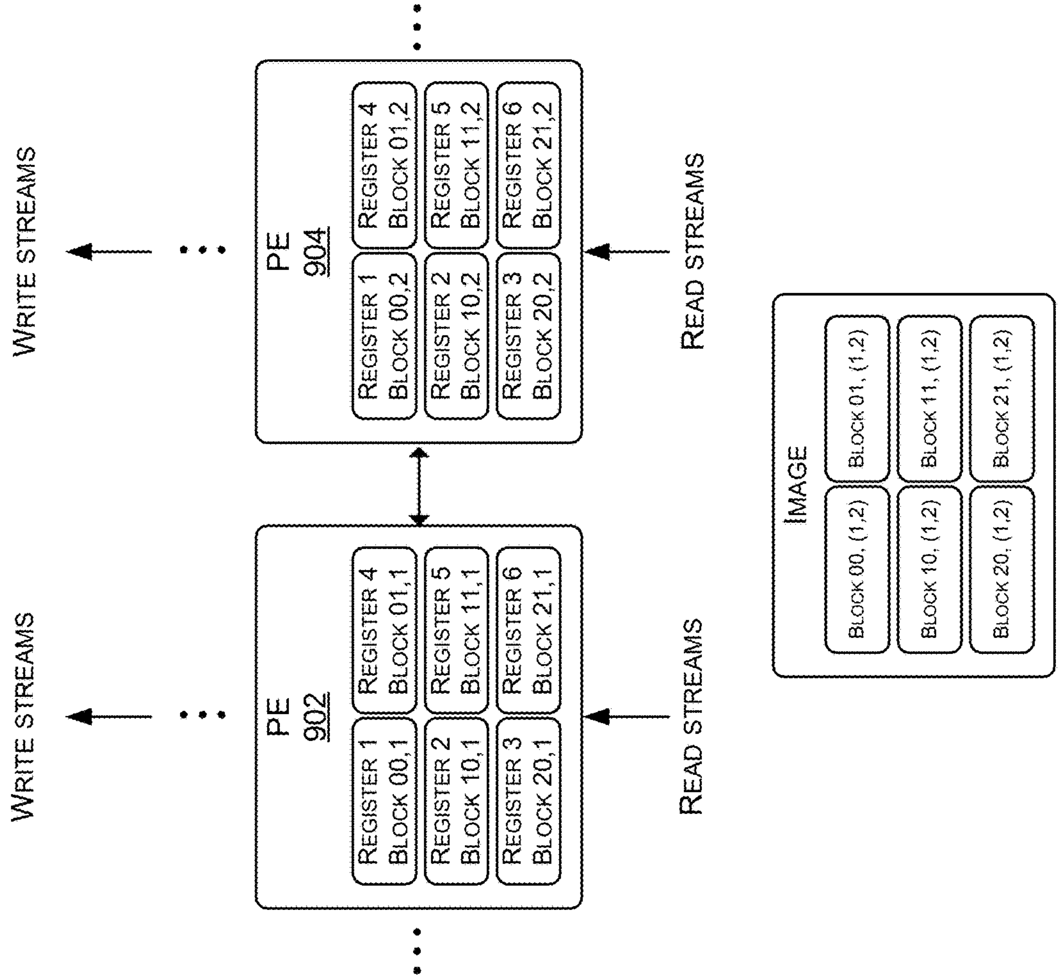
FIG. 9 is an example representation of a data layout across registers in PEs of a two-dimensional accelerator, in accordance with some embodiments of the present disclosure.
Figure 9:

While aspects of the present disclosure are discussed with respect to a single transfer west operation, it will be understood that sequences of transfers can result in different transfer directions. For example, with respect to the two-dimensional PPE discussed in FIG. 9, multiple transfer west operations can be instructed to the PEs such that data is rotated. An example sequence of transfers can include: transferring data in respective registers of the PEs as illustrated in FIG. 9 as follows: transferring data in PE registers storing block 00 with data in PE registers storing block 01; transferring data in PE registers storing block 01 with data in PE registers storing block 00; transferring data in PE registers storing block 10 with data in PE registers storing block 11; transferring data in PE registers storing block 11 with data in PE registers storing block 10; transferring data in PE registers storing block 20 with data in PE registers storing block 21; and transferring data in PE registers storing block 21 with data in PE registers storing block 20. In this way, the PEs can be instructed to perform data shifts to allow for rotation of data within the PPE. This can also allow for complex functions to be performed such as matrix multiplication for an equation C=A*B such that each row i of A can meet with each column j of B to contribute to C [i] [j]. Further, while aspects of the present disclosure are discussed with respect to operations that can be performed in accordance with local PEs (e.g., filtering operations), the PEs of the PPE can be instructed such that two dimensional data that does not match the size of the PPE is processed. For example, in comparison with a 2×3 or 3×3 block, the PPE can be configured to receive data associated with a longer one or two dimensional shapes (e.g., 1×10, or 1×100). Instructions can then be provided to the PEs to perform operations based at least on data stored in registers of PEs that are physically or logically adjacent east and west of the PE, and in some cases no instructions can be provided to perform operations based at least on values of PEs that are physically or logically north or south of the PE.

In an example, with respect to an 8×10 PPE (FIG. 1B), for data that is parsed such that the blocks of the data have a greater difference in ratio of width to height than other blocks (for example, 2048×4 (wide and short) or 8×1024 (thin and tall)), one or more DMA transfers may involve mapping the data into blocks represented as 2048×10, and 8×1024 as 32×1030. In examples, with an alternate one dimensional organization, the PEs can receive and operate as 320×1 block size. This can result in mappings where 2048×4 can be mapped as 2240×4, and 8×1024 as 8×1280 (for the thin and tall problem size, the PPE supports transposed vector loads where the DMA transfer involved in loading the PPE involves swapping the rows and columns of the data loaded into the PPE to operate in 1×320 block size). This segmentation and mapping can result in utilization of the PE array is improved to 91% and 80% respectively.

FIG. 9 is an example representation of a data layout across registers in PEs of a two-dimensional accelerator, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the example inter-accelerator data transfers may be included in, and/or may include similar components, features, and/or functionality to that of example autonomous vehicle 1500 of FIGS. 15A-15D, example computing device 1600 of FIG. 16, and/or example data center 1700 of FIG. 17.

In some embodiments, the example representation of a data layout across registers can include (e.g., be implemented by) components of one or more accelerators (e.g., one or more accelerators such as the PPEs 118 of FIG. 1A). For example, inter-accelerator data transfers can be implemented by PEs 902 and 904 that are physically adjacent to one another within a PPE configuration 900. It will be understood that the PPE configuration 900 can include additional PEs, or different configurations of PEs than those illustrated by FIG. 9. In some embodiments, the PE 902 and 904 can be the same as, or similar to, the PE 170 of FIG. 1C.

In some embodiments, the PEs 902 and 904 can receive data associated with an image. For example, the PEs 902 and 904 can receive data associated with an image, where the image is segmented into multiple blocks (or tiles). In the illustrated example, the image can be segmented along two columns and three rows. For example, the image can be segmented (e.g., during one or more DMA transfers) such that corresponding portions are provided to the accelerator such that the respective bits of a given block are loaded into the corresponding PEs 902 and 904.

In some embodiments, the bits of a first block (e.g., Block 00) can be loaded into PEs 902 and 904. In this example, the bits of the first block can be stored in the first register of the respective PEs 902 and 904. This process can be repeated for the remaining blocks in any order. For example, blocks 01, 10, 11, 20, and 21 can be loaded sequentially into the PEs 902 and 904. In another example, blocks 10, 20, 01, 11, and 21 can be loaded sequentially into the PEs 902 and 904. The PEs 902 and 904 can then be instructed to perform one or more operations (e.g., shifts and arithmetic operations as described with respect to FIGS. 8A-8E). Once the operations are complete, the PEs 902 and 904 can transfer the data associated with the blocks (that can be updated based at least on the operations performed) out of the accelerator via a write stream.

Figure 10A:
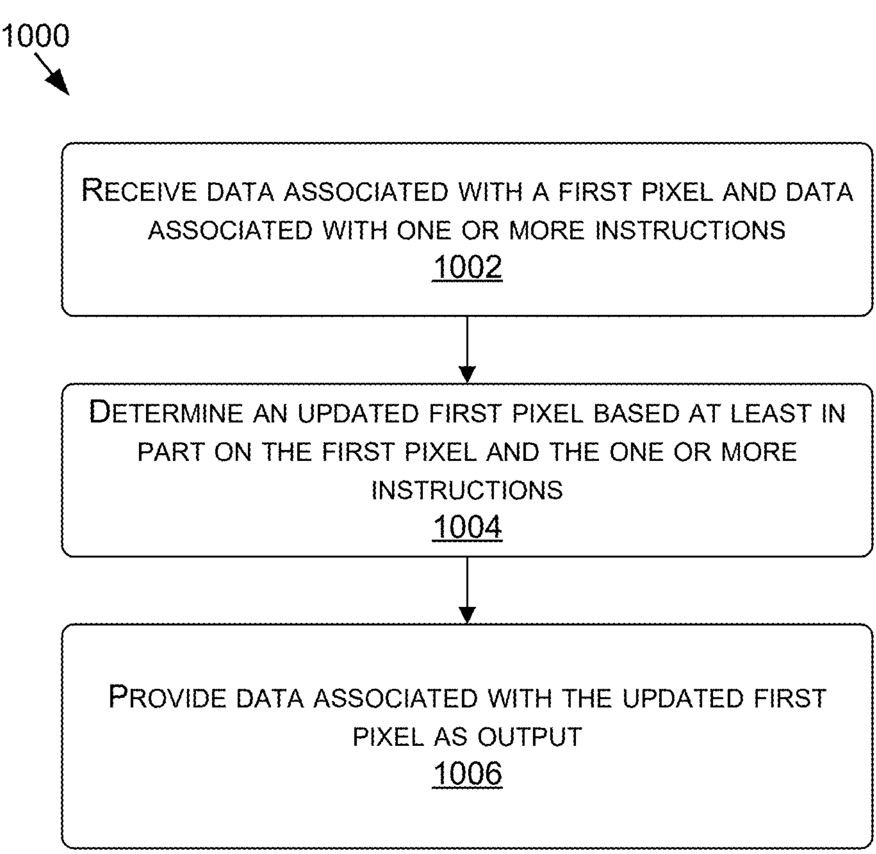
FIG. 10A is a flow diagram of an example method for performing inter-accelerator data transfers, in accordance with some embodiments of the present disclosure.

FIG. 10A is a flow diagram of an example method 1000 for performing inter-accelerator data transfers, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the frame 600 may be included in, and/or may include similar components, features, and/or functionality to that of example autonomous vehicle 1500 of FIGS. 15A-15D, example computing device 1600 of FIG. 16, and/or example data center 1700 of FIG. 17.

The method 1000, at block 1002, includes receiving data associated with a first pixel and data associated with one or more instructions. For example, one or more PEs (that are the same as, or similar to, the PE 170 of FIG. 1C and/or the PEs 802-808) can interconnect to form a PPE (e.g., a PPE that is the same as, or similar to, the PPEs 118 of FIG. 1A). In this example, each PE can be configured to receive the data associated with a first pixel that is obtained by the PPE via a read stream. The data associated with each pixel can be divided among a number of rows corresponding to a width of the PPE (e.g., as measured by the number of PEs in each row of the PPE) and corresponding portions of the data (e.g., representing one or more pixels of an image) can be provided to respective PEs in a first row of PEs within the PPE. The data can then be transferred sequentially across the PEs of the PPE (e.g., via transfer north operations) until the data associated with pixels for a given block or set of blocks (e.g., first block, second block, and/or the like) is received and stored in corresponding registers of the PEs (this process also referred to as "loading" the PPE). As an example, as shown in FIG. 1B, PEs **152*a*-152*h* can each receive data associated with one or more pixels via one or more read streams that correspond to a block of an image being loaded into the PPE 140. The data can then be transferred to one or more other PEs (e.g., via transfer north operations) in sequence (e.g., from PE 152*a* to PE 154*a* and so on until reaching PE 170*a***) until the data associated with each pixel is received and stored in corresponding registers of the PEs. In this way, the PPE can be loaded such that data associated with multiple blocks of an image are stored in corresponding registers of the PEs. It will be understood that, while discussion with respect to the data and transferred between PEs includes data associated with pixels of an image, that the techniques described herein are not limited to image data and can be applied to any form of data that is suitable for processing via a two-dimensional accelerator such as the PPEs discussed herein.

In some embodiments, the PEs can be configured to receive data associated with an instruction (e.g., a SIMD instruction). For example, the PEs can each interconnect with a PE controller that is configured to transmit the instructions to the PEs of the PPE. In this example, the instructions can represent one or more sequences of transfers of data between registers of the PEs or within registers of an individual PE and/or one or more arithmetic operations to be performed based at least on data stored in the registers of the PEs. In some embodiments, the instructions can be associated with one or more DMA transfers as described herein.

In some embodiments, the PEs can perform one or more data transfers. For example, the PEs can transfer the data associated with the first pixel (corresponding to the first block) to a register of a different PE in the PPE. In this example, the different PE can be located physically or logically north, south, east, or west relative to the PE transferring the data. In another example, the PEs can transfer the data associated with the first pixel to a different register within the PE. For example, where the registers are configured to contain upper bits and lower bits (e.g., corresponding to half word data types), the PE can transfer data internally from a source register to a destination register. For purposes of clarity, registers containing data that is later transferred can be referred to as source registers, and registers that receive the data from a different register can be referred to as a destination register.

The method 1000, at block 1004, includes determining an updated first pixel based at least on the first pixel and the one or more instructions. For example, one or more PEs of the PPE can determine an updated first pixel based at least on the data associated with the first pixel and the one or more instructions by adding, subtracting, or multiplying a value representing the first pixel to determine an updated value corresponding to the updated first pixel. This process can be repeated, for example, to cause the PEs to perform uniform operations on each individual pixel loaded into the PPE.

In some embodiments, one or more of the PEs can obtain data associated with at least one second pixel. As described above, an image can be subdivided into multiple blocks, and each block can be further subdivided based at least on a size of the block and/or a size of a source register that the data is being loaded into in the PPE. The data can then be loaded into respective registers the PEs of the PPE. In some embodiments, an instruction received by the PEs can cause the data associated with the first pixel to be transferred to one or more different PEs through one or more data transfers. For example, as illustrated by FIG. 8A, an instruction can cause the data stored in register 1 of the PE 804 to be transferred to the third register of PE 802. In this example, the PE 802 can then determine an updated first pixel based at least on the data associated with the first pixel that was loaded into the first register of the PE 802 and the data associated with the first pixel that was first loaded into the first register of the PE 804 and subsequently transferred to the third register of the PE 802. In some embodiments, an instruction received by the PEs can cause the data associated with the first pixel stored in a register of a PE to be transferred to one or more different registers of the PE through one or more data transfers. For example, as illustrated by FIG. 8C, an instruction can cause the data stored in register 1 of the PE 806 (illustrated as "x1") to be transferred to the third register of PE 806. The instructions can also cause data stored in register 1 of the PE 808 to be transferred to the third register of PE 806. In this example, the PE 806 can then determine an updated first pixel based at least on the data associated with one or more of the pixels loaded into the first register of the PE 806 and/or the data associated with one or more pixels loaded into the third register of the PE 806.

In some embodiments, the instructions provided to the PEs of the PPE from the PE controller can represent one or more sequences of transfers of data between registers of the PEs or within registers of an individual PE and/or one or more arithmetic operations to be performed based at least on data stored in the registers of the PEs. For example, the one or more sequences can include combinations of operations involving adding, subtracting, or multiplying a value representing the first pixel and operations involving transferring data associated with pixels between registers (of the same PE or between PEs). In this way, the instructions can cause the PEs to perform operations that perform higher-order functions such as, for example, filtering functions, bandpass filtering functions, matrix multiplication functions, image processing functions, and/or the like.

The method 1000, at block 1006, includes providing data associated with the updated first pixel as output. For example, each PE of the PPE can be configured to provide (e.g., transmit) the data associated with the updated first pixel to one or more other PEs and eventually out to memory (e.g., a VMEM or a DLSU) via a write stream. In some embodiments, the PEs can provide the data associated with the updated first pixel based on completing execution of the operations involved in the instruction.

Figure 10B:
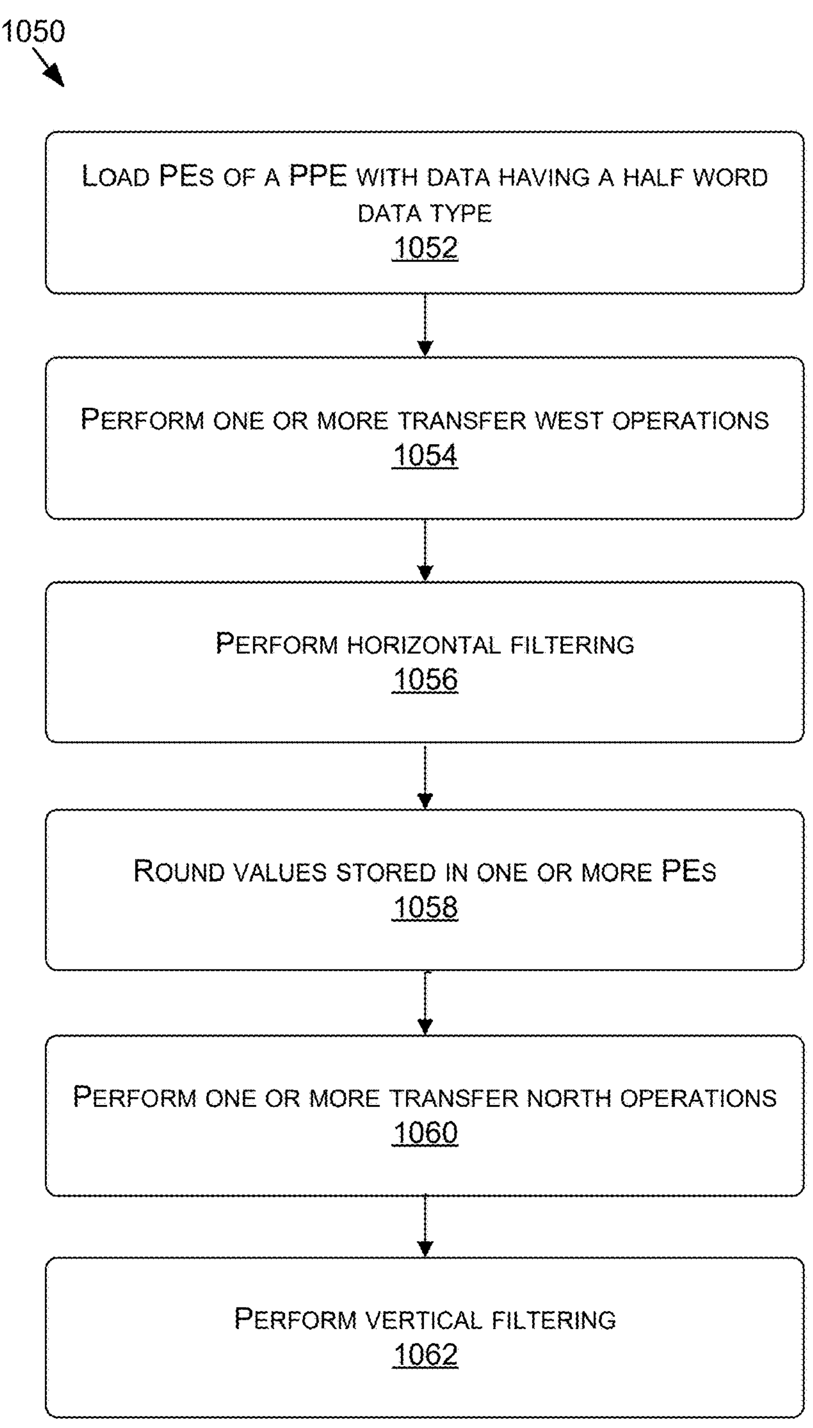
FIG. 10B is a flow diagram of an example implementation of the method of claim 10A, in accordance with some embodiments of the present disclosure.

FIG. 10B is a flow diagram of an example implementation 1050 of the method of claim 10A. The implementation 1050 can be associated with implementation of a 3×3 filter. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the frame 600 may be included in, and/or may include similar components, features, and/or functionality to that of example autonomous vehicle 1500 of FIGS. 15A-15D, example computing device 1600 of FIG. 16, and/or example data center 1700 of FIG. 17.

The implementation 1050, at block 1052, includes loading a PPE. For example, one or more PEs (PEs that are configured to process data associated with half word data types such as, for example, the PEs 806 and 808 of FIGS. 8C-8F and the PEs 902 and 904 of FIG. 9) of a PPE can receive data associated with a first pixel and a second pixel.

The implementation 1050, at block 1054, includes performing one or more transfer west operations. For example, a set of interconnected PEs of a PPE can be configured to perform three sequential transfer west operations. In this example, the PEs can store the data in respective registers such that, once the three transfer west operations are executed, each PE includes one or more other values transferred into the PE.

The implementation 1050, at block 1056, includes performing horizontal filtering. For example, the set of interconnected PEs of the PPE can multiplying the values stored in the registers of each PE against a coefficient. In this example, the set of interconnected PEs of the PPE can perform a vector multiplication operation and one or more vector addition operations to determine values for a given pixel. At block 1058, the PEs can round one or more values stored in the registers of each PE. The implementation 1050, at block 1060, includes performing a transfer north operation. For example, the set of PEs can perform transfer north operations.

The implementation 1050, at block 1062, includes performing vertical filtering. In this example, the set of interconnected PEs of the PPE can perform a vector multiplication operation and one or more vector addition operations to determine values for a given pixel. At block 1058, the PEs can round one or more values stored in the registers of each PE.

DMA Frame Linking Support

The use of descriptors to coordinate DMA transfers can improve the functioning of systems, but because these descriptors are often implemented using software they can be difficult to implement efficiently. For example, descriptors specifying criteria for DMA transfers can be configured to cause DMA transfers to occur for a predetermined number of times. In the case of feature tracking (determining the presence and position of objects across a set of frames), these descriptors can specify the number of frames to be obtained and processed by accelerators such as VPUs and/or PPEs. The VPUs and/or PPEs can then implement the descriptors to obtain and process the frames when performing operations that track the object across the frames. But when objects remain present for more frames than are specified by the descriptors, additional descriptors may be obtained (e.g., generated) by the VPU and/or PPE to reconfigure the VPU and/or PPE when continuing tracking of the objects. Alternatively, objects can exit the field of view of the sensor generating the frames, and the VPUs and/or PPEs can continue to perform operations in accordance with the descriptors until the specified DMA transfers are complete. This can be inefficient in that the VPUs and/or PPEs can be reconfigured (or can reconfigure other devices) unnecessarily, wasting processing resources during the reconfiguration process. Additionally, or alternatively, the VPUs and/or PPEs can continue performing operations in accordance with the descriptors despite the object no longer being present in the frames. This can similarly waste processing resources and delay subsequent operations from being performed.

Systems and methods are disclosed that involve configuring accelerators such as a VPUs and/or PPEs (alone or in coordination with a DMA system) to obtain data associated with frames from source memory (SRAM) and perform one or more operations based on the frames. More specifically, in embodiments involving a first mode (referred to as "fixed frame count linking") a VPU and/or PPE can be configured to obtain data identified by a first descriptor and a set of second descriptors in coordination with a DMA system. In examples, the VPU and/or PPE can obtain data associated with the frame (e.g., in coordination with a DMA system) based on the descriptor(s), and perform operations based on the data obtained in association with the descriptors (e.g., based on the frames or portions thereof).

In embodiments involving a second mode (referred to as "continuous frame count linking") the VPU and/or PPE can be configured to obtain data associated with frames as represented by a first descriptor (and, in examples, one or more second descriptors) that causes the VPU or PPE to obtain the data in coordination with the DMA system. The DMA system can then be configured to perform operations iteratively using data obtained in association with the descriptor(s) (referred to as a loop) until the VPU and/or PPE generates and transmits a signal to the DMA system indicating that a given loop is a final loop. This signal can be sent to the DMA system by changing a value in a frame sequence count register to indicate the loop should no longer continue (e.g., should break).

Further, by virtue of how the VPU and PPE are configured, descriptors can be loaded and executed in a "ping-pong" fashion, such that a first descriptor can be loaded and, during performance of DMA transfers in accordance with the first descriptor on a first frame, a second descriptor can be loaded and queued for execution for a second frame. This reduces downtime that could be experienced by processors or PEs of the VPU, PPE or DMA system associated with obtaining data in accordance with given descriptors.

By implementing at least some of the techniques described, VPUs, PPEs, and/or DMA systems (e.g., including DMA hardware sequencers) can be configured to operate independently or in coordination with one another to reduce or eliminate waste (e.g., idle resources) due to "bubbles". These bubbles can correspond to transfer gaps between execution of DMA transfers corresponding to descriptors. The techniques described herein can also conserve time and resources that would otherwise be used to configure each DMA transfer individually. Further, the presently-disclosed systems and methods can reduce the complexity of the control code for systems construction and sequencing frames as described herein.

Figure 11A:
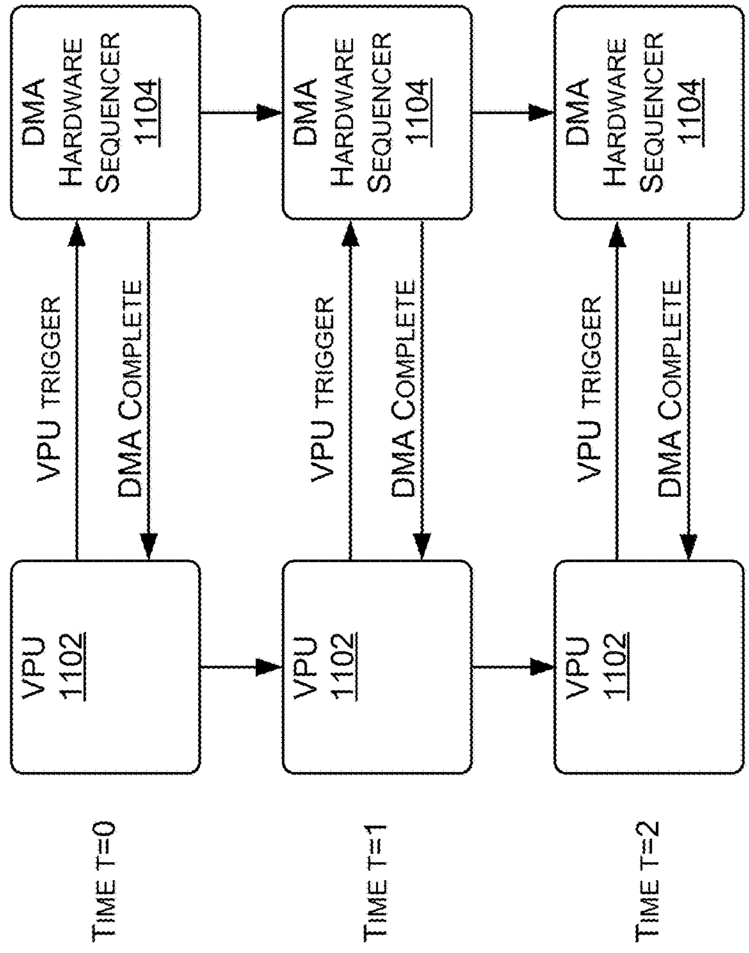
Figure 11C:
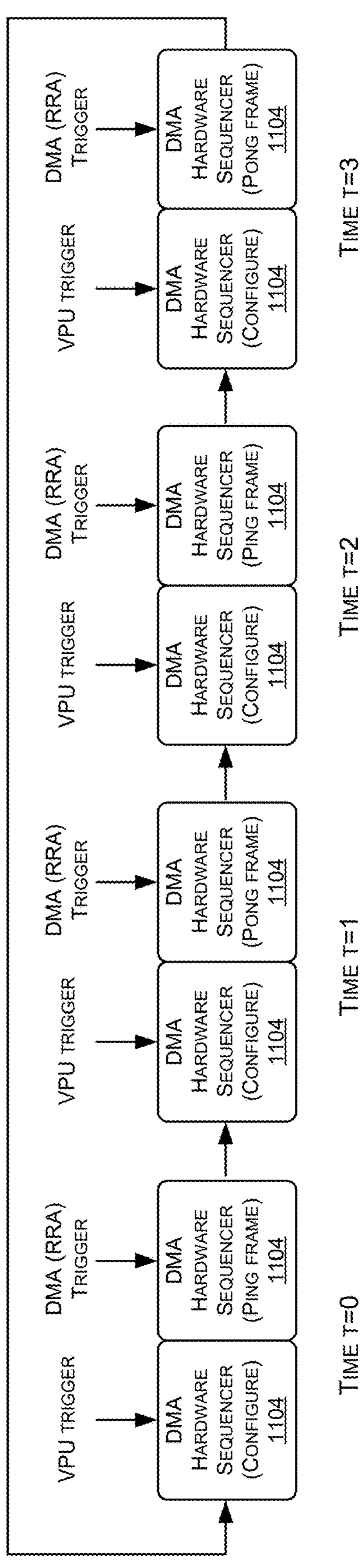

FIGS. 11A-11C are example sequences of frame transfers using accelerators, in accordance with some embodiments of the present disclosure. More specifically, frames 11A-11C represent execution of DMA transfers to move data associated with frames that are generated by sensors. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the example sequences of frame transfers using accelerators may be included in, and/or may include similar components, features, and/or functionality to that of example autonomous vehicle 1500 of FIGS. 15A-15D, example computing device 1600 of FIG. 16, and/or example data center 1700 of FIG. 17. In some embodiments, the example sequences of frame transfers using accelerators can include (e.g., be implemented by) components of one or more accelerators (e.g., one or more accelerators such as the VPUs 116 and/or PPEs 118 of FIG. 1A) in coordination with one or more DMA systems (e.g., one or more DMA systems such as the DMA systems 114 of FIG. 1A).

Referring now to FIG. 11A, illustrated is an example sequence of frame transfers using accelerators in accordance with the first mode (the "fixed frame count linking"). In this example sequence, a VPU 1102 can be configured to obtain data associated with one or more DMA transfers (represented using one or more descriptors) when streaming tiles of one or more frames. The VPU 1102 can obtain the data associated with the one or more DMA transfers from a processor (e.g., a processor that is the same as, or similar to, the processor 102 of FIG. 1A) or from a DMA system 1104. While the present disclosure is discussed with respect to a VPU 1102, it will be understood that other accelerators, such as a PPE, can implement some or all of the functions described herein with respect to the VPU 1102.

In some embodiments, the VPU 1102 receives the data associated with the one or more DMA transfers where the data specifies a fixed number of DMA transfers to be performed. For example, the VPU 1102 can receive the data associated with the one or more DMA transfers that are performed sequentially to support one or more operations performed by the VPU 1102. In this example, the data associated with the one or more DMA transfers can be associated with (e.g., represented by) one or more frame formats as described with respect to FIGS. 4A-4C.

In the example represented by FIG. 11A, the VPU 1102 can receive data associated with three DMA transfers to be performed by the VPU 1102 or another device such as a DMA system 1104. The three DMA transfers can be performed at three different times (e.g., t=0, t=1, and t=2) and/or in a sequence. In this example, the three DMA transfers can be associated with (e.g., correspond to) operations to be performed by the VPU 1102. As an example, the VPU 1102 can receive an instruction to perform one or more operations on data associated with a frame that is represented at varying resolutions (e.g., a first resolution of 2 megapixels, a second resolution of 1 megapixel, and a third resolution of 0.5 megapixels). In this example, the VPU 1102 can receive the instructions to perform the one or more operations and the data associated with the three DMA transfers from a processor (e.g., a processor that is the same as, or similar to, the processor 102 of FIG. 1A) or other device(s) configuring operation of the VPU 1102.

In some embodiments, the VPU 1102 can coordinate with the DMA system 1104 to obtain data specified by the DMA transfers. For example, the VPU 1102 can provide data associated with discrete DMA transfers (represented by individual descriptors) to the DMA system 1104 at points in time t=0, t=1, and t=2 to cause the DMA system 1104 to transfer the data associated with individual frames to VMEM (not explicitly illustrated by FIGS. 11A-11C) based at least on one or more operations to be performed by the VPU 1102. In another example, the VPU 1102 can provide the data associated with the discrete DMA transfers to the DMA system 1104 and, as operations are performed by the VPU 1102, the VPU 1102 can provide signals to the DMA system 1104 to cause (e.g., trigger) specified DMA transfers. In this example, the VPU 1102 can provide data associated with a frame format (e.g., at or before time t=0) specifying each of the DMA transfers to the DMA system 1104 at or before a point in time (e.g., at or before time t=0), configuring the DMA system 1104 to cause the DMA transfers to be performed in response to trigger signals provided by the VPU 1102.

With continued reference to FIG. 11A, the VPU 1102 can provide (e.g., transmit) a first trigger signal to the DMA system 1104 as the VPU 1102 performs or prepares to perform the one or more operations. The first trigger signal can cause the DMA system 1104 to cause at least one DMA transfer to be performed (e.g., data associated with a frame to be obtained from source memory such that the frame is sampled to form a 2 megapixel image before being stored in destination memory). When the DMA transfer is complete (e.g., the data associated with the frame is stored in the destination memory) the DMA system 1104 can send a signal to the VPU 1102 including an indication that the transfer is complete. In some embodiments, the VPU 1102 can send a second trigger signal to cause the DMA system 1104 to further cause at least one second DMA transfer to be performed. During the at least one second DMA transfer, at least a portion of the data associated with the frame involved in the first DMA transfer can be transferred to the destination memory such that the frame is sampled based at least on operations performed by the DMA system (e.g., using a DMA hardware sequencer) to form a 1 megapixel image. When the DMA transfer is complete the DMA system 1104 can send a signal to the VPU 1102 including an indication that the transfer is complete. In some embodiments, the VPU 1102 can send a third trigger signal to cause the DMA system 1104 to further cause at least one third DMA transfer to be performed. During the at least one third DMA transfer the data associated with the frame involved in the first DMA transfer can transferred to the destination memory such that the frame is sampled based at least on operations performed by the DMA system to form a 0.5 megapixel image. When the DMA transfer is complete (e.g., the data associated with the frame is stored in the destination memory) the DMA system 1104 can send a signal to the VPU 1102 including an indication that the transfer is complete. In this way, the VPU 1102 and the DMA system 1104 can coordinate to perform a fixed number of DMA transfers involving (e.g., linked to) a common frame or a specified sequence of operations being performed by the VPU 1102.

Referring now to FIG. 11B, illustrated is an example of continuous frame linking involving a configuration frame and streaming frames plus padding. As illustrated, the VPU 1102 can receive data associated with a continuous number of DMA transfers to be performed (represented using descriptors corresponding to a sequence of DMA transfers that are not fixed). For example, the VPU 1102 can receive instructions to continuously perform one or more operations. In one example, the operations can be associated with (e.g., involved in) performing object tracking across multiple frames until the object(s) are no longer detected in one or more of the frames. In this example, the VPU 1102 can provide data associated with at least one frame format that specifies one or more regions (e.g., up to 32 regions and/or the like) within the frame that are involved in corresponding operations being performed by the VPU 1102 to track the object(s). In some embodiments, the VPU 1102 can also specify that the one or more DMA transfers are to be repeated until the VPU 1102 provides a subsequent signal indicating that the DMA transfers are complete. For example, the VPU 1102 can provide a signal to indicate that the DMA transfers are complete, where the signal causes a value in a register of the DMA system to indicate that the DMA transfers are complete.

With continued reference to FIG. 11B, initially, the VPU 1102 can send data associated with the sequence of DMA transfers to the DMA system 1104. The data associated with the sequence of DMA transfers can be associated with a frame format that causes (e.g., configures) the DMA system to perform one or more DMA transfers. Once the DMA system 1104 is configured based at least on the frame format (represented as a "Configure" block in FIG. 11B) the DMA system 1104 can cause one or more DMA transfers to be performed in accordance with a first frame ("Frame 1") until reaching a final frame ("Frame n"). While the DMA system 1104 is illustrated as being configured to perform DMA transfers for Frames 1-*n*, it will be understood that each frame can represent a portion of a given frame. In these examples, the frame format can indicate an offset, a length, and a width which correspond to a region within the given frame as shown for example in FIG. 4B.

In some embodiments, once the DMA system 1104 completes the DMA transfers, the DMA system 1104 can transmit a signal to the VPU 1102 indicating that the sequence of transfers is complete. In this example, the DMA system 1104 can check to determine whether or not a signal is received (e.g., a specific value in a register is set) from the VPU 1102. The signal can indicate that the DMA system 1104 should forgo one or more of the DMA transfers (breaking the loop illustrated in FIG. 11B). For example, the VPU 1102 can execute operations that result in a determination that one or more of the objects are no longer detected in one or more of the frame (or regions) and the VPU 1102 can transmit a signal to the DMA system 1104 indicating that the DMA transfers should no longer be performed. In examples, where the DMA system 1104 does not receive a signal from the VPU 1102, the DMA system 1104 can iteratively repeat the DMA transfers specified by the VPU 1102 or pause (e.g., stall) until a signal such as a trigger signal is received to cause one or more subsequent DMA transfers to be performed.

In some embodiments, the VPU 1102 can determine one or more updates to one or more of the DMA transfers being performed continuously by the DMA system 1104. For example, the VPU 1102 can determine that one or more operations executed by the VPU 1102 indicate that an object associated with a given DMA transfer moved from a first region within the frame to a second region within the frame. In this example, the VPU 1102 can determine an update to the portion of the frame format corresponding to the movement of the object within the frame and provide the update to the portion of the frame format to the DMA system 1104. In this example, the DMA system can continue to perform the specified DMA transfers in accordance with the original configuration and the update. In this way, the DMA system can be iteratively updated without the need to reconfigure the entire sequence of DMA transfers upon each iteration of the sequence. This can, in turn, enable the DMA system 1104 to perform the DMA transfers faster given that some (or in some instances all) of the data in the registers storing the instructions involved in the DMA transfers can be reused without involving the VPU 1102 or other processors (e.g., of a functional block 110 of FIG. 1A).

Referring now to FIG. 11C, illustrated is an example of continuous frame linking involving configuration frames and random region access frames plus padding. As described herein, the example of FIG. 11C can be implemented when implementing a feature tracker. As illustrated, the VPU 1102 can receive data associated with multiple sets of DMA transfers and can configure the DMA system 1104 to perform the sets of DMA transfers as the DMA system 1104 performs one or more other sets of DMA transfers. For example, at a first point in time (t=0) the VPU 1102 can trigger the DMA system 1104 by providing data associated with a first frame format to the DMA system in association with a channel (e.g., an independent virtual pathway) along which data DMA transfers are performed. The DMA system 1104 can also execute one or more DMA transfers in accordance with data associated with a frame format that was received at an earlier point in time (e.g., a point in time earlier than time t=0).

In this example, at a second point in time (t=1) the VPU 1102 can again trigger the DMA system 1104 by providing data associated with a second frame format in association with the same channel to the DMA system 1104. The DMA system 1104 can also execute the one or more DMA transfers in accordance with data associated with a frame format that was received at an earlier point in time (time t=0). This process can iteratively repeat (e.g., at times t=2, t=3, and so on) such that the VPU 1102 configures the DMA system 1104 to perform DMA transfers while the DMA system 1104 simultaneously executes earlier-configured DMA transfers. In this way, DMA transfers that would otherwise be dedicated to separate channels can be configured to be performed along the same channel, reducing the need for additional channels and/or freeing channels for additional DMA transfers to be performed. By virtue of the example illustrated in FIG. 11C, by linking four frame formats (e.g., frame formats that are associated with descriptor addressing frame types (as shown for example in FIG. 4B) that are paired with four corresponding frame formats associated with random region addressing frame types (as shown for example in FIG. 4C)), the DMA system 1104 can be configured to perform sequences of DMA transfers. And in cases where a DMA system is configured to process 32 DMA transfers (corresponding to up to 32 objects in an object) in blocks of four frames, the VPU 1102 can configure the DMA system 125 times when covering up to 4,000 objects as opposed to what could be up to 500 times if four separate channels were involved.

Figure 12:
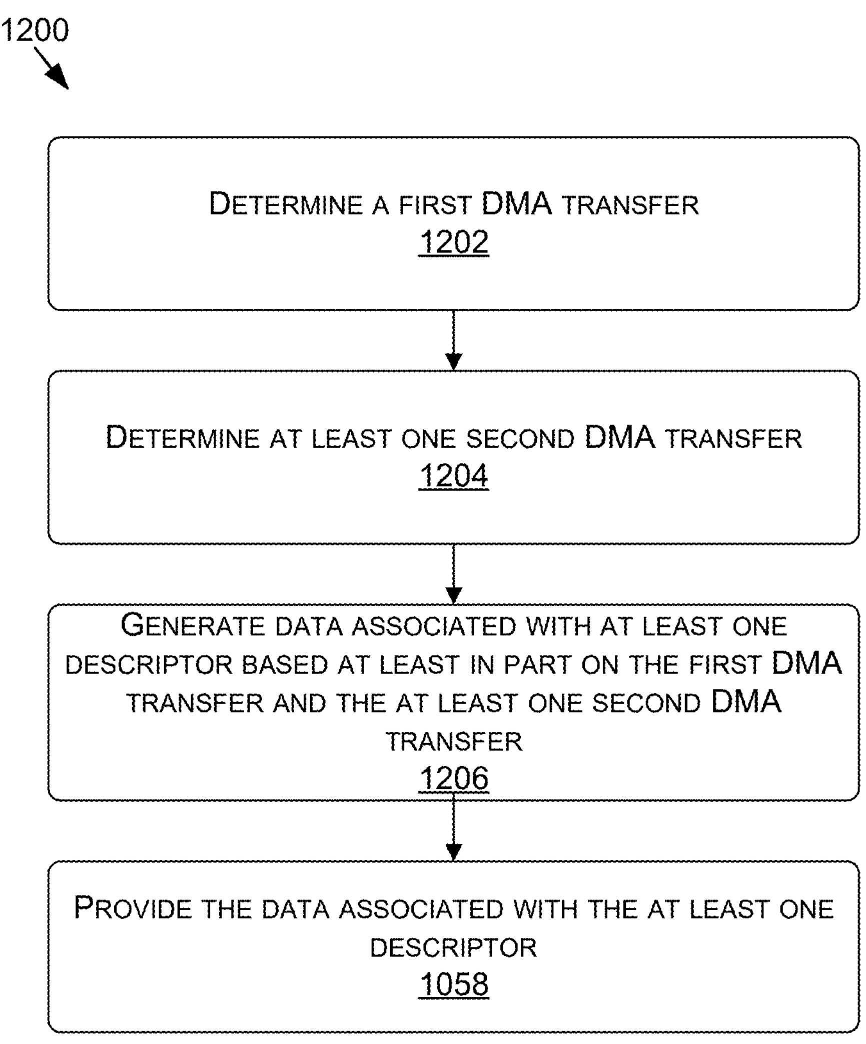
FIG. 12 is a flow diagram of an example method for sequencing frame transfers using accelerators, in accordance with some embodiments of the present disclosure.

FIG. 12 is a flow diagram of an example method 1200 for sequencing frame transfers using accelerators, in accordance with some embodiments of the present disclosure. In some embodiments, aspects of the method 1200 can be performed by one or more devices that are the same as, or similar to, one or more of the devices of FIGS. 1A-1C such as, for example, the DMA systems 114, the VPUs 116, the PPEs 118, and/or the processor 102. In embodiments, one or more other devices of FIG. 1A can perform one or more aspects of the method 500. In some embodiments, one or more of the frame formats described herein can be the same as, or similar to, the one or more frame formats of FIGS. 4A-4C.

The method 1200, at block 1202, includes determining a first DMA transfer. For example, a device (e.g., a processor, a VPU and/or a PPE) can determine the first DMA transfer. For purposes of clarity, the non-limiting examples described herein are described with respect to operations performed by a VPU; but it will be understood that the operations described herein can be performed by one or more other devices alone, or in coordination, such as a processor, a PPE, a DMA system (e.g., using a DMA hardware sequencer), and/or any other suitable device such as but not limited to those described herein.

In some embodiments, the VPU can determine the first DMA transfer based at least on generation of frame data associated with a frame by a sensor. For example, during operation of a robotic system such as an automated vehicle, a sensor such as a camera, a LiDAR sensor, a RADAR sensor, and/or the like can generate data corresponding to frames (e.g., images, point clouds, and/or the like that are generated by the sensor). In this example, the VPU can determine the first DMA transfer based at least on the generation of the data by the sensor (also referred to as frame data) and one or more operations that the VPU is instructed to perform. The operations can include, without limitation, operations associated with one or more image processing operations (involving processing of frames or portions of the frames), one or more prediction operations (involving identifying objects represented by one or more frames), one or more object tracking operations (involving tracking objects as they move by an environment represented in successive frames), one or more trajectory prediction operations (involving predicting future locations of objects as they move by an environment represented in the successive frames), and/or any other suitable operations.

In some embodiments, the first DMA transfer can involve transferring data from a source memory (e.g., system memory that is the same as, or similar to, the memory 108 of FIG. 1A) to a destination memory (e.g., a VMEM that is the same as, or similar to, the VMEMs 112 of FIG. 1A). For example, the first DMA transfer can involve transferring data from the source memory to the destination memory to allow the VPU to perform one or more operations based at least on the data. In some embodiments, the first DMA transfer can involve multiple independent DMA transfers. For example, the first DMA transfer can involve a sequence of DMA transfers associated with one or more operations the VPU is configured to perform. In some embodiments, the sequence of DMA transfers can be performed independently by the VPU, a DMA system, and/or the like. For example, the VPU can configure the DMA system to perform the DMA transfer(s) once and to return a signal indicating whether the transfers are complete (e.g., successful) or not complete (e.g., ongoing or not successful).

In some embodiments, the first DMA transfer can involve communication between the VPU and the DMA system during the DMA transfer. For example, where the first DMA transfer is associated with a sequence of DMA transfers, the VPU can configure the DMA system to perform one or more of the DMA transfers based at least on (e.g., in response to) the DMA system receiving signals to initiate one or more of the DMA transfers. These signals (also referred to as triggers) can be transferred by the VPU to the DMA system based at least on (e.g., in response to) execution of one or more corresponding operations by the VPU.

The method 1200, at block 1204, includes determining at least one second DMA transfer. For example, the VPU can determine the at least one second DMA transfer. In some embodiments, the at least one second DMA transfer can be the same as, or similar to, the first DMA transfer. For example, the VPU can determine the at least one second DMA transfer of data from source memory to destination memory. The at least one second DMA transfer can be based at least on a sequence of DMA transfers involved in operations performed by the VPU. In this example, the sequence of DMA transfers can correspond to operations that the VPU is configured to execute in accordance with the frame. In one example, in the context of object tracking, the one or more second DMA transfers can correspond to the transfer of data associated with (e.g., representing) regions of the frame specified by the first DMA transfer. In this example, the VPU can be configured to perform operations to track positions of objects relative to the frame and/or regions of the frame specified by the one or more second DMA transfers.

In some embodiments, the VPU can configure the DMA system to at least perform the first DMA transfer and the one or more second DMA transfers. For example, the VPU can generate and provide data associated with at least one descriptor (described below) to cause the DMA system to perform the first DMA transfer and the one or more second DMA transfers. In some examples, the VPU can configure the DMA system to perform the first DMA transfer and the one or more second DMA transfers without coordinating with the VPU. In other examples, the VPU can configure the DMA system to perform the first DMA transfer and the one or more second DMA transfers based at least on communication with the VPU. In some of these examples, the VPU can configure the DMA system to perform the first DMA transfer and the one or more second DMA transfers based at least on indications from the VPU sent to the DMA system to initiate one or more of the first and at least one second DMA transfer. In examples, the VPU can configure the DMA system to continuously perform the first DMA transfer and the one or more second DMA transfers. In these examples, the DMA system can perform the first DMA transfer and the one or more second DMA transfers until the DMA system receives an indication from the VPU to not perform one or more of the first DMA transfer and/or the one or more second DMA transfers. The VPU can provide the indication by changing a value in a register of the DMA system that is checked on each iteration by the DMA system.

In some embodiments, the VPU can determine updates to one or more of the first DMA transfer and the at least one second DMA transfer. For example, the VPU can determine updates to one or more of the first DMA transfer and the at least one second DMA transfer based at least on one or more operations executed by the VPU. In one example, where the VPU is performing one or more object tracking operations, the VPU can provide data to the DMA system that updates the descriptor(s) corresponding to the first DMA transfer and the one or more second DMA transfers. The updates can represent updates to an offset and width and/or height of an object being tracked across frames.

The method 1200, at 1206, includes generating data associated with at least one descriptor based at least on the first DMA transfer and the at least one second DMA transfer. For example, the VPU can generate the data associated with the at least one descriptor. The VPU can generate the data associated with the at least one descriptor, where the data is configured to cause one or more DMA transfers to be performed based at least on operations executed by the DMA system from source memory to destination memory to occur in accordance with the at least one descriptor. In this example, the at least one descriptor can represent the first DMA transfer and the at least one second DMA transfer. In this way, instructions can be represented by the descriptor that allow for multiple DMA transfers. By consolidating (e.g., linking) the instructions corresponding to multiple DMA transfers (and corresponding DMA transfer types) in a single descriptor, the operations involved in configuring a device to perform the DMA transfers can be reduced. This can improve techniques whereby individual descriptors are configured for individual DMA transfers. As described herein, the data associated with the at least one descriptor can be configured to cause one or more discrete sets of DMA transfers, one or more continuous DMA transfers, and/or the like.

The method 1200, at 1208, includes providing the data associated with the at least one descriptor to at least one device to cause the at least one device to obtain data in accordance with the at least one descriptor. For example, the VPU can provide the data associated with the at least one descriptor to at least one device of an accelerator such as the DMA system to cause the DMA system to, at least, obtain data in accordance with the at least one descriptor. In this example, the data obtained in accordance with the at least one descriptor can correspond to frame data associated with at least a portion of a frame stored in the source memory.

In some embodiments, the VPU can provide the data associated with the at least one descriptor to the DMA system to cause the DMA system to perform the DMA transfers, where the at least one descriptor specifies a discrete (e.g., fixed) number of DMA transfers. For example, the data associated with the at least one descriptor can specify a discrete number of DMA transfers for a given frame (e.g., by storing data associated with the frame at varying resolutions in the destination memory). In this example, the DMA system can complete the DMA transfers in accordance with the sequence. For example, the DMA system can complete the DMA transfers in accordance with the sequence without intervention from the VPU. In examples, the DMA system can complete the DMA transfers in accordance with the sequence with intervention from the VPU. For example, the DMA system can perform one or more of the DMA transfers based at least on the DMA system receiving a signal from the VPU triggering the DMA system to perform the DMA transfers.

In some embodiments, the VPU can provide the data associated with the at least one descriptor to the DMA system to cause the DMA system to perform the DMA transfers, where the at least one descriptor forgoes specifying a discrete number of DMA transfers. For example, the data associated with the at least one descriptor can specify a fixed number of DMA transfers for a given frame. In this example, the DMA system can complete the DMA transfers in accordance with the sequence, and iteratively repeat the sequence. For example, the DMA system can complete the DMA transfers in accordance with the sequence and send a signal to the VPU that the sequence is complete. In this example, the DMA system can then repeat the DMA transfers until a signal is received from the VPU to no longer perform the DMA transfers. In this way, the DMA system can be configured to perform one or more DMA transfers without being reconfigured, conserving resources that would otherwise be involved in reconfiguring the DMA system.

In some embodiments, the VPU can provide the data associated with the at least one descriptor to the DMA system as the DMA system is executing one or more DMA transfers in accordance with earlier-generated descriptors. For example, the VPU can provide the data associated with the at least one descriptor to the DMA system to configure the DMA system to perform one or more DMA transfers based at least on (e.g., after) one or more different DMA transfers are performed by the DMA system. In this example, the data associated with the at least one descriptor can be associated with a frame that is generated at a future point in time. In this way, the VPU can coordinate the configuration and performance of a DMA system in a ping-pong fashion, whereby the DMA system is constantly obtaining data from the source memory and transferring the data to the destination memory. This can reduce resource downtime that would otherwise be involved in configuring and re-configuring the DMA system to perform successive DMA transfers.

Programming Multi-Dimensional Simd Processors

Multi-dimensional SIMD processors such as the PPEs described herein can significantly improve the computational efficiency of systems implementing parallel processing algorithms. For example, multi-dimensional SIMD processors can load data (e.g., to respective PEs of a PPE) and execute one or more SIMD instructions without additional calls to shared memory, conserving the amount of time dedicated to reading and writing data associated with intermediate results to such memory. While performing such operations in a multi-dimensional SIMD processor can improve computational efficiency, it can be difficult to configure systems that operate in accordance with higher-level instructions (e.g., programmed in languages such as C/C++) to efficiently configure the multi-dimensional SIMD processor to execute SIMD instructions.

Embodiments disclosed herein involve implementing techniques for mapping higher-level instructions to the SIMD instructions. Compilers are also disclosed that are capable of handling the data types associated with certain accelerators (e.g., VPUs) as well as multi-dimensional SIMD processors such as PPEs. By mapping higher-level instructions represented using programming languages like C/C++ to SIMD instructions that can be executed by the presently-disclosed multi-dimensional SIMD processors, the present disclosure reduces the complexity involved in programming such processors. This can likewise reduce the overall time needed to configure higher-order systems (e.g., automated or semi-automated vehicle software stacks, image processing systems, machine learning-based systems, and/or the like) to operate in accordance with the presently-disclosed systems and improve interoperability.

Figure 13:
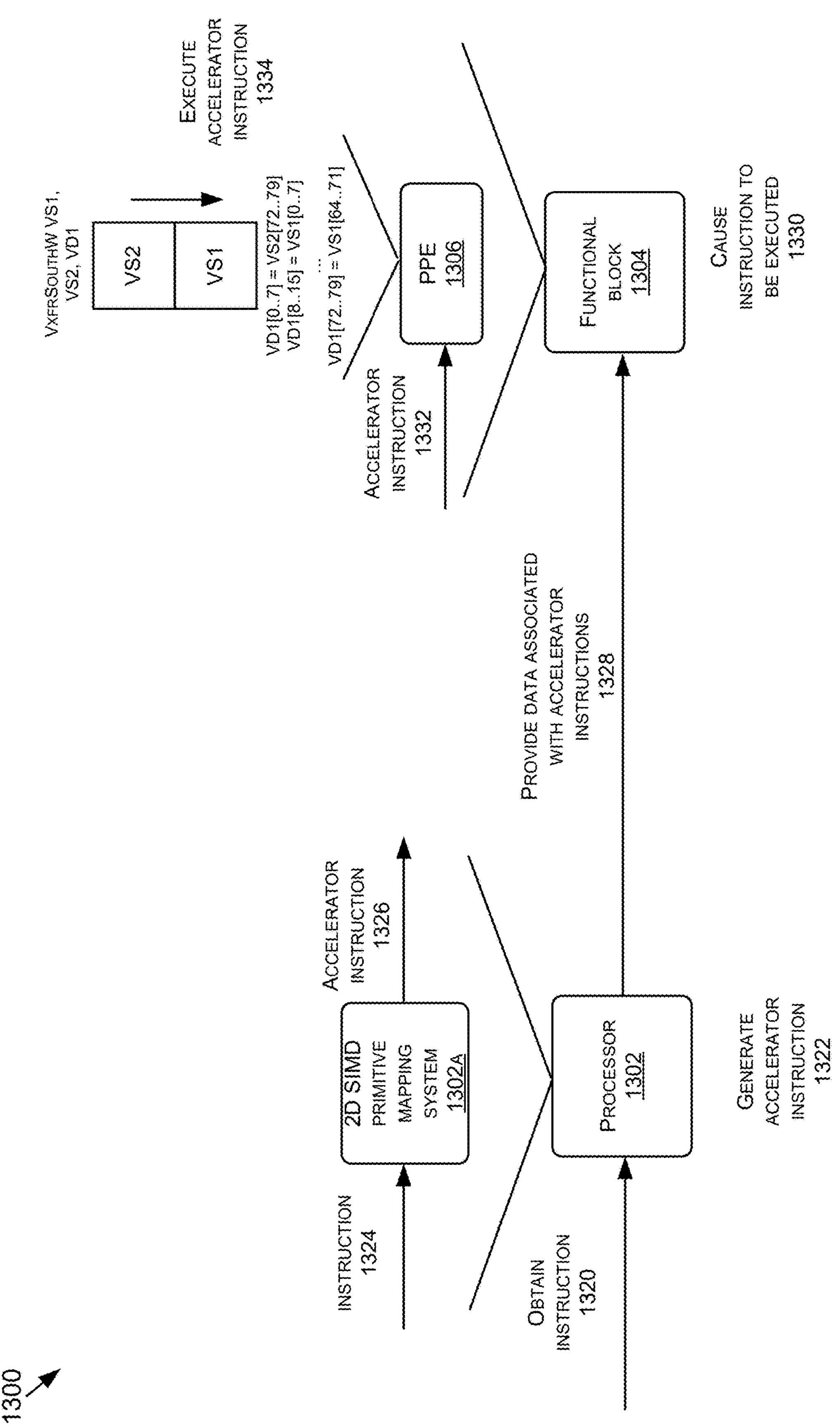
FIG. 13 is a diagram representing implementation of a process for generating an example accelerator instruction, in accordance with some embodiments of the present disclosure.

FIG. 13 is a diagram representing implementation of a process 1300 for generating an example accelerator instruction, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the example sequences of frame transfers using accelerators may be included in, and/or may include similar components, features, and/or functionality to that of example autonomous vehicle 1500 of FIGS. 15A-15D, example computing device 1600 of FIG. 16, and/or example data center 1700 of FIG. 17. In some embodiments, the example sequences of frame transfers using accelerators can include (e.g., be implemented by) components of one or more accelerators (e.g., one or more accelerators such as the VPUs 116 and/or PPEs 118 of FIG. 1A) in coordination with one or more DMA systems (e.g., one or more DMA systems such as the DMA systems 114 of FIG. 1A).

As shown in FIG. 13, at 1320, a processor 1302 obtains an instruction to be performed by an accelerator. In the examples described herein, the processor 1302 can be the same as, or similar to, the processor 102 of FIG. 1A and the functional block 1304 can be the same as, or similar to, the functional blocks 110 of FIG. 1A. In some embodiments, the accelerator can include a PPE 1306 that is the same as, or similar to, the PPEs 118 of FIG. 1A. As described herein, the PPE 1306 can be a multi-dimensional SIMD processor that includes a plurality of PEs logically arranged in a 2D array. While examples are described herein with reference to a PPE, it will be understood that the present disclosure is not limited to the PPE and that any other suitable multi-dimensional SIMD processor is contemplated as being able to perform one or more of the operations described herein.

In some embodiments, the instruction to be performed by the accelerator can be represented in a first programming language. For example, the instruction to be performed can be represented in a programming language such as C, C++, Python, and/or other high-level programming languages associated with hardware abstraction. In some embodiments, the instructions can specify one or more aspects of a datapath. For example, the instructions can specify one or more locations in memory, VMEM, a DLSU, or one or more registers of one or more PEs in a PPE that correspond to one or more portions of data to be processed by the PPE, and/or can specify (e.g., indicate) one or more data transfers to be performed.

At 1322, the processor 1302 generates an accelerator instruction. In examples, the processor 1302 can perform one or more operations to generate the accelerator instruction. For example, at 1324, the processor 1302 can provide the instructions (obtained at 1320) to a 2D SIMD primitive mapping system (also referred to as mapping system 1302*a*). The mapping system 1302*a* can include logic, a lookup table, combinations thereof, and/or the like that receives the instructions and determines a correspondence to one or more operations to be performed (e.g., in a sequence) by an accelerator. In some embodiments, the one or more operations to be performed can be represented using one or more lower-level languages such as assembly code. At 1326, the one or more operations to be performed by the accelerator can then be output by the mapping system 1302*a* as accelerator instructions.

As described above, the accelerator instructions can be represented using lower-level languages such as assembly code. As an example, the mapping system 1302*a* can be associated with a compiler that converts the instructions at 1324 represented in C++ into accelerator instructions 1326 represented in an assembly language. In some embodiments, the complier can be configured to process data associated with one or more data types that map to one or more instructions (also referred to as primitives or PPE primitives) that in combination form the accelerator instructions. In an example, the following data types can be associated with instructions received at 1320:

```
class intx property(48 bit signed);
class shortx property(24 bit signed);
class v2d__intx property(vector intx [ MATX*MATY]);
class v2d__shortx property(vector shortx[2*MATX*MATY]);
class dv2d__intx property(vector intx [2*MATX*MATY]);
class dv2d__shortx property(vector shortx[4*MATX*MATY].
```

In this example, the classes can include object-oriented building blocks programmed in C++ that represent integers, shorts, two-dimensional vectors (v2d), double two-dimensional vectors (dv2d), and so on. The mapping system 1302*a* can receive data associated with these data types and map the data to primitives that are configured to cause a multi-dimensional SIMD processor (e.g., the PPE 1306) to perform one or more operations. For example, an instruction at 1320 can be represented as:

v2d_intx operator + (v2d_intx, v2d_intx) = *v2ds*48 *vadd* (*v2ds*48, *v2ds*48);

and during programming, the processor can receive input represented as:

v2d_intx *a*, *b*, *c*: *c* = *a* + *b*;

The processor can then provide relevant portions of the instruction to the mapping system 1302*a* to cause the mapping system 1302*a* to output a vadd (vector addition) instruction as an accelerator instruction at 1326 responsive to the term in the instruction 1324 ("c=a+b").

In some embodiments, in addition to arithmetic operations as described above, the processor 1302 can generate accelerator instructions that cause a PPE 1306 to transfer data between neighboring PE's as shown by PEs 170 of PPE 140 in FIG. 1B. For example, the following one or more inter-PE data transfers can be represented as:

```
VXfer<direction><type> Vsrc1, Vsrc2/Rsrc2, Vdst
<direction> = {North, South, East, West}
<type> = {H (for Halfword or 24-bit), W (for Word or 48-bit)}
```

In this example, the accelerator instructions at 1306 can cause one or more PEs to perform one or more vector transfers (VXfer) and shift data across registers of a single PE or adjacent PEs in the direction indicated for one row of PEs (when direction is north or south) or one column (when direction is east or west) as shown for example in FIGS. 8A-8F. A vector source (Vsrc1) can represent a primary (vector) input register, and a vector source Vsrc2 or Rsrc2 can supply the backup (or fill-in) input, which can be a vector or a scalar register.

In some embodiments, the PE array (e.g., of a PPE 170) can have a defined (e.g., finite) capacity. For example, when shifting data stored in registers of PEs in a PE array north by one row, all rows except for the bottom row can receive an input from Vsrc1 of a PE located south of the PE receiving the data. In some embodiments, the PEs of the bottom row can receive data from a register associated with a Vsrc2 register of a PE of a top row of or broadcast from Rsrc2. Similar transfers can be performed in the other directions, south, east and west, as described with respect to FIGS. 8A-8F. In these examples, the transfers can be based at least on the capacity of the respective registers. For example, the transfers can involve transferring portions (e.g., half) of the bits stored in a given register or all of the bits in a given register in accordance with the accelerator instructions.

In some embodiments, functionality for these instructions can also be mapped in the application layer to C language intrinsics, for example:

```
v2d_intx vxfer_west(v2d_intx,v2d_intx) = v2ds48 VXferWestW(v2ds48, v2ds48);
v2d_intx in_00_w1 = vxfer_west(in_00, in_01);
v2d_intx in_01_w1 = vxfer_west(in_01, 0).
```

As illustrated, the instructions obtained at 1320 can specify one or more specific transfers (e.g., a vector transfer west or "vxfer_west") and one or more data types of data to be moved between registers in accordance with the transfer. In this way, the instructions can be configured to cause the mapping system 1302*a* to generate instructions in accordance with specific transfers (e.g., transfers of specific data between specific registers of one or more PEs). The mapping system 1302*a* can then generate accelerator instructions in accordance with the transfers specified by the instruction received at 1324.

In some embodiments, the processor 1302 can provide the instruction 1324 to the mapping system 1302*a* to generate accelerator instructions 1326 that involve use of a DLSU (e.g., a DLSU that is the same as, or similar to, the DLSUs 124 of FIG. 1A). For example, the processor 1302 can provide the instruction 1324 to the mapping system 1302*a* that causes the mapping system 1302*a* to generate the accelerator instruction. In some embodiments, the accelerator instruction can include one or more instructions to transfer data from a DLSU to a multi-dimensional SIMD processor such as the PPE 1306 along with one or more instructions to cause the PPE 1306 to perform one or more operations. An example set of instructions can include the following:

```
class lstrm property (DLSU_AGEN_REG_SIZE bit unfoldable);
class sstrm property (DLSU_AGEN_REG_SIZE bit unfoldable);
These streams can be then coupled with stream start and load/store operations:
void vload_start (agen, lstrm&) = void vload_start (aword, lstrm_t&);
void vstore_start(agen, sstrm&) = void vstore_start(aword, sstrm_t&);
v2d_int vload_w(lstrm& a)
void vstore(v2d_int s, sstrm& a)
```

The start and load/store operations can then be implemented in a C application, for example:

```
vload_start(agen1, lstrm1); (transfer agen and activate load stream)
vstore_start(agen2, sstrm1); (transfer agen and activate store stream)
for (i = 0; i < (NUMBLKS_W + 1) * NUMBLKS_H; i++)
{
next_in_blk0_iorf = vload_w(lstrm1);← load from stream DSLU
next_in_blk1_iorf = vload_w(lstrm1);
filt_h_compute(...);
vstore_i((v2d_int)filt_out_blk0, sstrm1);← store to strem DSLU
vstore_i((v2d_int)filt_out_blk1, sstrm1);
}
```

In some embodiments, the processor 1302 can cause the mapping system 1302*a* to generate accelerator instructions at 1326 that schedule the start, loads, and stores between a DLSU and the PPE 1306 by providing the data associated with the accelerator instructions at 1328 to a respective functional block 1304. In this example, the functional block 1304 can then receive the accelerator instructions and at 1330 cause a DMA system (e.g., a DMA system that is the same as, or similar to, the DMA systems 114 of FIG. 1A) and the PPE 1306 to execute one or more operations in accordance with the instructions such that device stalls or waits due to DMA transfer latencies are minimized or eliminated. For example, with respect to the PPE 1306, the functional block 1304 can provide the accelerator instruction 1332 to the PPE 1306 to cause the PPE 1306 at 1334 to perform one or more operations. In this example, the one or more operations can be associated with a transfer south between individual PEs of the PPE 1306.

Figure 14:
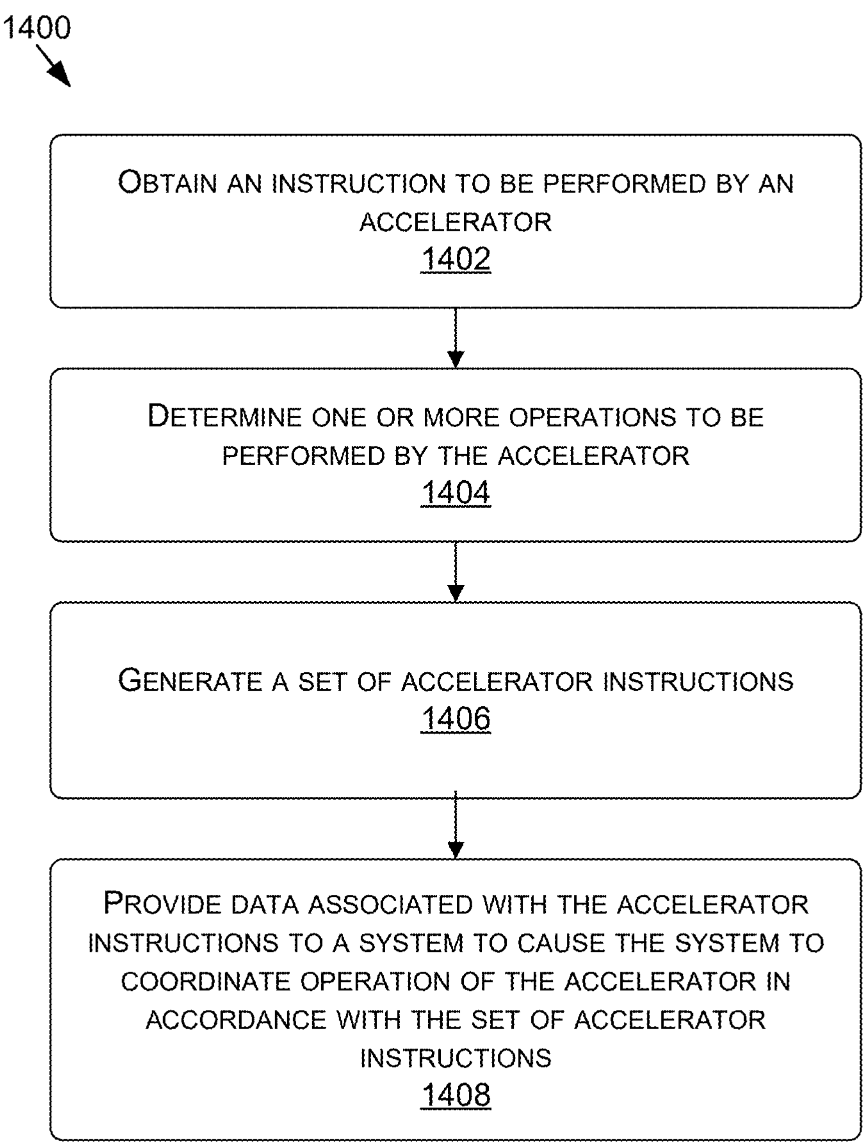
FIG. 14 is a flow diagram of an example method for generating accelerator instructions, in accordance with some embodiments of the present disclosure.

FIG. 14 is a flow diagram of an example method for generating accelerator instructions, in accordance with some embodiments of the present disclosure. In some embodiments, aspects of the method 1400 can be performed by one or more devices that are the same as, or similar to, one or more of the devices of FIGS. 1A-1C such as, for example, the DMA systems 114, the VPUs 116, the PPEs 118, and/or the processor 102. In embodiments, one or more other devices of FIG. 1A can perform one or more aspects of the method 1400.

The method 1400, at block 1402, includes obtaining an instruction to be performed by an accelerator. For example, a processor can obtain the instruction to be performed by the accelerator. In some embodiments, the instruction can be represented in a first programming language. For example, the instruction can be represented in a higher-level programming language such as one or more object-oriented programming languages.

In some embodiments, the instruction can represent one or more operations to be performed by an accelerator such as a PPE. For example, the instruction can represent one or more operations corresponding to one or more operations (e.g., SIMD operations) to be performed by PEs of a PPE. In this example, the PEs can be logically arranged in a 2D array and configured to communicate with one or more other PEs within the PPE. In some embodiments, the communication between the PEs of the PPE can be in accordance with one or more connection sets as described herein.

The method 1400, at block 1404, includes determining one or more operations to be performed by the accelerator. For example, the processor can determine the one or more operations to be performed by the accelerator based at least on the instruction. In examples, the processor can determine the one or more operations to be performed by the accelerator based at least on the instruction and a datapath. In these examples, the datapath can be associated with (e.g., indicate compatible transfers and operations that can be performed by) the accelerator and represent one or more transfers of data within the accelerator via one or more components of the accelerator. As an example, the datapath can represent one or more transfers between registers of one or more PEs within the accelerator during execution of operations that cause data to be transferred between the registers of a single PE, between registers of multiple PEs of a PPE, and/or combinations thereof.

In some embodiments, the processor can determine the one or more operations based on the accelerator designated to execute the operations. For example, the processor can determine the one or more operations based on compatible operations that the accelerator is configurable to execute. In an example, where the accelerator is a PPE that processes data associated with images, the processor can determine the one or more operations based at least on operations that are associated with processing the images. In some embodiments, the processor can determine a correspondence between the instruction to be performed by the accelerator a set of accelerator instructions. For example, where the accelerator is a PPE, the processor can determine a correspondence between the instruction to be performed by the PPE (e.g., represented in a higher-order language such as C/C++) and operations to be performed by the PPE in accordance with the instruction. In this example, the processor can determine one or more instructions to be performed by the accelerator, the instructions represented in an assembly language. As described herein, the set of operations to be performed by the accelerator can be referred to as accelerator instructions.

The method 1400, at block 1406, includes generating a set of accelerator instructions. For example, the processor can generate the set of accelerator instructions. In some embodiments, the set of accelerator instructions can be based at least on operations that are to be performed by the accelerator. The accelerator instructions can correspond to the instruction obtained by the processor.

In some embodiments, the instruction can correspond to operations performed by an accelerator that involve shifting data between registers. For example, the processor can generate the set of accelerator instructions, where the accelerator instructions cause shifts of data between a first register of a first component (e.g., a PE of a PPE) of the accelerator and a second register of the component of the accelerator. In another example, the processor can generate the set of accelerator instructions, where the accelerator instructions cause shifts of data between a first register of a first component of the accelerator and a first register of a different component of the accelerator. In this example, where the accelerator is a PPE, the first register of the first component can correspond to a first PE and the first register of the different component can correspond to a first register of a second PE, the first PE and the second PE configured to be interconnected with each other via a connection set that enables the transfer of data therebetween.

In some embodiments, the processor can generate the set of accelerator instructions where the accelerator instructions correspond to shifts of data between registers and one or more arithmetic operations. For example, the processor can generate the set of accelerator instructions where the accelerator instructions correspond to shifts of data between registers within a single PE or across multiple PEs interconnected in accordance with one or more connection sets. In this example, the accelerator instructions can also correspond to one or more addition operations, subtraction operations, multiplication operations, or division operations (referred to generally as arithmetic operations). In some embodiments, the accelerator instructions can include a set of sequential shifts of data between registers and arithmetic operations. For example, in accordance with an instruction to execute a 3×3 filter operation, the accelerator instructions can include a set of shift operations and multiplication operations such that multiple sets of data (representing the values of adjacent pixels relative to a given PE of a PPE) are obtained and stored in registers of a single component of an accelerator and one or more multiplication operations are performed based at least on the values stored in the registers. While the present example is discussed with respect to an instruction corresponding to accelerator instructions executed to implement a 3×3 filter, it will be understood that the present disclosure is not limited to such instructions and that any other suitable instructions that can be mapped to one or more data shifts and arithmetic operations are contemplated.

The method 1400, at block 1408, includes providing data associated with the set of accelerator instructions to a system to cause the system to coordinate operation of the accelerator in accordance with the set of accelerator instructions. For example, the processor can provide the data associated with the set of accelerator instructions to a functional block. In this example, the functional block can cause one or more components of the functional block (e.g., a PPE, a VPU, a DLSU, a DMA system, and/or the like) to execute respective instructions included in the set of accelerator instructions. In some embodiments, the one or more components can execute the instructions individually (e.g., without waiting for one or more instructions to be executed by one or more other components of the functional block). In other embodiments, the one or more components can execute the instructions in coordination with one or more other components of the functional block.

In an example, the accelerator instructions can cause a first component (e.g., a PPE) and a second component (e.g., a DLSU) to operate in coordination with one another. For example, the instructions can cause the DLSU to obtain (e.g., buffer) data associated with an image (or portions thereof, sometimes referred to as blocks or tiles). The instructions can then cause the PPE to obtain the data buffered by the DLSU. In an example, where the data associated with the image is obtained by the PPE, data associated with at least a portion of an image can be read into the PPE via a read stream. In some embodiments, the PPE can perform one or more operations in accordance with the accelerator instruction, such as one or more shifts of data between registers and one or more arithmetic operations. Once the one or more operations are complete, the PPE can provide the resulting data to the DLSU via a write stream. While the principles of the present disclosure are described with respect to operations performed by the PPE, it will be understood that any suitable accelerator instructions can cause any component of a functional block to operate in accordance with any suitable instruction.

Although the present disclosure may be described with respect to an example autonomous vehicle 1500 (alternatively referred to herein as "vehicle 1500" or "ego-vehicle 1500," an example of which is described with respect to FIGS. 15A-15D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to certain implementations involving the processing of data during automated vehicle operation, this is not intended to be limiting, and the systems and methods described herein may be used in augmented reality, virtual reality, mixed reality, robotics, security and surveillance, autonomous or semi-autonomous machine applications, and/or any other technology spaces where accelerators may be used to process data generated during operation of a robot.

Example Autonomous Vehicle

Figure 15A:
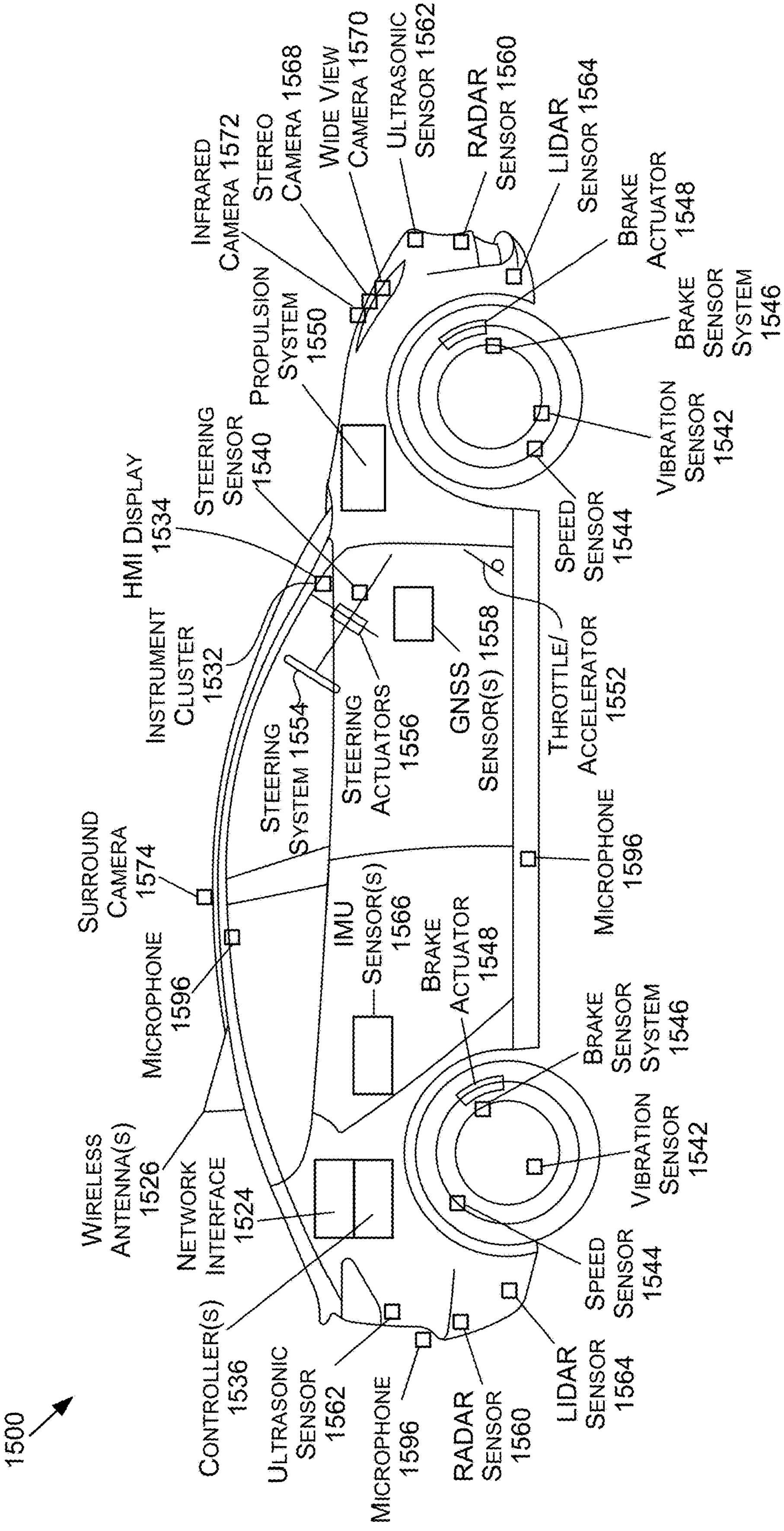
FIG. 15A is an illustration of an example autonomous vehicle, in accordance with some embodiments of the present disclosure.

FIG. 15A is an illustration of an example autonomous vehicle 1500, in accordance with some embodiments of the present disclosure. In some embodiments, the example autonomous vehicle 1500 can include one or more components (e.g., SoCs and/or the like) that are the same as, or similar to, the functional blocks 110 of FIG. 1A, and/or other components as described herein. The autonomous vehicle 1500 (alternatively referred to herein as the "vehicle 1500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1500 may be capable of functionality in accordance with one or more of Level 3-Level 5 of the autonomous driving levels. The vehicle 1500 may be capable of functionality in accordance with one or more of Level 1-Level 5 of the autonomous driving levels. For example, the vehicle 1500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1500 or other machine, such as being fully autonomous, being highly autonomous, being conditionally autonomous, being partially autonomous, providing assistive autonomy, being semi-autonomous, being primarily autonomous, or other designation. In some embodiments, during operation of the autonomous vehicle 1500, the autonomous vehicle 1500 can implement at least some of the systems, methods, and techniques described herein. For example, the autonomous vehicle 1500 can implement at least some of the components illustrated and described with respect to the example computing environment of FIG. 1A, PPE of FIG. 1B, and/or PEs of FIG. 1C when obtaining and processing data generated by sensors of the autonomous vehicle as described herein.

The vehicle 1500 may include components such as a chassis, a vehicle body, wheels (e.g., 2, 4, 6, 8, 18, etc.), tires, axles, and other components of a vehicle. The vehicle 1500 may include a propulsion system 1550, such as an internal combustion engine, hybrid electric power plant, an all-electric engine, and/or another propulsion system type. The propulsion system 1550 may be connected to a drive train of the vehicle 1500, which may include a transmission, to enable the propulsion of the vehicle 1500. The propulsion system 1550 may be controlled in response to receiving signals from the throttle/accelerator 1552.

A steering system 1554, which may include a steering wheel, may be used to steer the vehicle 1500 (e.g., along a desired path or route) when the propulsion system 1550 is operating (e.g., when the vehicle is in motion). The steering system 1554 may receive signals from a steering actuator 1556. The steering wheel may be optional for full automation (Level 5) functionality.

The brake sensor system 1546 may be used to operate the vehicle brakes in response to receiving signals from the brake actuators 1548 and/or brake sensors.

Controller(s) 1536, which may include one or more system on chips (SoCs) 1504 (FIG. 15C) and/or GPU(s), may provide signals (e.g., representative of commands) to one or more components and/or systems of the vehicle 1500. For example, the controller(s) may send signals to operate the vehicle brakes via one or more brake actuators 1548, to operate the steering system 1554 via one or more steering actuators 1556, to operate the propulsion system 1550 via one or more throttle/accelerators 1552. The controller(s) 1536 may include one or more onboard (e.g., integrated) computing devices (e.g., supercomputers) that process sensor signals, and output operation commands (e.g., signals representing commands) to enable autonomous driving and/or to assist a human driver in driving the vehicle 1500. The controller(s) 1536 may include a first controller 1536 for autonomous driving functions, a second controller 1536 for functional safety functions, a third controller 1536 for artificial intelligence functionality (e.g., computer vision), a fourth controller 1536 for infotainment functionality, a fifth controller 1536 for redundancy in emergency conditions, and/or other controllers. In some examples, a single controller 1536 may handle two or more of the above functionalities, two or more controllers 1536 may handle a single functionality, and/or any combination thereof.

The controller(s) 1536 may provide the signals for controlling one or more components and/or systems of the vehicle 1500 in response to sensor data received from one or more sensors (e.g., sensor inputs). The sensor data may be received from, for example and without limitation, global navigation satellite systems ("GNSS") sensor(s) 1558 (e.g., Global Positioning System sensor(s)), RADAR sensor(s) 1560, ultrasonic sensor(s) 1562, LiDAR sensor(s) 1564, inertial measurement unit (IMU) sensor(s) 1566 (e.g., accelerometer(s), gyroscope(s), magnetic compass(es), magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1598, speed sensor(s) 1544 (e.g., for measuring the speed of the vehicle 1500), vibration sensor(s) 1542, steering sensor(s) 1540, brake sensor(s) (e.g., as part of the brake sensor system 1546), and/or other sensor types.

One or more of the controller(s) 1536 may receive inputs (e.g., represented by input data) from an instrument cluster 1532 of the vehicle 1500 and provide outputs (e.g., represented by output data, display data, etc.) via a human-machine interface (HMI) display 1534, an audible annunciator, a loudspeaker, and/or via other components of the vehicle 1500. The outputs may include information such as vehicle velocity, speed, time, map data (e.g., the High Definition ("HD") map 1522 of FIG. 15C), location data (e.g., the vehicle's 1500 location, such as on a map), direction, location of other vehicles (e.g., an occupancy grid), information about objects and status of objects as perceived by the controller(s) 1536, etc. For example, the HMI display 1534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1500 further includes a network interface 1524 which may use one or more wireless antenna(s) 1526 and/or modem(s) to communicate over one or more networks. For example, the network interface 1524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1526 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 15B:
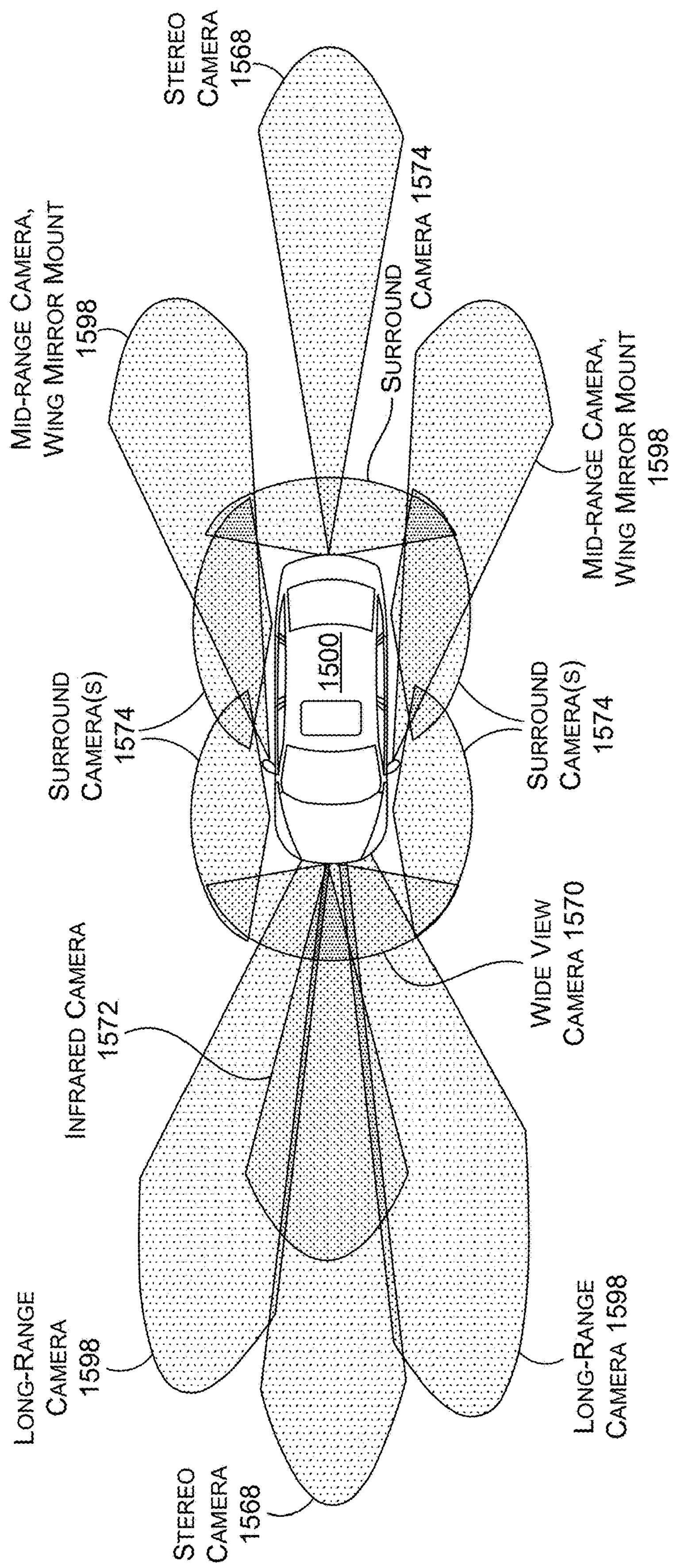
FIG. 15B is an example of camera locations and fields of view for the example autonomous vehicle of FIG. 15A, in accordance with some embodiments of the present disclosure.

FIG. 15B is an example of camera locations and fields of view for the example autonomous vehicle 1500 of FIG. 15A, in accordance with some embodiments of the present disclosure. The cameras and respective fields of view are one example embodiment and are not intended to be limiting. For example, additional and/or alternative cameras may be included and/or the cameras may be located at different locations on the vehicle 1500.

The camera types for the cameras may include, but are not limited to, digital cameras that may be adapted for use with the components and/or systems of the vehicle 1500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1500 (e.g., front-facing cameras) may be used for surround view, to help identify forward facing paths and obstacles, as well aid in, with the help of one or more controllers 1536 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1570 that may be used to perceive objects coming into view from the periphery (e.g., pedestrians, crossing traffic or bicycles). Although only one wide-view camera is illustrated in FIG. 15B, there may be any number (including zero) of wide-view cameras 1570 on the vehicle 1500. In addition, any number of long-range camera(s) 1598 (e.g., a long-view stereo camera pair) may be used for depth-based object detection, especially for objects for which a neural network has not yet been trained. The long-range camera(s) 1598 may also be used for object detection and classification, as well as basic object tracking.

Any number of stereo cameras 1568 may also be included in a front-facing configuration. In at least one embodiment, one or more of stereo camera(s) 1568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1568 may be used in addition to, or alternatively from, those described herein.

Cameras with a field of view that include portions of the environment to the side of the vehicle 1500 (e.g., side-view cameras) may be used for surround view, providing information used to create and update the occupancy grid, as well as to generate side impact collision warnings. For example, surround camera(s) 1574 (e.g., four surround cameras 1574 as illustrated in FIG. 15B) may be positioned to on the vehicle 1500. The surround camera(s) 1574 may include wide-view camera(s) 1570, fisheye camera(s), 360 degree camera(s), and/or the like. Four example, four fisheye cameras may be positioned on the vehicle's front, rear, and sides. In an alternative arrangement, the vehicle may use three surround camera(s) 1574 (e.g., left, right, and rear), and may leverage one or more other camera(s) (e.g., a forward-facing camera) as a fourth surround view camera.

Cameras with a field of view that include portions of the environment to the rear of the vehicle 1500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1598, stereo camera(s) 1568), infrared camera(s) 1572, etc.), as described herein.

Figure 15C:
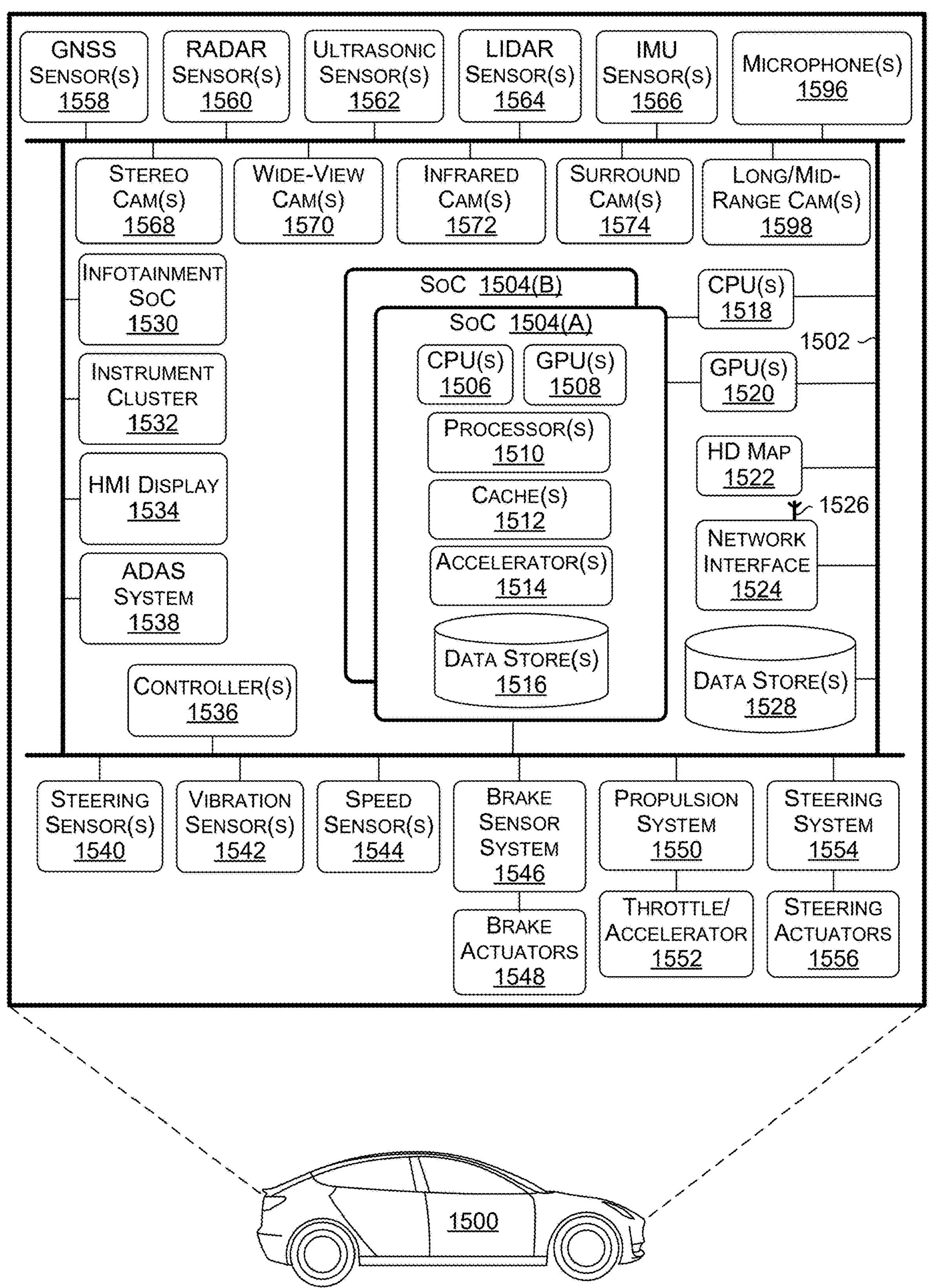
FIG. 15C is a block diagram of an example system architecture for the example autonomous vehicle of FIG. 15A, in accordance with some embodiments of the present disclosure.

FIG. 15C is a block diagram of an example system architecture for the example autonomous vehicle 1500 of FIG. 15A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1500 in FIG. 15C are illustrated as being connected via bus 1502. The bus 1502 may include a Controller Area Network (CAN) data interface (alternatively referred to herein as a "CAN bus"). A CAN may be a network inside the vehicle 1500 used to aid in control of various features and functionality of the vehicle 1500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1502 is described herein as being a CAN bus, this is not intended to be limiting. For example, in addition to, or alternatively from, the CAN bus, FlexRay and/or Ethernet may be used. Additionally, although a single line is used to represent the bus 1502, this is not intended to be limiting. For example, there may be any number of busses 1502, which may include one or more CAN busses, one or more FlexRay busses, one or more Ethernet busses, and/or one or more other types of busses using a different protocol. In some examples, two or more busses 1502 may be used to perform different functions, and/or may be used for redundancy. For example, a first bus 1502 may be used for collision avoidance functionality and a second bus 1502 may be used for actuation control. In any example, each bus 1502 may communicate with any of the components of the vehicle 1500, and two or more busses 1502 may communicate with the same components. In some examples, each SoC 1504, each controller 1536, and/or each computer within the vehicle may have access to the same input data (e.g., inputs from sensors of the vehicle 1500), and may be connected to a common bus, such the CAN bus.

The vehicle 1500 may include one or more controller(s) 1536, such as those described herein with respect to FIG. 15A. The controller(s) 1536 may be used for a variety of functions. The controller(s) 1536 may be coupled to any of the various other components and systems of the vehicle 1500, and may be used for control of the vehicle 1500, artificial intelligence of the vehicle 1500, infotainment for the vehicle 1500, and/or the like.

The vehicle 1500 may include a system(s) on a chip (SoC) 1504. The SoC 1504 may include CPU(s) 1506, GPU(s) 1508, processor(s) 1510, cache(s) 1512, accelerator(s) 1514, data store(s) 1516, and/or other components and features not illustrated. The SoC(s) 1504 may be used to control the vehicle 1500 in a variety of platforms and systems. For example, the SoC(s) 1504 may be combined in a system (e.g., the system of the vehicle 1500) with an HD map 1522 which may obtain map refreshes and/or updates via a network interface 1524 from one or more servers (e.g., server(s) 1578 of FIG. 15D).

The CPU(s) 1506 may include a CPU cluster or CPU complex (alternatively referred to herein as a "CCPLEX"). The CPU(s) 1506 may include multiple cores and/or L2 caches. For example, in some embodiments, the CPU(s) 1506 may include eight cores in a coherent multi-processor configuration. In some embodiments, the CPU(s) 1506 may include four dual-core clusters where each cluster has a dedicated L2 cache (e.g., a 2 MB L2 cache). The CPU(s) 1506 (e.g., the CCPLEX) may be configured to support simultaneous cluster operation enabling any combination of the clusters of the CPU(s) 1506 to be active at any given time.

The CPU(s) 1506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1508 may include an integrated GPU (alternatively referred to herein as an "iGPU"). The GPU(s) 1508 may be programmable and may be efficient for parallel workloads. The GPU(s) 1508, in some examples, may use an enhanced tensor instruction set. The GPU(s) 1508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1508 may include at least eight streaming microprocessors. The GPU(s) 1508 may use compute application programming interface(s) (API(s)). In addition, the GPU(s) 1508 may use one or more parallel computing platforms and/or programming models (e.g., NVIDIA's CUDA).

The GPU(s) 1508 may be power-optimized for best performance in automotive and embedded use cases. For example, the GPU(s) 1508 may be fabricated on a Fin field-effect transistor (FinFET). However, this is not intended to be limiting and the GPU(s) 1508 may be fabricated using other semiconductor manufacturing processes. Each streaming microprocessor may incorporate a number of mixed-precision processing cores partitioned into multiple blocks. For example, and without limitation, 64

PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1508 to access the CPU(s) 1506 page tables directly. In such examples, when the GPU(s) 1508 memory management unit (MMU) experiences a miss, an address translation request may be transmitted to the CPU(s) 1506. In response, the CPU(s) 1506 may look in its page tables for the virtual-to-physical mapping for the address and transmits the translation back to the GPU(s) 1508. As such, unified memory technology may allow a single unified virtual address space for memory of both the CPU(s) 1506 and the GPU(s) 1508, thereby simplifying the GPU(s) 1508 programming and porting of applications to the GPU(s) 1508.

In addition, the GPU(s) 1508 may include an access counter that may keep track of the frequency of access of the GPU(s) 1508 to memory of other processors. The access counter may help ensure that memory pages are moved to the physical memory of the processor that is accessing the pages most frequently.

The SoC(s) 1504 may include any number of cache(s) 1512, including those described herein. For example, the cache(s) 1512 may include an L3 cache that is available to both the CPU(s) 1506 and the GPU(s) 1508 (e.g., that is connected both the CPU(s) 1506 and the GPU(s) 1508). The cache(s) 1512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1504 may include an arithmetic logic unit(s) (ALU(s)) which may be leveraged in performing processing with respect to any of the variety of tasks or operations of the vehicle 1500—such as processing DNNs. In addition, the SoC(s) 1504 may include a floating point unit(s) (FPU(s))—or other math coprocessor or numeric coprocessor types—for performing mathematical operations within the system. For example, the SoC(s) 1504 may include one or more FPUs integrated as execution units within a CPU(s) 1506 and/or GPU(s) 1508.

The SoC(s) 1504 may include one or more accelerators 1514 (e.g., hardware accelerators, software accelerators, or a combination thereof). For example, the SoC(s) 1504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1508 and to off-load some of the tasks of the GPU(s) 1508 (e.g., to free up more cycles of the GPU(s) 1508 for performing other tasks). As an example, the accelerator(s) 1514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1508, and by using an inference accelerator, for example, a designer may target either the DLA(s) or the GPU(s) 1508 for any function. For example, the designer may focus processing of CNNs and floating point operations on the DLA(s) and leave other functions to the GPU(s) 1508 and/or other accelerator(s) 1514.

The accelerator(s) 1514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1514 (e.g., the hardware acceleration cluster) may include a computer vision network on-chip and SRAM, for providing a high-bandwidth, low latency SRAM for the accelerator(s) 1514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 1514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1566 output that correlates with the vehicle 1500 orientation, distance, 3D location estimates of the object obtained from the neural network and/or other sensors (e.g., LiDAR sensor(s) 1564 or RADAR sensor(s) 1560), among others.

The SoC(s) 1504 may include data store(s) 1516 (e.g., memory). The data store(s) 1516 may be on-chip memory of the SoC(s) 1504, which may store neural networks to be executed on the GPU and/or the DLA. In some examples, the data store(s) 1516 may be large enough in capacity to store multiple instances of neural networks for redundancy and safety. The data store(s) 1512 may comprise L2 or L3 cache(s) 1512. Reference to the data store(s) 1516 may include reference to the memory associated with the PVA, DLA, and/or other accelerator(s) 1514, as described herein.

The SoC(s) 1504 may include one or more processor(s) 1510 (e.g., embedded processors). The processor(s) 1510 may include a boot and power management processor that may be a dedicated processor and subsystem to handle boot power and management functions and related security enforcement. The boot and power management processor may be a part of the SoC(s) 1504 boot sequence and may provide runtime power management services. The boot power and management processor may provide clock and voltage programming, assistance in system low power state transitions, management of SoC(s) 1504 thermals and temperature sensors, and/or management of the SoC(s) 1504 power states. Each temperature sensor may be implemented as a ring-oscillator whose output frequency is proportional to temperature, and the SoC(s) 1504 may use the ring-oscillators to detect temperatures of the CPU(s) 1506, GPU(s) 1508, and/or accelerator(s) 1514. If temperatures are determined to exceed a threshold, the boot and power management processor may enter a temperature fault routine and put the SoC(s) 1504 into a lower power state and/or put the vehicle 1500 into a chauffeur to safe stop mode (e.g., bring the vehicle 1500 to a safe stop).

The processor(s) 1510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1510 may further include a real-time camera engine that may include a dedicated processor subsystem for handling real-time camera management.

The processor(s) 1510 may further include a high-dynamic range signal processor that may include an image signal processor that is a hardware engine that is part of the camera processing pipeline.

The processor(s) 1510 may include a video image compositor that may be a processing block (e.g., implemented on a microprocessor) that implements video post-processing functions needed by a video playback application to produce the final image for the player window. The video image compositor may perform lens distortion correction on wide-view camera(s) 1570, surround camera(s) 1574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1508 is not required to continuously render new surfaces. Even when the GPU(s) 1508 is powered on and active doing 3D rendering, the video image compositor may be used to offload the GPU(s) 1508 to improve performance and responsiveness.

The SoC(s) 1504 may further include a mobile industry processor interface (MIPI) camera serial interface for receiving video and input from cameras, a high-speed interface, and/or a video input block that may be used for camera and related pixel input functions. The SoC(s) 1504 may further include an input/output controller(s) that may be controlled by software and may be used for receiving I/O signals that are uncommitted to a specific role.

The SoC(s) 1504 may further include a broad range of peripheral interfaces to enable communication with peripherals, audio codecs, power management, and/or other devices. The SoC(s) 1504 may be used to process data from cameras (e.g., connected over Gigabit Multimedia Serial Link and Ethernet), sensors (e.g., LiDAR sensor(s) 1564, RADAR sensor(s) 1560, etc. that may be connected over Ethernet), data from bus 1502 (e.g., speed of vehicle 1500, steering wheel position, etc.), data from GNSS sensor(s) 1558 (e.g., connected over Ethernet or CAN bus). The SoC(s) 1504 may further include dedicated high-performance mass storage controllers that may include their own DMA engines, and that may be used to free the CPU(s) 1506 from routine data management tasks.

The SoC(s) 1504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1504 may be faster, more reliable, and even more energy-efficient and space-efficient than conventional systems. For example, the accelerator(s) 1514, when combined with the CPU(s) 1506, the GPU(s) 1508, and the data store(s) 1516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. icular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1508.

In some examples, a CNN for facial recognition and vehicle owner identification may use data from camera sensors to identify the presence of an authorized driver and/or owner of the vehicle 1500. The always on sensor processing engine may be used to unlock the vehicle when the owner approaches the driver door and turn on the lights, and, in security mode, to disable the vehicle when the owner leaves the vehicle. In this way, the SoC(s) 1504 provide for security against theft and/or carjacking.

In another example, a CNN for emergency vehicle detection and identification may use data from microphones 1596 to detect and identify emergency vehicle sirens. In contrast to conventional systems, that use general classifiers to detect sirens and manually extract features, the SoC(s) 1504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1562, until the emergency vehicle(s) passes.

The vehicle may include a CPU(s) 1518 (e.g., discrete CPU(s), or dCPU(s)), that may be coupled to the SoC(s) 1504 via a high-speed interconnect (e.g., PCIe). The CPU(s) 1518 may include an X86 processor, for example. The CPU(s) 1518 may be used to perform any of a variety of functions, including arbitrating potentially inconsistent results between ADAS sensors and the SoC(s) 1504, and/or monitoring the status and health of the controller(s) 1536 and/or infotainment SoC 1530, for example.

The vehicle 1500 may include a GPU(s) 1520 (e.g., discrete GPU(s), or dGPU(s)), that may be coupled to the SoC(s) 1504 via a high-speed interconnect (e.g., NVIDIA's NVLINK). The GPU(s) 1520 may provide additional artificial intelligence functionality, such as by executing redundant and/or different neural networks, and may be used to train and/or update neural networks based on input (e.g., sensor data) from sensors of the vehicle 1500.

The vehicle 1500 may further include the network interface 1524 which may include one or more wireless antennas 1526 (e.g., one or more wireless antennas for different communication protocols, such as a cellular antenna, a Bluetooth antenna, etc.). The network interface 1524 may be used to enable wireless connectivity over the Internet with the cloud (e.g., with the server(s) 1578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1500 information about vehicles in proximity to the vehicle 1500 (e.g., vehicles in front of, on the side of, and/or behind the vehicle 1500). This functionality may be part of a cooperative adaptive cruise control functionality of the vehicle 1500.

The network interface 1524 may include a SoC that provides modulation and demodulation functionality and enables the controller(s) 1536 to communicate over wireless networks. The network interface 1524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1500 may further include data store(s) 1528 which may include off-chip (e.g., off the SoC(s) 1504) storage. The data store(s) 1528 may include one or more storage elements including RAM, SRAM, DRAM, VRAM, Flash, hard disks, and/or other components and/or devices that may store at least one bit of data.

The vehicle 1500 may further include GNSS sensor(s) 1558. The GNSS sensor(s) 1558 (e.g., GPS, assisted GPS sensors, differential GPS (DGPS) sensors, etc.), to assist in mapping, perception, occupancy grid generation, and/or path planning functions. Any number of GNSS sensor(s) 1558 may be used, including, for example and without limitation, a GPS using a USB connector with an Ethernet to Serial (RS-232) bridge.

The vehicle 1500 may further include RADAR sensor(s) 1560. The RADAR sensor(s) 1560 may be used by the vehicle 1500 for long-range vehicle detection, even in darkness and/or severe weather conditions. RADAR functional safety levels may be ASIL B. The RADAR sensor(s) 1560 may use the CAN and/or the bus 1502 (e.g., to transmit data generated by the RADAR sensor(s) 1560) for control and to access object tracking data, with access to Ethernet to access raw data in some examples. A wide variety of RADAR sensor types may be used. For example, and without limitation, the RADAR sensor(s) 1560 may be suitable for front, rear, and side RADAR use. In some example, Pulse Doppler RADAR sensor(s) are used.

The RADAR sensor(s) 1560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1500 surroundings at higher speeds with minimal interference from traffic in adjacent lanes. The other two antennae may expand the field of view, making it possible to quickly detect vehicles entering or leaving the vehicle's 1500 lane.

Mid-range RADAR systems may include, as an example, a range of up to 1560 m (front) or 80 m (rear), and a field of view of up to 42 degrees (front) or 1550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1500 may further include ultrasonic sensor(s) 1562. The ultrasonic sensor(s) 1562, which may be positioned at the front, back, and/or the sides of the vehicle 1500, may be used for park assist and/or to create and update an occupancy grid. A wide variety of ultrasonic sensor(s) 1562 may be used, and different ultrasonic sensor(s) 1562 may be used for different ranges of detection (e.g., 2.5 m, 4 m). The ultrasonic sensor(s) 1562 may operate at functional safety levels of ASIL B.

The vehicle 1500 may include LiDAR sensor(s) 1564. The LiDAR sensor(s) 1564 may be used for object and pedestrian detection, emergency braking, collision avoidance, and/or other functions. The LiDAR sensor(s) 1564 may be functional safety level ASIL B. In some examples, the vehicle 1500 may include multiple LiDAR sensors 1564 (e.g., two, four, six, etc.) that may use Ethernet (e.g., to provide data to a Gigabit Ethernet switch).

In some examples, the LiDAR sensor(s) 1564 may be capable of providing a list of objects and their distances for a 360-degree field of view. Commercially available LiDAR sensor(s) 1564 may have an advertised range of approximately 1500 m, with an accuracy of 2 cm-3 cm, and with support for a 1500 Mbps Ethernet connection, for example. In some examples, one or more non-protruding LiDAR sensors 1564 may be used. In such examples, the LiDAR sensor(s) 1564 may be implemented as a small device that may be embedded into the front, rear, sides, and/or corners of the vehicle 1500. The LiDAR sensor(s) 1564, in such examples, may provide up to a 120-degree horizontal and 35-degree vertical field-of-view, with a 200 m range even for low-reflectivity objects. Front-mounted LiDAR sensor(s) 1564 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 1500. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 1564 may be less susceptible to motion blur, vibration, and/or shock.

The vehicle may further include IMU sensor(s) 1566. The IMU sensor(s) 1566 may be located at a center of the rear axle of the vehicle 1500, in some examples. The IMU sensor(s) 1566 may include, for example and without limitation, an accelerometer(s), a magnetometer(s), a gyroscope(s), a magnetic compass(es), and/or other sensor types. In some examples, such as in six-axis applications, the IMU sensor(s) 1566 may include accelerometers and gyroscopes, while in nine-axis applications, the IMU sensor(s) 1566 may include accelerometers, gyroscopes, and magnetometers.

In some embodiments, the IMU sensor(s) 1566 may be implemented as a miniature, high performance GPS-Aided Inertial Navigation System (GPS/INS) that combines microelectro-mechanical systems (MEMS) inertial sensors, a high-sensitivity GPS receiver, and advanced Kalman filtering algorithms to provide estimates of position, velocity, and attitude. As such, in some examples, the IMU sensor(s) 1566 may enable the vehicle 1500 to estimate heading without requiring input from a magnetic sensor by directly observing and correlating the changes in velocity from GPS to the IMU sensor(s) 1566. In some examples, the IMU sensor(s) 1566 and the GNSS sensor(s) 1558 may be combined in a single integrated unit.

The vehicle may include microphone(s) 1596 placed in and/or around the vehicle 1500. The microphone(s) 1596 may be used for emergency vehicle detection and identification, among other things.

The vehicle may further include any number of camera types, including stereo camera(s) 1568, wide-view camera(s) 1570, infrared camera(s) 1572, surround camera(s) 1574, long-range and/or mid-range camera(s) 1598, and/or other camera types. The cameras may be used to capture image data around an entire periphery of the vehicle 1500. The types of cameras used depends on the embodiments and requirements for the vehicle 1500, and any combination of camera types may be used to provide the necessary coverage around the vehicle 1500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 15A and FIG. 15B.

The vehicle 1500 may further include vibration sensor(s) 1542. The vibration sensor(s) 1542 may measure vibrations of components of the vehicle, such as the axle(s). For example, changes in vibrations may indicate a change in road surfaces. In another example, when two or more vibration sensors 1542 are used, the differences between the vibrations may be used to determine friction or slippage of the road surface (e.g., when the difference in vibration is between a power-driven axle and a freely rotating axle).

The vehicle 1500 may include an ADAS system 1538. The ADAS system 1538 may include a SoC, in some examples. The ADAS system 1538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1560, LiDAR sensor(s) 1564, and/or a camera(s). The ACC systems may include longitudinal ACC and/or lateral ACC. Longitudinal ACC monitors and controls the distance to the vehicle immediately ahead of the vehicle 1500 and automatically adjust the vehicle speed to maintain a safe distance from vehicles ahead. Lateral ACC performs distance keeping, and advises the vehicle 1500 to change lanes when necessary. Lateral ACC is related to other ADAS applications such as LCA and CWS.

CACC uses information from other vehicles that may be received via the network interface 1524 and/or the wireless antenna(s) 1526 from other vehicles via a wireless link, or indirectly, over a network connection (e.g., over the Internet). Direct links may be provided by a vehicle-to-vehicle (V2V) communication link, while indirect links may be infrastructure-to-vehicle (12V) communication link. In general, the V2V communication concept provides information about the immediately preceding vehicles (e.g., vehicles immediately ahead of and in the same lane as the vehicle 1500), while the 12V communication concept provides information about traffic further ahead. CACC systems may include either or both 12V and V2V information sources. Given the information of the vehicles ahead of the vehicle 1500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1500 if the vehicle 1500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1500 is backing up. Some RCTW systems include AEB to ensure that the vehicle brakes are applied to avoid a crash. RCTW systems may use one or more rear-facing RADAR sensor(s) 1560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1500, the vehicle 1500 itself must, in the case of conflicting results, decide whether to heed the result from a primary computer or a secondary computer (e.g., a first controller 1536 or a second controller 1536). For example, in some embodiments, the ADAS system 1538 may be a backup and/or secondary computer for providing perception information to a backup computer rationality module. The backup computer rationality monitor may run a redundant diverse software on hardware components to detect faults in perception and dynamic driving tasks. Outputs from the ADAS system 1538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1504.

In other examples, ADAS system 1538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1538 may be fed into the primary computer's perception block and/or the primary computer's dynamic driving task block. For example, if the ADAS system 1538 indicates a forward crash warning due to an object immediately ahead, the perception block may use this information when identifying objects. In other examples, the secondary computer may have its own neural network which is trained and thus reduces the risk of false positives, as described herein.

The vehicle 1500 may further include the infotainment SoC 1530 (e.g., an in-vehicle infotainment system (IVI)). Although illustrated and described as a SoC, the infotainment system may not be a SoC, and may include two or more discrete components. The infotainment SoC 1530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1500. For example, the infotainment SoC 1530 may radios, disk players, navigation systems, video players, USB and Bluetooth connectivity, carputers, in-car entertainment, Wi-Fi, steering wheel audio controls, hands free voice control, a heads-up display (HUD), an HMI display 1534, a telematics device, a control panel (e.g., for controlling and/or interacting with various components, features, and/or systems), and/or other components. The infotainment SoC 1530 may further be used to provide information (e.g., visual and/or audible) to a user(s) of the vehicle, such as information from the ADAS system 1538, autonomous driving information such as planned vehicle maneuvers, trajectories, surrounding environment information (e.g., intersection information, vehicle information, road information, etc.), and/or other information.

The infotainment SoC 1530 may include GPU functionality. The infotainment SoC 1530 may communicate over the bus 1502 (e.g., CAN bus, Ethernet, etc.) with other devices, systems, and/or components of the vehicle 1500. In some examples, the infotainment SoC 1530 may be coupled to a supervisory MCU such that the GPU of the infotainment system may perform some self-driving functions in the event that the primary controller(s) 1536 (e.g., the primary and/or backup computers of the vehicle 1500) fail. In such an example, the infotainment SoC 1530 may put the vehicle 1500 into a chauffeur to safe stop mode, as described herein.

The vehicle 1500 may further include an instrument cluster 1532 (e.g., a digital dash, an electronic instrument cluster, a digital instrument panel, etc.). The instrument cluster 1532 may include a controller and/or supercomputer (e.g., a discrete controller or supercomputer). The instrument cluster 1532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1530 and the instrument cluster 1532. In other words, the instrument cluster 1532 may be included as part of the infotainment SoC 1530, or vice versa.

Figure 15D:
FIG. 15D is a system diagram for communication between cloud-based server(s) and the example autonomous vehicle of FIG. 15A, in accordance with some embodiments of the present disclosure.

FIG. 15D is a system diagram for communication between cloud-based server(s) and the example autonomous vehicle 1500 of FIG. 15A, in accordance with some embodiments of the present disclosure. The system 1576 may include server(s) 1578, network(s) 1590, and vehicles, including the vehicle 1500. The server(s) 1578 may include a plurality of GPUs 1584(A)-1584 (H) (collectively referred to herein as GPUs 1584), PCIe switches 1582(A)-1582(H) (collectively referred to herein as PCIe switches 1582), and/or CPUs 1580(A)-1580(B) (collectively referred to herein as CPUs 1580). The GPUs 1584, the CPUs 1580, and the PCIe switches may be interconnected with high-speed interconnects such as, for example and without limitation, NVLink interfaces 1588 developed by NVIDIA and/or PCIe connections 1586. In some examples, the GPUs 1584 are connected via NVLink and/or NVSwitch SoC and the GPUs 1584 and the PCIe switches 1582 are connected via PCIe interconnects. Although eight GPUs 1584, two CPUs 1580, and two PCIe switches are illustrated, this is not intended to be limiting. Depending on the embodiment, each of the server(s) 1578 may include any number of GPUs 1584, CPUs 1580, and/or PCIe switches. For example, the server(s) 1578 may each include eight, sixteen, thirty-two, and/or more GPUs 1584.

The server(s) 1578 may receive, over the network(s) 1590 and from the vehicles, image data representative of images showing unexpected or changed road conditions, such as recently commenced road-work. The server(s) 1578 may transmit, over the network(s) 1590 and to the vehicles, neural networks 1592, updated neural networks 1592, and/or map information 1594, including information regarding traffic and road conditions. The updates to the map information 1594 may include updates for the HD map 1522, such as information regarding construction sites, potholes, detours, flooding, and/or other obstructions. In some examples, the neural networks 1592, the updated neural networks 1592, and/or the map information 1594 may have resulted from new training and/or experiences represented in data received from any number of vehicles in the environment, and/or based on training performed at a datacenter (e.g., using the server(s) 1578 and/or other servers).

The server(s) 1578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1590, and/or the machine learning models may be used by the server(s) 1578 to remotely monitor the vehicles.

In some examples, the server(s) 1578 may receive data from the vehicles and apply the data to up-to-date real-time neural networks for real-time intelligent inferencing. The server(s) 1578 may include deep-learning supercomputers and/or dedicated AI computers powered by GPU(s) 1584, such as a DGX and DGX Station machines developed by NVIDIA. However, in some examples, the server(s) 1578 may include deep learning infrastructure that use only CPU-powered datacenters.

The deep-learning infrastructure of the server(s) 1578 may be capable of fast, real-time inferencing, and may use that capability to evaluate and verify the health of the processors, software, and/or associated hardware in the vehicle 1500. For example, the deep-learning infrastructure may receive periodic updates from the vehicle 1500, such as a sequence of images and/or objects that the vehicle 1500 has located in that sequence of images (e.g., via computer vision and/or other machine learning object classification techniques). The deep-learning infrastructure may run its own neural network to identify the objects and compare them with the objects identified by the vehicle 1500 and, if the results do not match and the infrastructure concludes that the AI in the vehicle 1500 is malfunctioning, the server(s) 1578 may transmit a signal to the vehicle 1500 instructing a fail-safe computer of the vehicle 1500 to assume control, notify the passengers, and complete a safe parking maneuver.

For inferencing, the server(s) 1578 may include the GPU(s) 1584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 16:
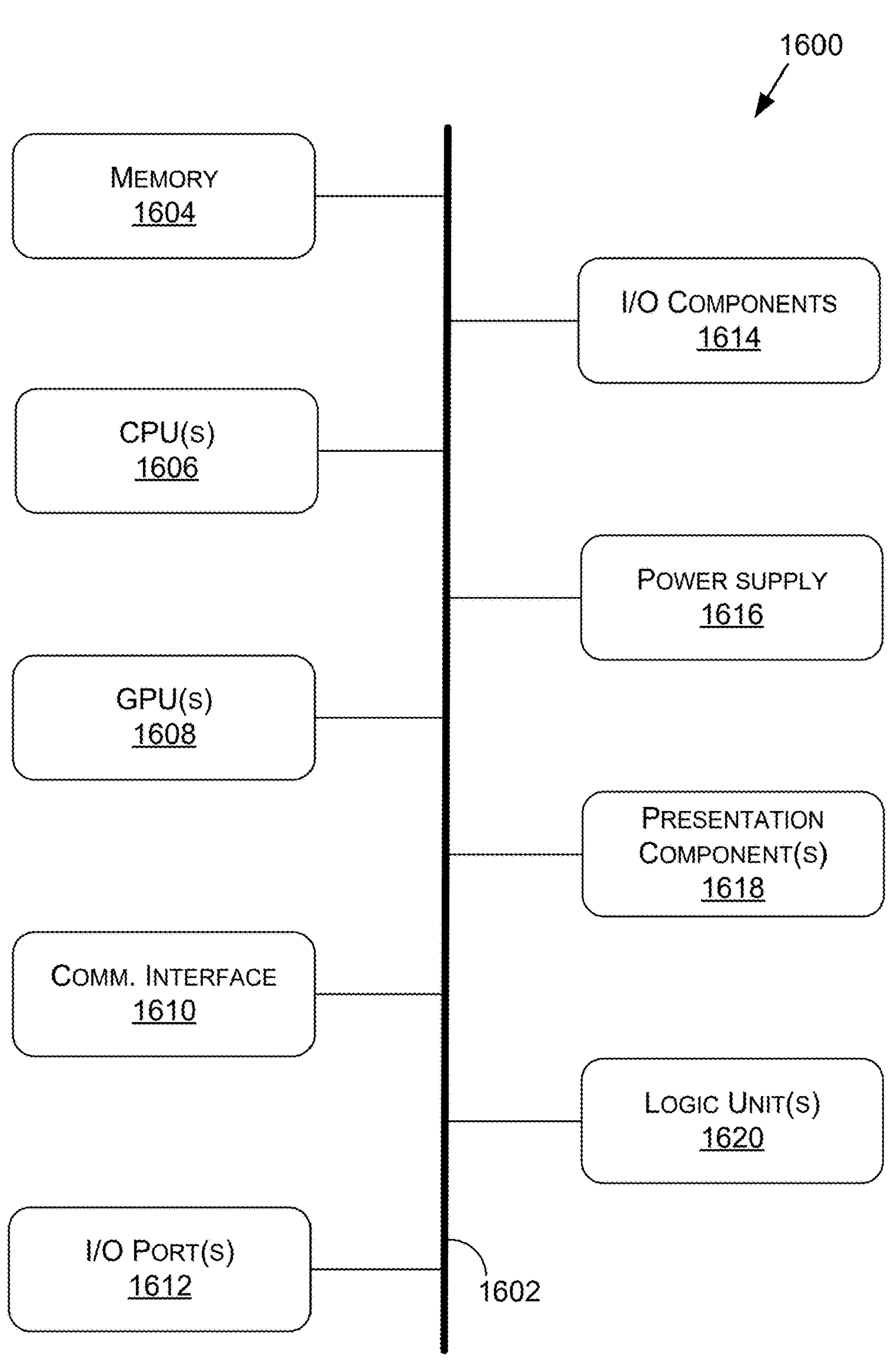
FIG. 16 is a block diagram of an example computing device suitable for use in implementing some embodiments of the present disclosure.

FIG. 16 is a block diagram of an example computing device(s) 1600 suitable for use in implementing some embodiments of the present disclosure. Computing device 1600 may include an interconnect system 1602 that directly or indirectly couples the following devices: memory 1604, one or more central processing units (CPUs) 1606, one or more graphics processing units (GPUs) 1608, a communication interface 1610, input/output (I/O) ports 1612, input/output components 1614, a power supply 1616, one or more presentation components 1618 (e.g., display(s)), and one or more logic units 1620. In at least one embodiment, the computing device(s) 1600 may comprise one or more virtual machines (VMs), and/or any of the components thereof may comprise virtual components (e.g., virtual hardware components). For non-limiting examples, one or more of the GPUs 1608 may comprise one or more vGPUs, one or more of the CPUs 1606 may comprise one or more vCPUs, and/or one or more of the logic units 1620 may comprise one or more virtual logic units. As such, a computing device(s) 1600 may include discrete components (e.g., a full GPU dedicated to the computing device 1600), virtual components (e.g., a portion of a GPU dedicated to the computing device 1600), or a combination thereof.

Although the various blocks of FIG. 16 are shown as connected via the interconnect system 1602 with lines, this is not intended to be limiting and is for clarity only. For example, in some embodiments, a presentation component 1618, such as a display device, may be considered an I/O component 1614 (e.g., if the display is a touch screen). As another example, the CPUs 1606 and/or GPUs 1608 may include memory (e.g., the memory 1604 may be representative of a storage device in addition to the memory of the GPUs 1608, the CPUs 1606, and/or other components). In other words, the computing device of FIG. 16 is merely an example. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 16.

The interconnect system 1602 may represent one or more links or busses, such as an address bus, a data bus, a control bus, or a combination thereof. The interconnect system 1602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1606 may be directly connected to the memory 1604. Further, the CPU 1606 may be directly connected to the GPU 1608. Where there is direct, or point-to-point connection between components, the interconnect system 1602 may include a PCIe link to carry out the connection. In these examples, a PCI bus need not be included in the computing device 1600.

The memory 1604 may include any of a variety of computer-readable media. The computer-readable media may be any available media that may be accessed by the computing device 1600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1606 may be configured to execute at least some of the computer-readable instructions to control one or more components of the computing device 1600 to perform one or more of the methods and/or processes described herein. The CPU(s) 1606 may each include one or more cores (e.g., one, two, four, eight, twenty-eight, seventy-two, etc.) that are capable of handling a multitude of software threads simultaneously. The CPU(s) 1606 may include any type of processor, and may include different types of processors depending on the type of computing device 1600 implemented (e.g., processors with fewer cores for mobile devices and processors with more cores for servers). For example, depending on the type of computing device 1600, the processor may be an Advanced RISC Machines (ARM) processor implemented using Reduced Instruction Set Computing (RISC) or an x86 processor implemented using Complex Instruction Set Computing (CISC). The computing device 1600 may include one or more CPUs 1606 in addition to one or more microprocessors or supplementary co-processors, such as math co-processors.

In addition to or alternatively from the CPU(s) 1606, the GPU(s) 1608 may be configured to execute at least some of the computer-readable instructions to control one or more components of the computing device 1600 to perform one or more of the methods and/or processes described herein. One or more of the GPU(s) 1608 may be an integrated GPU (e.g., with one or more of the CPU(s) 1606 and/or one or more of the GPU(s) 1608 may be a discrete GPU. In embodiments, one or more of the GPU(s) 1608 may be a coprocessor of one or more of the CPU(s) 1606. The GPU(s) 1608 may be used by the computing device 1600 to render graphics (e.g., 3D graphics) or perform general purpose computations. For example, the GPU(s) 1608 may be used for General-Purpose computing on GPUs (GPGPU). The GPU(s) 1608 may include hundreds or thousands of cores that are capable of handling hundreds or thousands of software threads simultaneously. The GPU(s) 1608 may generate pixel data for output images in response to rendering commands (e.g., rendering commands from the CPU(s) 1606 received via a host interface). The GPU(s) 1608 may include graphics memory, such as display memory, for storing pixel data or any other suitable data, such as GPGPU data. The display memory may be included as part of the memory 1604. The GPU(s) 1608 may include two or more GPUs operating in parallel (e.g., via a link). The link may directly connect the GPUs (e.g., using NVLINK) or may connect the GPUs through a switch (e.g., using NVSwitch). When combined together, each GPU 1608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1606 and/or the GPU(s) 1608, the logic unit(s) 1620 may be configured to execute at least some of the computer-readable instructions to control one or more components of the computing device 1600 to perform one or more of the methods and/or processes described herein. In embodiments, the CPU(s) 1606, the GPU(s) 1608, and/or the logic unit(s) 1620 may discretely or jointly perform any combination of the methods, processes and/or portions thereof. One or more of the logic units 1620 may be part of and/or integrated in one or more of the CPU(s) 1606 and/or the GPU(s) 1608 and/or one or more of the logic units 1620 may be discrete components or otherwise external to the CPU(s) 1606 and/or the GPU(s) 1608. In embodiments, one or more of the logic units 1620 may be a coprocessor of one or more of the CPU(s) 1606 and/or one or more of the GPU(s) 1608.

Examples of the logic unit(s) 1620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1610 may include one or more receivers, transmitters, and/or transceivers that enable the computing device 1600 to communicate with other computing devices via an electronic communication network, included wired and/or wireless communications. The communication interface 1610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1620 and/or communication interface 1610 may include one or more data processing units (DPUs) to transmit data received over a network and/or through interconnect system 1602 directly to (e.g., a memory of) one or more GPU(s) 1608.

The I/O ports 1612 may enable the computing device 1600 to be logically coupled to other devices including the I/O components 1614, the presentation component(s) 1618, and/or other components, some of which may be built in to (e.g., integrated in) the computing device 1600. Example I/O components 1614 include a microphone, mouse, keyboard, joystick, game pad, game controller, satellite dish, scanner, printer, wireless device, etc. The I/O components 1614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1600. The computing device 1600 may be include depth cameras, such as stereoscopic camera systems, infrared camera systems, RGB camera systems, touchscreen technology, and combinations of these, for gesture detection and recognition. Additionally, the computing device 1600 may include accelerometers or gyroscopes (e.g., as part of an inertia measurement unit (IMU)) that enable detection of motion. In some examples, the output of the accelerometers or gyroscopes may be used by the computing device 1600 to render immersive augmented reality or virtual reality.

The power supply 1616 may include a hard-wired power supply, a battery power supply, or a combination thereof. The power supply 1616 may provide power to the computing device 1600 to enable the components of the computing device 1600 to operate.

The presentation component(s) 1618 may include a display (e.g., a monitor, a touch screen, a television screen, a heads-up-display (HUD), other display types, or a combination thereof), speakers, and/or other presentation components. The presentation component(s) 1618 may receive data from other components (e.g., the GPU(s) 1608, the CPU(s) 1606, DPUs, etc.), and output the data (e.g., as an image, video, sound, etc.).

Example Data Center

Figure 17:
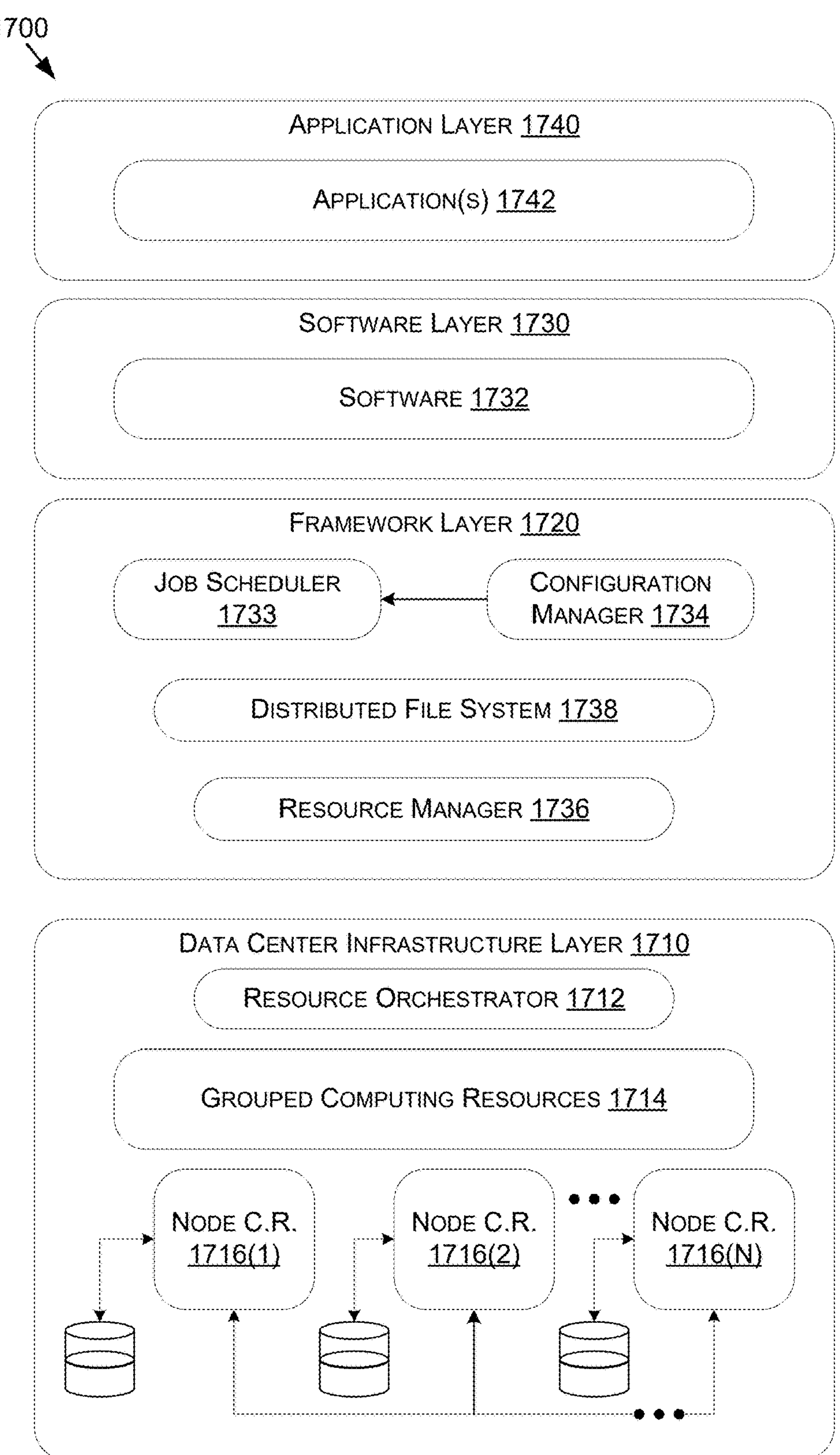
FIG. 17 is a block diagram of an example data center suitable for use in implementing some embodiments of the present disclosure.

FIG. 17 illustrates an example data center 1700 that may be used in at least one embodiments of the present disclosure. The data center 1700 may include a data center infrastructure layer 1710, a framework layer 1720, a software layer 1730, and/or an application layer 1740.

As shown in FIG. 17, the data center infrastructure layer 1710 may include a resource orchestrator 1712, grouped computing resources 1714, and node computing resources ("node C.R.s") 1716(1)-1716(N), where "N" represents any whole, positive integer. In at least one embodiment, node C.R.s 1716(1)-1716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1716(1)-1716(N) may correspond to a server having one or more of the above-mentioned computing resources. In addition, in some embodiments, the node C.R.s 1716(1)-17161 (N) may include one or more virtual components, such as vGPUs, vCPUs, and/or the like, and/or one or more of the node C.R.s 1716(1)-1716(N) may correspond to a virtual machine (VM).

In at least one embodiment, grouped computing resources 1714 may include separate groupings of node C.R.s 1716 housed within one or more racks (not shown), or many racks housed in data centers at various geographical locations (also not shown). Separate groupings of node C.R.s 1716 within grouped computing resources 1714 may include grouped compute, network, memory or storage resources that may be configured or allocated to support one or more workloads. In at least one embodiment, several node C.R.s 1716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1712 may configure or otherwise control one or more node C.R.s 1716(1)-1716(N) and/or grouped computing resources 1714. In at least one embodiment, resource orchestrator 1712 may include a software design infrastructure (SDI) management entity for the data center 1700. The resource orchestrator 1712 may include hardware, software, or some combination thereof.

In at least one embodiment, as shown in FIG. 17, framework layer 1720 may include a job scheduler 1733, a configuration manager 1734, a resource manager 1736, and/or a distributed file system 1738. The framework layer 1720 may include a framework to support software 1732 of software layer 1730 and/or one or more application(s) 1742 of application layer 1740. The software 1732 or application(s) 1742 may respectively include web-based service software or applications, such as those provided by Amazon Web Services, Google Cloud and Microsoft Azure. The framework layer 1720 may be, but is not limited to, a type of free and open-source software web application framework such as Apache Spark™ (hereinafter "Spark") that may utilize distributed file system 1738 for large-scale data processing (e.g., "big data"). In at least one embodiment, job scheduler 1733 may include a Spark driver to facilitate scheduling of workloads supported by various layers of data center 1700. The configuration manager 1734 may be capable of configuring different layers such as software layer 1730 and framework layer 1720 including Spark and distributed file system 1738 for supporting large-scale data processing. The resource manager 1736 may be capable of managing clustered or grouped computing resources mapped to or allocated for support of distributed file system 1738 and job scheduler 1733. In at least one embodiment, clustered or grouped computing resources may include grouped computing resource 1714 at data center infrastructure layer 1710. The resource manager 1736 may coordinate with resource orchestrator 1712 to manage these mapped or allocated computing resources.

In at least one embodiment, software 1732 included in software layer 1730 may include software used by at least portions of node C.R.s 1716(1)-1716(N), grouped computing resources 1714, and/or distributed file system 1738 of framework layer 1720. One or more types of software may include, but are not limited to, Internet web page search software, e-mail virus scan software, database software, and streaming video content software.

In at least one embodiment, application(s) 1742 included in application layer 1740 may include one or more types of applications used by at least portions of node C.R.s 1716 (1)-1716 (N), grouped computing resources 1714, and/or distributed file system 1738 of framework layer 1720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1734, resource manager 1736, and resource orchestrator 1712 may implement any number and type of self-modifying actions based on any amount and type of data acquired in any technically feasible fashion. Self-modifying actions may relieve a data center operator of data center 1700 from making possibly bad configuration decisions and possibly avoiding underutilized and/or poor performing portions of a data center.

The data center 1700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1700. In at least one embodiment, trained or deployed machine learning models corresponding to one or more neural networks may be used to infer or predict information using resources described above with respect to the data center 1700 by using weight parameters calculated through one or more training techniques, such as but not limited to those described herein.

In at least one embodiment, the data center 1700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1600 of FIG. 16—e.g., each device may include similar components, features, and/or functionality of the computing device(s) 1600. In addition, where backend devices (e.g., servers, NAS, etc.) are implemented, the backend devices may be included as part of a data center 1700, an example of which is described in more detail herein with respect to FIG. 17.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1600 described herein with respect to FIG. 16. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising:

one or more circuits to:

determine a first direct memory access (DMA) transfer associated with a first DMA transfer type based at least on generation of frame data associated with a frame obtained using at least one sensor;

determine at least one second DMA transfer associated with a second DMA transfer type based at least on the frame to be linked to the first DMA transfer, the first DMA transfer type associated with a first frame type and the second DMA transfer type associated with a second frame type different from the first frame type;

responsive to determining the at least one second DMA transfer, generate data associated with a descriptor based at least on linking the first DMA transfer and the at least one second DMA transfer for the frame; and provide the data associated with the descriptor to a DMA system, the data associated with the descriptor configured to cause the DMA system to obtain the frame data associated with the frame from source memory in accordance with instructions represented by the descriptor and store the frame data in destination memory.

2. The one or more processors of claim 1, wherein the one or more circuits that determine the at least one second DMA transfer are to:

determine a sequence of DMA transfers to be performed using the DMA system based at least on the frame, and wherein the one or more circuits that generate the data associated with the descriptor are to:

generate the data associated with the descriptor to cause the DMA system to perform the DMA transfers based at least on an amount of DMA transfers represented by the sequence of DMA transfers.

3. The one or more processors of claim 2, wherein the sequence of DMA transfers to be performed using the DMA system are associated with at least one image processing operation.

4. The one or more processors of claim 1, wherein the one or more circuits that determine the at least one second DMA transfer are to:

determine that a plurality of DMA transfers are to be performed based at least on the frame, and wherein the one or more circuits that provide the data associated with the descriptor to the DMA system are to:

provide an indication that the plurality of DMA transfers are not complete.

5. The one or more processors of claim 4, wherein the plurality of DMA transfers are associated with one or more of: a prediction operation, an object tracking operation, or a trajectory prediction operation.

6. The one or more processors of claim 4, wherein the one or more circuits are to:

provide a second indication that a DMA transfer of the plurality of DMA transfers is a final DMA transfer to be performed for the descriptor.

7. The one or more processors of claim 1, wherein the descriptor comprises a first descriptor, wherein the one or more circuits are to:

determine a third DMA transfer based at least on generation of second frame data associated with a second frame obtained using the at least one sensor;

determine at least one fourth DMA transfer based at least on the second frame; and generate data associated with at least one second descriptor based at least on the third DMA transfer and the at least one fourth DMA transfer, and wherein the data associated with the at least one second descriptor is configured to cause the DMA system to obtain the second frame data associated with the frame from source memory based at least on the descriptor performing one or more operations in accordance with the descriptor.

8. The one or more processors of claim 7, wherein the one or more circuits are to:

provide the data associated with the at least one second descriptor to the DMA system to configure the DMA system to perform the third DMA transfer and the at least one fourth DMA transfer as the first DMA transfer and the at least one second DMA transfer are performed by the DMA system.

9. The one or more processors of claim 1, wherein the one or more processors are comprised in at least one of:

a control system for an autonomous or semi-autonomous machine;
a perception system for an autonomous or semi-autonomous machine;
a system implemented using a robot;
an aerial system;
a medical system;
a boating system;
a smart area monitoring system;
a system for performing deep learning operations;
a system for performing simulation operations;
a system for generating or presenting virtual reality (VR) content, augmented reality (AR) content, or mixed reality (MR) content;
a system for performing digital twin operations;
a system implemented using an edge device;
a system incorporating one or more virtual machines (VMs);
a system for generating synthetic data;
a system implemented at least partially in a data center;
a system for performing conversational artificial intelligence (AI) operations;
a system for performing generative AI operations;
a system implementing language models;
a system for implementing vision language models (VLMs);
a system implementing large language models (LLMs);
a system for implementing multi-modal language models;
a system for hosting one or more real-time streaming applications;
a system for performing light transport simulation;
a system for performing collaborative content creation for 3D assets; or
a system implemented at least partially using cloud computing resources.

10. A system, comprising:

at least one direct memory access (DMA) system configured to perform one or more operations involved in one or more DMA transfers; and at least one accelerator configured to process data associated with one or more frames, the at least one accelerator comprising one or more circuits to:

determine a first DMA transfer associated with a first DMA transfer type based at least on generation of frame data associated with a frame as obtained using at least one sensor;

determine at least one second DMA transfer associated with a second DMA transfer type based at least on the frame to be linked to the first DMA transfer, the first DMA transfer type associated with a first frame type and the second DMA transfer type associated with a second frame type different from the first frame type;

responsive to determining the at least one second DMA transfer, generate data associated with a descriptor based at least on linking the first DMA transfer and the at least one second DMA transfer for the frame; and provide the data associated with the descriptor to the DMA system, the data associated with the descriptor configured to cause the DMA system to obtain the frame data associated with the frame from source memory based at least on the descriptor and store the frame data in destination memory.

11. The system of claim 10, wherein the one or more circuits of the accelerator that determine the at least one second DMA transfer are to:

determine a sequence of DMA transfers to be performed by the DMA system based at least on the frame, and wherein the one or more circuits of the accelerator that generate the data associated with the descriptor are to:

generate the data associated with the descriptor to cause the DMA system to perform the DMA transfers based at least on an amount of DMA transfers represented by the sequence of DMA transfers.

12. The system of claim 11, wherein the sequence of DMA transfers to be performed by the DMA system are associated with at least one image processing operation.

13. The system of claim 10, wherein the one or more circuits of the accelerator that determine the at least one second DMA transfer are to:

determine that a plurality of DMA transfers are to be performed based at least on the frame, and wherein the one or more circuits of the accelerator that provide the data associated with the descriptor to the DMA system are to:

provide an indication that the plurality of DMA transfers are not complete.

14. The system of claim 13, wherein the plurality of DMA transfers are associated with one or more of: a prediction operation, an object tracking operation, or a trajectory prediction operation.

15. The system of claim 13, wherein the one or more circuits of the accelerator are to:

provide a second indication that a DMA transfer of the plurality of DMA transfers is a final DMA transfer to be performed for the descriptor.

16. The system of claim 10, wherein the descriptor comprises a first descriptor, wherein the one or more circuits of the accelerator are to:

determine a third direct memory access (DMA) transfer based at least on generation of second frame data generated by a sensor, the frame data associated with a second frame;

determine at least one fourth DMA transfer based at least on the second frame; and generate data associated with at least one second descriptor based at least on the third DMA transfer and the at least one fourth DMA transfer, and wherein the data associated with the at least one second descriptor is configured to cause the DMA system to obtain the second frame data associated with the frame from source memory based at least on the descriptor performing one or more operations in accordance with the descriptor.

17. The system of claim 16, wherein the one or more circuits of the accelerator are to:

provide the data associated with the at least one second descriptor to the DMA system to configure the DMA system to perform the third DMA transfer and the at least one fourth DMA transfer as the first DMA transfer and the at least one second DMA transfer are performed by at least one device of the accelerator.

18. The system of claim 10, wherein the at least one DMA system or the at least one accelerator are comprised in at least one of:

a control system for an autonomous or semi-autonomous machine;
a perception system for an autonomous or semi-autonomous machine;
a system implemented using a robot;
an aerial system;
a medical system;
a boating system;
a smart area monitoring system;
a system for performing deep learning operations;
a system for performing simulation operations;
a system for generating or presenting virtual reality (VR) content, augmented reality (AR) content, or mixed reality (MR) content;
a system for performing digital twin operations;
a system implemented using an edge device;
a system incorporating one or more virtual machines (VMs);
a system for generating synthetic data;
a system implemented at least partially in a data center;
a system for performing conversational artificial intelligence (AI) operations;
a system for performing generative AI operations;
a system implementing language models;
a system for implementing vision language models (VLMs);
a system for implementing large language models (LLMs);
a system for implementing multi-modal language models;
a system for hosting one or more real-time streaming applications;
a system for performing light transport simulation;
a system for performing collaborative content creation for 3D assets; or
a system implemented at least partially using cloud computing resources.

19. A method comprising:

determining a first direct memory access (DMA) transfer associated with a first DMA transfer type based at least on generation of frame data associated with a frame obtained using at least one sensor;

determining at least one second DMA transfer associated with a second DMA transfer type based at least on the frame, the first DMA transfer type associated with a first frame type and the second DMA transfer type associated with a second frame type different from the first frame type;

responsive to determining the at least one second DMA transfer, generating data associated with a descriptor based at least on linking the first DMA transfer and the at least one second DMA transfer for the frame; and providing the data associated with the descriptor to device, the data associated with the descriptor configured to cause the device to obtain the frame data associated with the frame from source memory based at least on the descriptor and store the frame data in destination memory.

20. The method of claim 19, wherein determining the at least one second DMA transfer comprises:

determining a sequence of DMA transfers to be performed by the device based at least on the frame, and wherein generating the data associated with the descriptor comprises:

generating the data associated with the descriptor to cause the device to perform the DMA transfers based at least on an amount of DMA transfers represented by the sequence of DMA transfers.

* * * * *